United States Patent
Leo et al.

(10) Patent No.: US 12,448,614 B2
(45) Date of Patent: Oct. 21, 2025

(54) ENZYMES FOR GLYCAN ANALYSIS

(71) Applicant: Genovis AB, Lund (SE)

(72) Inventors: Fredrik Leo, Lund (SE); Rolf Lood-Alayón, Lund (SE); Stephan Bjork, Lund (SE); Malin Mejare, Lund (SE); Fredrik Olsson, Lund (SE)

(73) Assignee: Genovis AB, Lund (SE)

( * ) Notice: Subject to any disclaimer, the term of this patent is extended or adjusted under 35 U.S.C. 154(b) by 1320 days.

(21) Appl. No.: 16/616,872

(22) PCT Filed: May 25, 2018

(86) PCT No.: PCT/EP2018/063833
§ 371 (c)(1),
(2) Date: Nov. 25, 2019

(87) PCT Pub. No.: WO2018/215657
PCT Pub. Date: Nov. 29, 2018

(65) Prior Publication Data
US 2020/0087643 A1 Mar. 19, 2020

(30) Foreign Application Priority Data

| | | | |
|---|---|---|---|
| May 26, 2017 | (GB) | ..................... | 1708471 |
| May 26, 2017 | (GB) | ..................... | 1708476 |
| Apr. 24, 2018 | (GB) | ..................... | 1806655 |

(51) Int. Cl.
*C12N 9/24* (2006.01)
*C12N 9/52* (2006.01)
*G01N 33/68* (2006.01)
*G01N 33/84* (2006.01)

(52) U.S. Cl.
CPC ............ *C12N 9/2402* (2013.01); *C12N 9/52* (2013.01); *G01N 33/68* (2013.01); *G01N 33/84* (2013.01); *C12Y 304/24057* (2013.01); *G01N 2333/924* (2013.01); *G01N 2333/952* (2013.01)

(58) Field of Classification Search
None
See application file for complete search history.

(56) References Cited

U.S. PATENT DOCUMENTS

| | | | |
|---|---|---|---|
| 11,584,922 B2 * | 2/2023 | Leo .................. | G01N 33/68 |
| 2002/0193573 A1 | 12/2002 | Nock et al. | |
| 2005/0112751 A1 | 5/2005 | Fang et al. | |
| 2014/0308730 A1 | 10/2014 | Nikiforov et al. | |

FOREIGN PATENT DOCUMENTS

| WO | WO 2008071418 | 6/2008 |
|---|---|---|
| WO | 2009129086 | 10/2009 |
| WO | 2010007214 | 1/2010 |
| WO | WO 2013037824 | 3/2013 |
| WO | WO 2015040125 | 3/2015 |
| WO | 2016003795 | 1/2016 |
| WO | WO 2017052463 | 3/2017 |
| WO | WO 2017134274 | 8/2017 |

OTHER PUBLICATIONS

Derrien, M., "Mucin Utilisation and Host Interactions of the Novel Intestinal Microbe Akkermansia muciniphila", Ph.D. Thesis, Wageningen University, 2007 (Year: 2007).*
Chen et al., Invertebrate Survival J. 13:76-88, 2016 (Year: 2016).*
Lakshmanan et al., Supporting Information for "Molecular Engineering of Acoustic Protein Nanostructures", 2016, 9 pages (Year: 2016).*
GenBank Database Accession No. KEQ49567, Jul. 2014, 2 pages (Year: 2014).*
Zhang et al., Structure 26:1474-1485, 2018 (Year: 2018).*
Foley et al., "SequencesfromtheFirst Fibronectin Type III Repeat of the Neural Cell Adhesion Molecule Allow O-Glycan Polysialylation of an Adhesion Molecule Chimera," JBC 285:35056-35067, 2010 (Year: 2010).*
Smutova et al., "StructuralBasisforSubstrateSpecificityofMammalian Neuraminidases," PLoS ONE 9:e106320, 2014 (Year: 2014).*
Caputo et al. (2015) "Whole-genome assembly of Akkermansia muciniphila sequenced directly from human stool." Biol. Direct., 10(5):1-11.
Database EMBL [Online], May 6, 2008, "Akkermansia muciniphila Atcc BAA-835 hypothetical protein", retrieved from EBI accession No. ACD04945 Database accession No. ACD04945.
Database UniProt [Online], Jul. 1, 2008, "SubName: Full=Exo-alpha-sialidase {ECO:0000313|EMBL:ACD04462.1}; EC=3.2.1. 18 {ECO:0000313|EMBL:ACD04462.1};", retrieved from EBI accession No. Uniprot: B2UPI5, Database accession No. B2UPI5.
Database UniProt [Online], Jul. 1, 2008, "SubName: Full= Uncharacterized protein {ECO:0000313| EMBL: ACD05368.1};", retrieved from EBI accession No. UNIPROT:B2ULI1, Database accession No. B2ULI1.
Database UniProt [Online], Oct. 29, 2014, "RecName: Full=Serine protease {ECO:0000256|RuleBase: RU004296}; EC=3.4.21.- {ECO: 0000256|RuleBase:RU004296};", retrieved from EBI accession No. UNIPROT: A0A081R2Z4, Database accession No. A0A081R2Z4.
Huang et al. (2015) "Biochemical characterisation of the neuraminidase pool of the human gut symbiont Akkermansia muciniphila" Carbohydrate Research, 415:60-65.
Juge et al. (2016) "Sialidases from gut bacteria: a mini-review" Biochem Soc Transactions, 44:166-175.

(Continued)

*Primary Examiner* — David Steadman
(74) *Attorney, Agent, or Firm* — Brian E. Davy; Bozicevic, Field & Francis LLP

(57) ABSTRACT

The present invention relates to enzymes and combinations thereof useful for studying glycoproteins, and corresponding methods of use. In particular, the invention relates to a sialidase composition comprising an additional protease and/or glycosidase, preferably an O-glycoprotein-specific endoprotease and/or an O-glycosidase.

9 Claims, 17 Drawing Sheets

Specification includes a Sequence Listing.

(56) References Cited

OTHER PUBLICATIONS

Lucas et al. (2013) "Akkermansia muciniphila ATCC BAA-835, complete genome" Genbank accession No. CP001071.1, NCBI website.

Magnelli et al. (2011) "Identification and characterization of protein glycosylation using specific endo- and exoglycosidases" Journal of Visualized Experiments, 58:1-5.

Van Passel et al. (2011) "The Genome of Akkermansia muciniphila, a Dedicated Intestinal Mucin Degrader, and Its Use in Exploring Intestinal Metagenomes" Plos One, 6(3):1-8.

Database UniProtKB, May 10, 2017, Accession No. B5UB72 (version 22).

Hang et al. (2015) "Advance in Recent Research on Bacterial Metalloproteases" Industrial Microbiology, 45(6):53-60.

Vazeux et al. (1996) "Identification of Glutamate Residues Essential for Catalytic Activity and Zinc Coordination in Aminopeptidase A" Journal of Biological Chemistry, 271(15):9069-9074.

Abdullah et al. (1991) "Cloning, Nucleotide Sequence, and Expression of the Pasteurella haemolytica Al Glycoprotease Gene" J. Bacteriol., 173(18):5597-5603.

Abdullah et al. (1992) "A Neutral Glycoprotease of Pasteurella haemolytica Al Specifically Cleaves O-Sialoglycoproteins" Infect. Immun., 60:56-62.

Altschul et al. (1990) "Basic local alignment search tool" J Mol Biol 215:403-10.

Altschul (1993) "A Protein Alignment Scoring System Sensitive at All Evolutionary Distances" J Mol Evol 36:290-300.

"Database UniProt [Online] Jul. 1, 2008, "SubName: Full= Uncharacterized protein {EC0:0000313 EMBL:ACD04945.1 };"", XP55755394, retrieved from EBI accession No. UNIPROT:B2UR60.

Datta et al. (2013) "Enzyme immobilization: an overview on techniques and support materials" 3 Biotech, 3(1):1-9.

Debray et al. (2006) "Glycoprotein Analysis: General Methods" Encyclopedia of Analytical Chemistry, John Wiley & Sons, Ltd, pp. 6-17.

Devereux et al. (1984) "A comprehensive set of sequence analysis programs for the VAX" Nucleic Acids Research 12, 387-395.

Examination Report dated Dec. 8, 2020, EP18728576.2, 5 pp.

Henikoff (1992) "Amino acid substitution matrices from protein blocks" Proc. Nat. Acad Sci. USA 89:10915-10919.

Karlin and Altschul (1993) "Applications and statistics for multiple high-scoring segments in molecular sequences" Proc. Nat. Acad Sci. USA 90:5873-5787.

Lee et al. (2015) "rbCLCA1 is a putative metalloprotease family member: localization and catalytic domain identification" Amino Acids, Springer Verlag, AU, 48(3):707-720.

Nakjang et al. (2012) "A Novel Extracellular Metallopeptidase Domain Shared by Animal Host-Associated Mutualistic and Pathogenic Microbes" PLos One, 7:e30287, pp. 1-18.

NCBI (2021) BT _ 4244 [Bacteroides thetaiotaomicron], https://www.ncbi.nlm.nih.gov/protein/NP_813155.1?report=genpept, pp. 1-2.

Noach et al. (2017) "Recognition of protein-linked glycans as a determinant of peptidase activity" PNAS, pE679-E688 and supporting appendices.

Rawlings et al. (1995) "Evolutionary Families of Metallopeptidases", Methods in Enzymology, Academic Press, US, 248:183-228.

Sambrook et al. (1989) Molecular Cloning—a laboratory manual; Cold Spring Harbor Press. 30 pp.

Tarp et al. (2007) "Identification of a novel cancer-specific immunodominant glycopeptide epitope in the MUC1 tandem repeat" Glycobiol., 17(2):197-209.

NCBI Reference Sequence WP 012420160.1, 'hypothetical protein (*Akkermansia muciniphila*)', 2013.07.12. 1 page.

\* cited by examiner

Fig. 3
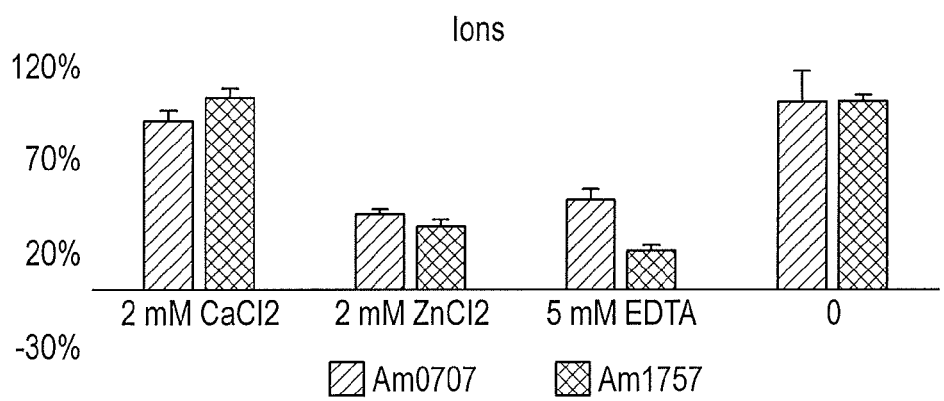
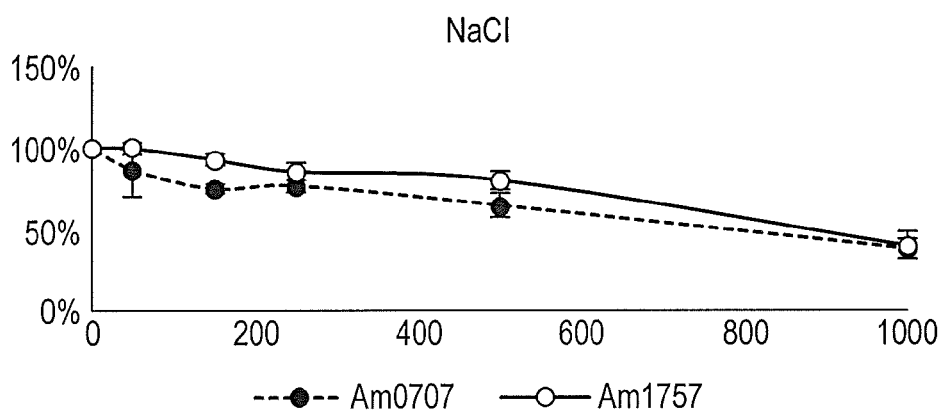
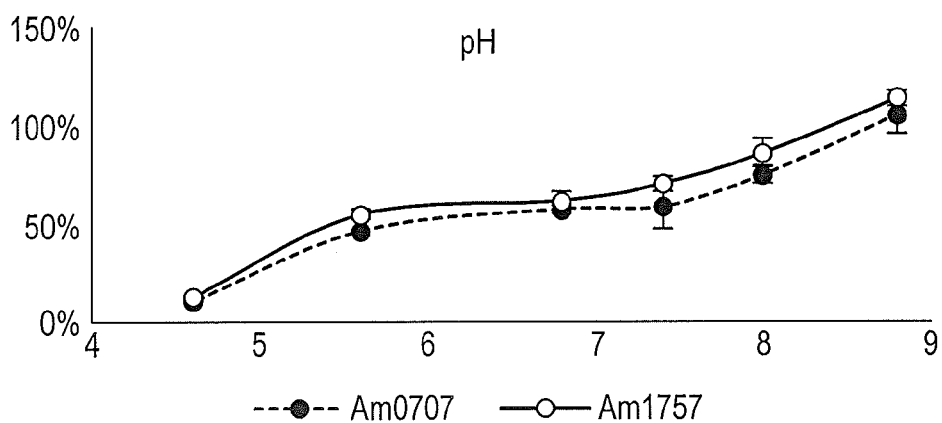

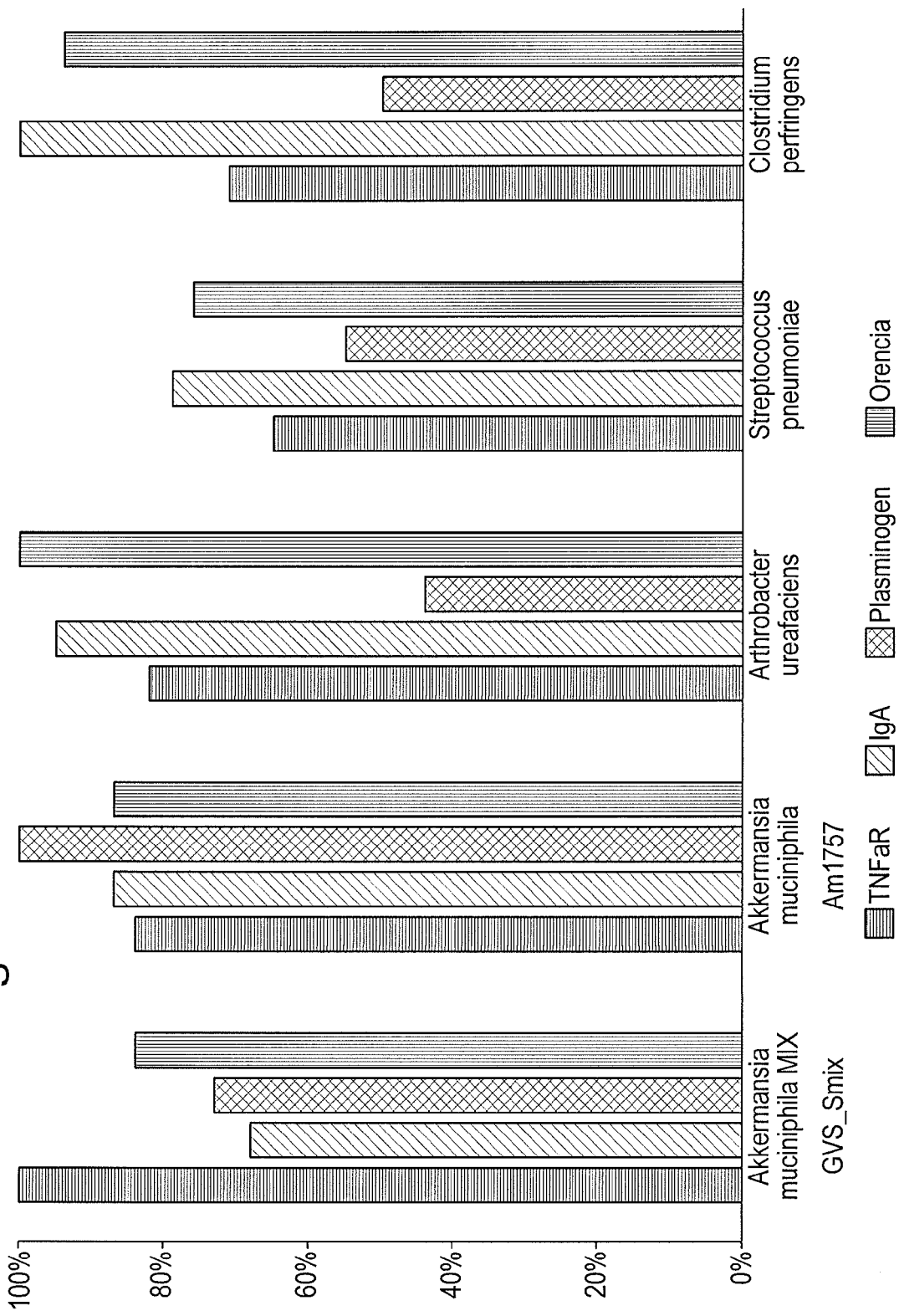

Fig. 15
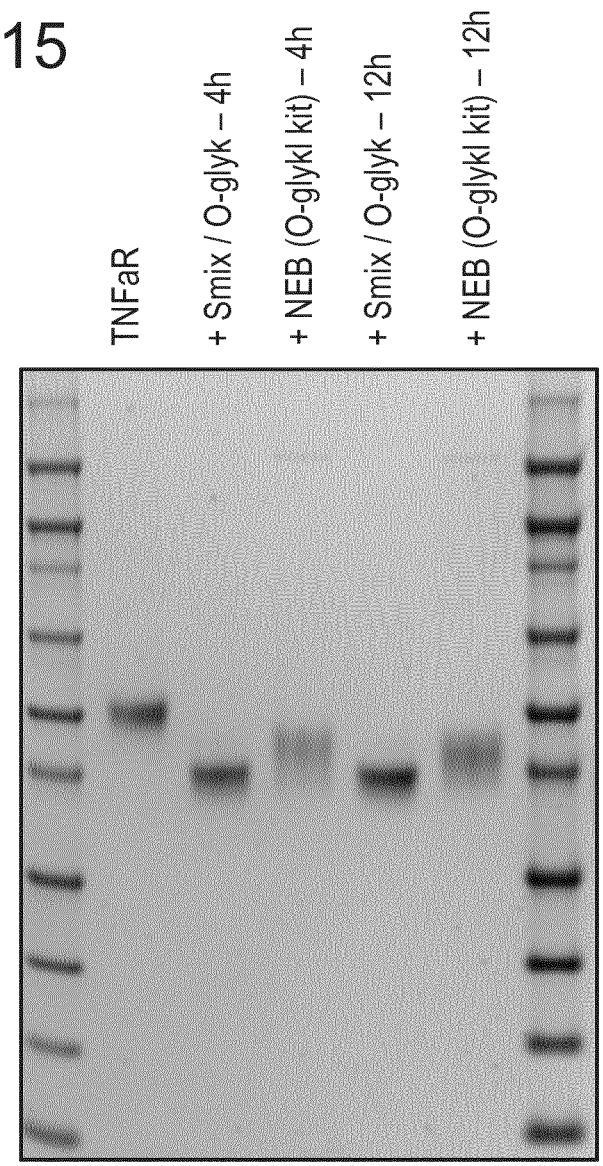
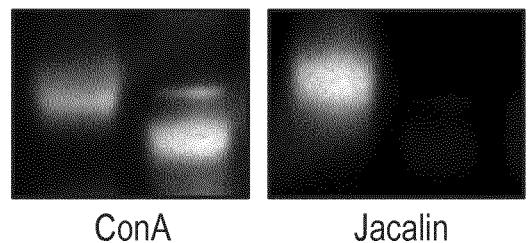

SEQUENCE LISTING

<160> NUMBER OF SEQ ID NOS: 13

<210> SEQ ID NO 1
<211> LENGTH: 419
<212> TYPE: PRT
<213> ORGANISM: Akkermansia muciniphila

<400> SEQUENCE: 1

Met Thr Trp Leu Leu Cys Gly Arg Gly Lys Trp Asn Lys Val Lys Arg
1               5                   10                  15

Met Met Asn Ser Val Phe Lys Cys Leu Met Ser Ala Val Cys Ala Val
            20                  25                  30

Ala Leu Pro Ala Phe Gly Gln Glu Glu Lys Thr Gly Phe Pro Thr Asp
        35                  40                  45

Arg Ala Val Thr Val Phe Ser Ala Gly Glu Gly Asn Pro Tyr Ala Ser
    50                  55                  60

Ile Arg Ile Pro Ala Leu Leu Ser Ile Gly Lys Gly Gln Leu Leu Ala
65                  70                  75                  80

Phe Ala Glu Gly Arg Tyr Lys Asn Thr Asp Gln Gly Glu Asn Asp Ile
                85                  90                  95

Ile Met Ser Val Ser Lys Asn Gly Gly Lys Thr Trp Ser Arg Pro Arg
            100                 105                 110

Ala Ile Ala Lys Ala His Gly Ala Thr Phe Asn Asn Pro Cys Pro Val
        115                 120                 125

Tyr Asp Ala Lys Thr Arg Thr Val Thr Val Val Phe Gln Arg Tyr Pro
    130                 135                 140

Ala Gly Val Lys Glu Arg Gln Pro Asn Ile Pro Asp Gly Trp Asp Asp
145                 150                 155                 160

Glu Lys Cys Ile Arg Asn Phe Met Ile Gln Ser Arg Asn Gly Gly Ser
                165                 170                 175

Ser Trp Thr Lys Pro Gln Glu Ile Thr Lys Thr Thr Lys Arg Pro Ser
            180                 185                 190

Gly Val Asp Ile Met Ala Ser Gly Pro Asn Ala Gly Thr Gln Leu Lys
        195                 200                 205

Ser Gly Ala His Lys Gly Arg Leu Val Ile Pro Met Asn Glu Gly Pro
    210                 215                 220

Phe Gly Lys Trp Val Ile Ser Cys Ile Tyr Ser Asp Asp Gly Lys
225                 230                 235                 240

Ser Trp Lys Leu Gly Gln Pro Thr Ala Asn Met Lys Gly Met Val Asn
                245                 250                 255

Glu Thr Ser Ile Ala Glu Thr Asp Asn Gly Val Val Met Val Ala
            260                 265                 270

Arg His Trp Gly Ala Gly Asn Cys Arg Arg Ile Ala Trp Ser Gln Asp
        275                 280                 285

Gly Gly Glu Thr Trp Gly Gln Val Glu Asp Ala Pro Glu Leu Phe Cys
    290                 295                 300

```
Asp Ser Thr Gln Asn Ser Leu Met Thr Tyr Ser Leu Ser Asp Gln Pro
305                 310                 315                 320

Ala Tyr Gly Gly Lys Ser Arg Ile Leu Phe Ser Gly Pro Ser Ala Gly
                325                 330                 335

Arg Arg Ile Lys Gly Gln Val Ala Met Ser Tyr Asp Asn Gly Lys Thr
            340                 345                 350

Trp Pro Val Lys Lys Leu Leu Gly Glu Gly Gly Phe Ala Tyr Ser Ser
                355                 360                 365

Leu Ala Met Val Glu Pro Gly Ile Val Gly Val Leu Tyr Glu Glu Asn
            370                 375                 380

Gln Glu His Ile Lys Lys Leu Lys Phe Val Pro Ile Thr Met Glu Trp
385                 390                 395                 400

Leu Thr Asp Gly Glu Asp Thr Gly Leu Ala Pro Gly Lys Lys Ala Pro
                405                 410                 415

Val Leu Lys

<210> SEQ ID NO 2
<211> LENGTH: 381
<212> TYPE: PRT
<213> ORGANISM: Akkermansia muciniphila

<400> SEQUENCE: 2

Gln Glu Glu Lys Thr Gly Phe Pro Thr Asp Arg Ala Val Thr Val Phe
1               5                   10                  15

Ser Ala Gly Glu Gly Asn Pro Tyr Ala Ser Ile Arg Ile Pro Ala Leu
                20                  25                  30

Leu Ser Ile Gly Lys Gly Gln Leu Leu Ala Phe Ala Glu Gly Arg Tyr
            35                  40                  45

Lys Asn Thr Asp Gln Gly Glu Asn Asp Ile Ile Met Ser Val Ser Lys
50                  55                  60

Asn Gly Gly Lys Thr Trp Ser Arg Pro Arg Ala Ile Ala Lys Ala His
65                  70                  75                  80

Gly Ala Thr Phe Asn Asn Pro Cys Pro Val Tyr Asp Ala Lys Thr Arg
                85                  90                  95

Thr Val Thr Val Val Phe Gln Arg Tyr Pro Ala Gly Val Lys Glu Arg
            100                 105                 110

Gln Pro Asn Ile Pro Asp Gly Trp Asp Asp Glu Lys Cys Ile Arg Asn
        115                 120                 125

Phe Met Ile Gln Ser Arg Asn Gly Gly Ser Ser Trp Thr Lys Pro Gln
130                 135                 140

Glu Ile Thr Lys Thr Thr Lys Arg Pro Ser Gly Val Asp Ile Met Ala
145                 150                 155                 160

Ser Gly Pro Asn Ala Gly Thr Gln Leu Lys Ser Gly Ala His Lys Gly
                165                 170                 175

Arg Leu Val Ile Pro Met Asn Glu Gly Pro Phe Gly Lys Trp Val Ile
            180                 185                 190

Ser Cys Ile Tyr Ser Asp Asp Gly Lys Ser Trp Lys Leu Gly Gln
        195                 200                 205

Pro Thr Ala Asn Met Lys Gly Met Val Asn Glu Thr Ser Ile Ala Glu
    210                 215                 220

Thr Asp Asn Gly Gly Val Val Met Val Ala Arg His Trp Gly Ala Gly
225                 230                 235                 240

Asn Cys Arg Arg Ile Ala Trp Ser Gln Asp Gly Gly Glu Thr Trp Gly
                245                 250                 255
```

```
Gln Val Glu Asp Ala Pro Glu Leu Phe Cys Asp Ser Thr Gln Asn Ser
            260                 265                 270

Leu Met Thr Tyr Ser Leu Ser Asp Gln Pro Ala Tyr Gly Gly Lys Ser
        275                 280                 285

Arg Ile Leu Phe Ser Gly Pro Ser Ala Gly Arg Arg Ile Lys Gly Gln
    290                 295                 300

Val Ala Met Ser Tyr Asp Asn Gly Lys Thr Trp Pro Val Lys Lys Leu
305                 310                 315                 320

Leu Gly Glu Gly Gly Phe Ala Tyr Ser Ser Leu Ala Met Val Glu Pro
                325                 330                 335

Gly Ile Val Gly Val Leu Tyr Glu Glu Asn Gln Glu His Ile Lys Lys
            340                 345                 350

Leu Lys Phe Val Pro Ile Thr Met Glu Trp Leu Thr Asp Gly Glu Asp
        355                 360                 365

Thr Gly Leu Ala Pro Gly Lys Lys Ala Pro Val Leu Lys
    370                 375                 380

<210> SEQ ID NO 3
<211> LENGTH: 393
<212> TYPE: PRT
<213> ORGANISM: Artificial Sequence
<220> FEATURE:
<223> OTHER INFORMATION: sialidase, Am0707 - with additional N terminal
      methionine and C terminal linker + His6 tag

<400> SEQUENCE: 3

Met Gln Glu Glu Lys Thr Gly Phe Pro Thr Asp Arg Ala Val Thr Val
1               5                   10                  15

Phe Ser Ala Gly Glu Gly Asn Pro Tyr Ala Ser Ile Arg Ile Pro Ala
                20                  25                  30

Leu Leu Ser Ile Gly Lys Gly Gln Leu Leu Ala Phe Ala Glu Gly Arg
            35                  40                  45

Tyr Lys Asn Thr Asp Gln Gly Glu Asn Asp Ile Ile Met Ser Val Ser
50                  55                  60

Lys Asn Gly Gly Lys Thr Trp Ser Arg Pro Arg Ala Ile Ala Lys Ala
65                  70                  75                  80

His Gly Ala Thr Phe Asn Asn Pro Cys Pro Val Tyr Asp Ala Lys Thr
                85                  90                  95

Arg Thr Val Thr Val Phe Arg Tyr Pro Ala Gly Val Lys Glu
                100                 105                 110

Arg Gln Pro Asn Ile Pro Asp Gly Trp Asp Asp Glu Lys Cys Ile Arg
            115                 120                 125

Asn Phe Met Ile Gln Ser Arg Asn Gly Gly Ser Ser Trp Thr Lys Pro
130                 135                 140

Gln Glu Ile Thr Lys Thr Thr Lys Arg Pro Ser Gly Val Asp Ile Met
145                 150                 155                 160

Ala Ser Gly Pro Asn Ala Gly Thr Gln Leu Lys Ser Gly Ala His Lys
                165                 170                 175

Gly Arg Leu Val Ile Pro Met Asn Glu Gly Pro Phe Gly Lys Trp Val
            180                 185                 190

Ile Ser Cys Ile Tyr Ser Asp Asp Gly Lys Ser Trp Lys Leu Gly
            195                 200                 205

Gln Pro Thr Ala Asn Met Lys Gly Met Val Asn Glu Thr Ser Ile Ala
    210                 215                 220

Glu Thr Asp Asn Gly Gly Val Val Met Val Ala Arg His Trp Gly Ala
225                 230                 235                 240
```

-continued

Gly Asn Cys Arg Arg Ile Ala Trp Ser Gln Asp Gly Glu Thr Trp
                245                 250                 255

Gly Gln Val Glu Asp Ala Pro Glu Leu Phe Cys Asp Ser Thr Gln Asn
            260                 265                 270

Ser Leu Met Thr Tyr Ser Leu Ser Asp Gln Pro Ala Tyr Gly Gly Lys
        275                 280                 285

Ser Arg Ile Leu Phe Ser Gly Pro Ser Ala Gly Arg Arg Ile Lys Gly
    290                 295                 300

Gln Val Ala Met Ser Tyr Asp Asn Gly Lys Thr Trp Pro Val Lys Lys
305                 310                 315                 320

Leu Leu Gly Glu Gly Gly Phe Ala Tyr Ser Ser Leu Ala Met Val Glu
                325                 330                 335

Pro Gly Ile Val Gly Val Leu Tyr Glu Glu Asn Gln Glu His Ile Lys
            340                 345                 350

Lys Leu Lys Phe Val Pro Ile Thr Met Glu Trp Leu Thr Asp Gly Glu
        355                 360                 365

Asp Thr Gly Leu Ala Pro Gly Lys Lys Ala Pro Val Leu Lys Gly Ser
    370                 375                 380

Gly Leu Glu His His His His His His
385                 390

<210> SEQ ID NO 4
<211> LENGTH: 595
<212> TYPE: PRT
<213> ORGANISM: Akkermansia muciniphila

<400> SEQUENCE: 4

Met Lys Asn Leu Leu Phe Ala Leu Leu Thr Gly Ser Phe Cys Cys Cys
1               5                   10                  15

Tyr Ala Gln Gln Lys Ala Ala Pro Val Pro Glu Pro Glu Val Val Ala
            20                  25                  30

Thr Pro Pro Ala Asp Ala Gly Arg Gly Leu Ile Arg Val Asp Ser Arg
        35                  40                  45

Glu Ile Arg His Tyr Ser Gly Thr Arg Lys Glu Pro Asp Tyr Leu Val
    50                  55                  60

Ser Arg Asp Asn Gly Lys Thr Trp Glu Met Lys Ala Ala Pro Ala Gly
65                  70                  75                  80

Tyr Pro Pro Asn Tyr Gly Gly Ile Pro Lys Glu Ser Pro Ala Ile Val
                85                  90                  95

Arg Asn Pro Leu Thr Arg Glu Phe Ile Arg Val Gln Pro Ile Gly Gly
            100                 105                 110

Phe Val Phe Leu Ser Arg Gly Gly Leu Asp Gly Lys Trp Leu Ala Val
        115                 120                 125

Thr Asn Asp Gly Lys Leu Glu Glu Asp Trp Lys Asp Pro Glu Lys Arg
    130                 135                 140

Lys Asn Leu Lys Lys Leu Gly Gly Ile Met Arg Thr Pro Val Phe Val
145                 150                 155                 160

Asn Lys Gly Arg Arg Val Ile Val Pro Phe His Asn Met Gly Gly Gly
                165                 170                 175

Thr Lys Phe His Ile Ser Asp Asp Gly Gly Leu Thr Trp His Val Ser
            180                 185                 190

Arg Asn Gly Val Thr Ser Pro Arg His Glu Ala Arg Pro Pro His Gln
        195                 200                 205

Gly Val Arg Trp Phe Asn Asn Ala Val Glu Ala Thr Val Leu Glu Met

```
            210                 215                 220
Lys Asp Gly Thr Leu Trp Ala Leu Ala Arg Thr Ser Gln Asp Gln Ala
225                 230                 235                 240

Trp Gln Ala Phe Ser Lys Asp Tyr Gly Glu Thr Trp Ser Lys Pro Glu
                245                 250                 255

Pro Ser Arg Phe Phe Gly Thr Leu Thr Met Asn Thr Leu Gly Arg Leu
                260                 265                 270

Asp Asp Gly Thr Ile Val Ser Leu Trp Thr Asn Thr Met Ala Leu Pro
            275                 280                 285

Glu Asn Ala Thr Ala Gly Asn Gly Thr Trp Glu Asp Val Phe Thr Asn
290                 295                 300

Arg Asp Ser His His Ile Ala Met Ser Gly Asp Glu Gly Lys Thr Trp
305                 310                 315                 320

Tyr Gly Phe Arg Glu Ile Ile Leu Asp Glu His Arg Asn His Pro Gly
                325                 330                 335

Tyr Ala Thr Leu Asp Gly Pro Glu Asp Arg Gly Lys His Gln Ser Glu
                340                 345                 350

Met Val Gln Leu Asp Lys Asn Arg Ile Leu Ile Ser Leu Gly Gln His
            355                 360                 365

Lys Asn His Arg Arg Leu Val Ile Val Asp Arg Arg Trp Val Gly Ala
370                 375                 380

Lys Thr Arg Ala Thr Gln Thr Gly Lys Asp Leu Asp Ser Gln Trp Thr
385                 390                 395                 400

Ile His Thr Tyr Ile Pro Gln Lys Lys Gly His Cys Ser Tyr Asn Arg
                405                 410                 415

Lys Pro Ser Ala Glu Leu Val Gln Asp Pro Ser Gly Gly Thr Lys Lys
                420                 425                 430

Val Leu Gln Ile Lys Arg Leu Asp Asp Pro Glu Leu Val Asn Glu Lys
            435                 440                 445

Ser Asn Val Asp Tyr Arg Asn Gly Gly Ala Thr Trp Asn Phe Pro Asn
450                 455                 460

Gly Thr Thr Gly Leu Val Lys Phe Arg Phe Arg Val Val Asp Gly Glu
465                 470                 475                 480

Gln Ala Asp Asp Ser Gly Leu Gln Val Ser Leu Thr Asp Arg Leu Phe
                485                 490                 495

Asn Ala Cys Asp Ser Thr Thr Lys Asp Tyr Ala Leu Phe Thr Phe Pro
                500                 505                 510

Ile Arg Leu Lys Pro Ala Pro His Leu Leu Gly Met Lys Lys Val
            515                 520                 525

Pro Phe Thr Pro Gly Ala Trp His Glu Ile Ser Leu Leu Trp Gln Gly
530                 535                 540

Gly Gln Ala Val Val Ser Leu Asp Gly Lys Lys Ala Gly Thr Leu Lys
545                 550                 555                 560

Met Ala Asn Lys Ser Pro Asn Gly Ala Ser Tyr Ile His Phe Ile Ser
                565                 570                 575

Thr Gly Ser Gln Pro Asp Ala Gly Ile Leu Leu Asp Thr Val Asn Ala
            580                 585                 590

Arg Val Lys
        595

<210> SEQ ID NO 5
<211> LENGTH: 577
<212> TYPE: PRT
<213> ORGANISM: Akkermansia muciniphila
```

<400> SEQUENCE: 5

```
Gln Gln Lys Ala Ala Pro Val Pro Glu Pro Glu Val Val Ala Thr Pro
1               5                   10                  15
Pro Ala Asp Ala Gly Arg Gly Leu Ile Arg Val Asp Ser Arg Glu Ile
                20                  25                  30
Arg His Tyr Ser Gly Thr Arg Lys Glu Pro Asp Tyr Leu Val Ser Arg
            35                  40                  45
Asp Asn Gly Lys Thr Trp Glu Met Lys Ala Ala Pro Ala Gly Tyr Pro
        50                  55                  60
Pro Asn Tyr Gly Gly Ile Pro Lys Glu Ser Pro Ala Ile Val Arg Asn
65                  70                  75                  80
Pro Leu Thr Arg Glu Phe Ile Arg Val Gln Pro Ile Gly Gly Phe Val
                85                  90                  95
Phe Leu Ser Arg Gly Gly Leu Asp Gly Lys Trp Leu Ala Val Thr Asn
                100                 105                 110
Asp Gly Lys Leu Glu Glu Asp Trp Lys Asp Pro Glu Lys Arg Lys Asn
            115                 120                 125
Leu Lys Lys Leu Gly Gly Ile Met Arg Thr Pro Val Phe Val Asn Lys
130                 135                 140
Gly Arg Arg Val Ile Val Pro Phe His Asn Met Gly Gly Thr Lys
145                 150                 155                 160
Phe His Ile Ser Asp Asp Gly Gly Leu Thr Trp His Val Ser Arg Asn
                165                 170                 175
Gly Val Thr Ser Pro Arg His Glu Ala Arg Pro Pro His Gln Gly Val
                180                 185                 190
Arg Trp Phe Asn Asn Ala Val Glu Ala Thr Val Leu Glu Met Lys Asp
            195                 200                 205
Gly Thr Leu Trp Ala Leu Ala Arg Thr Ser Gln Asp Gln Ala Trp Gln
        210                 215                 220
Ala Phe Ser Lys Asp Tyr Gly Glu Thr Trp Ser Lys Pro Glu Pro Ser
225                 230                 235                 240
Arg Phe Phe Gly Thr Leu Thr Met Asn Thr Leu Gly Arg Leu Asp Asp
                245                 250                 255
Gly Thr Ile Val Ser Leu Trp Thr Asn Thr Met Ala Leu Pro Glu Asn
                260                 265                 270
Ala Thr Ala Gly Asn Gly Thr Trp Glu Asp Val Phe Thr Asn Arg Asp
            275                 280                 285
Ser His His Ile Ala Met Ser Gly Asp Glu Gly Lys Thr Trp Tyr Gly
        290                 295                 300
Phe Arg Glu Ile Ile Leu Asp Glu His Arg Asn His Pro Gly Tyr Ala
305                 310                 315                 320
Thr Leu Asp Gly Pro Glu Asp Arg Gly Lys His Gln Ser Glu Met Val
                325                 330                 335
Gln Leu Asp Lys Asn Arg Ile Leu Ile Ser Leu Gly Gln His Lys Asn
                340                 345                 350
His Arg Arg Leu Val Ile Val Asp Arg Arg Trp Val Gly Ala Lys Thr
            355                 360                 365
Arg Ala Thr Gln Thr Gly Lys Asp Leu Asp Ser Gln Trp Thr Ile His
        370                 375                 380
Thr Tyr Ile Pro Gln Lys Lys Gly His Cys Ser Tyr Asn Arg Lys Pro
385                 390                 395                 400
Ser Ala Glu Leu Val Gln Asp Pro Ser Gly Gly Thr Lys Lys Val Leu
```

```
            405                 410                 415
Gln Ile Lys Arg Leu Asp Asp Pro Glu Leu Val Asn Glu Lys Ser Asn
        420                 425                 430

Val Asp Tyr Arg Asn Gly Gly Ala Thr Trp Asn Phe Pro Asn Gly Thr
    435                 440                 445

Thr Gly Leu Val Lys Phe Arg Phe Val Val Asp Gly Glu Gln Ala
450                 455                 460

Asp Asp Ser Gly Leu Gln Val Ser Leu Thr Asp Arg Leu Phe Asn Ala
465                 470                 475                 480

Cys Asp Ser Thr Thr Lys Asp Tyr Ala Leu Phe Thr Phe Pro Ile Arg
                485                 490                 495

Leu Lys Pro Ala Pro His Leu Leu Leu Gly Met Lys Lys Val Pro Phe
            500                 505                 510

Thr Pro Gly Ala Trp His Glu Ile Ser Leu Leu Trp Gln Gly Gly Gln
            515                 520                 525

Ala Val Val Ser Leu Asp Gly Lys Lys Ala Gly Thr Leu Lys Met Ala
        530                 535                 540

Asn Lys Ser Pro Asn Gly Ala Ser Tyr Ile His Phe Ile Ser Thr Gly
545                 550                 555                 560

Ser Gln Pro Asp Ala Gly Ile Leu Leu Asp Thr Val Asn Ala Arg Val
                565                 570                 575

Lys

<210> SEQ ID NO 6
<211> LENGTH: 589
<212> TYPE: PRT
<213> ORGANISM: Artificial Sequence
<220> FEATURE:
<223> OTHER INFORMATION: sialidase, Am1757 - with additional N terminal
      methionine and C terminal linker + His6 tag

<400> SEQUENCE: 6

Met Gln Gln Lys Ala Ala Pro Val Pro Glu Pro Glu Val Val Ala Thr
1               5                   10                  15

Pro Pro Ala Asp Ala Gly Arg Gly Leu Ile Arg Val Asp Ser Arg Glu
            20                  25                  30

Ile Arg His Tyr Ser Gly Thr Arg Lys Glu Pro Asp Tyr Leu Val Ser
        35                  40                  45

Arg Asp Asn Gly Lys Thr Trp Glu Met Lys Ala Ala Pro Ala Gly Tyr
50                  55                  60

Pro Pro Asn Tyr Gly Gly Ile Pro Lys Glu Ser Pro Ala Ile Val Arg
65                  70                  75                  80

Asn Pro Leu Thr Arg Glu Phe Ile Arg Val Gln Pro Ile Gly Gly Phe
                85                  90                  95

Val Phe Leu Ser Arg Gly Gly Leu Asp Gly Lys Trp Leu Ala Val Thr
            100                 105                 110

Asn Asp Gly Lys Leu Glu Glu Asp Trp Lys Asp Pro Glu Lys Arg Lys
        115                 120                 125

Asn Leu Lys Lys Leu Gly Gly Ile Met Arg Thr Pro Val Phe Val Asn
    130                 135                 140

Lys Gly Arg Arg Val Ile Val Pro Phe His Asn Met Gly Gly Gly Thr
145                 150                 155                 160

Lys Phe His Ile Ser Asp Asp Gly Gly Leu Thr Trp His Val Ser Arg
                165                 170                 175

Asn Gly Val Thr Ser Pro Arg His Glu Ala Arg Pro Pro His Gln Gly
```

-continued

```
                180                 185                 190
Val Arg Trp Phe Asn Asn Ala Val Glu Ala Thr Val Leu Glu Met Lys
            195                 200                 205
Asp Gly Thr Leu Trp Ala Leu Ala Arg Thr Ser Gln Asp Gln Ala Trp
        210                 215                 220
Gln Ala Phe Ser Lys Asp Tyr Gly Glu Thr Trp Ser Lys Pro Glu Pro
225                 230                 235                 240
Ser Arg Phe Phe Gly Thr Leu Thr Met Asn Thr Leu Gly Arg Leu Asp
                245                 250                 255
Asp Gly Thr Ile Val Ser Leu Trp Thr Asn Thr Met Ala Leu Pro Glu
            260                 265                 270
Asn Ala Thr Ala Gly Asn Gly Thr Trp Glu Asp Val Phe Thr Asn Arg
        275                 280                 285
Asp Ser His His Ile Ala Met Ser Gly Asp Glu Gly Lys Thr Trp Tyr
290                 295                 300
Gly Phe Arg Glu Ile Ile Leu Asp Glu His Arg Asn His Pro Gly Tyr
305                 310                 315                 320
Ala Thr Leu Asp Gly Pro Glu Asp Arg Gly Lys His Gln Ser Glu Met
                325                 330                 335
Val Gln Leu Asp Lys Asn Arg Ile Leu Ile Ser Leu Gly Gln His Lys
            340                 345                 350
Asn His Arg Arg Leu Val Ile Val Asp Arg Arg Trp Val Gly Ala Lys
        355                 360                 365
Thr Arg Ala Thr Gln Thr Gly Lys Asp Leu Asp Ser Gln Trp Thr Ile
370                 375                 380
His Thr Tyr Ile Pro Gln Lys Lys Gly His Cys Ser Tyr Asn Arg Lys
385                 390                 395                 400
Pro Ser Ala Glu Leu Val Gln Asp Pro Ser Gly Thr Lys Lys Val
                405                 410                 415
Leu Gln Ile Lys Arg Leu Asp Asp Pro Glu Leu Val Asn Glu Lys Ser
            420                 425                 430
Asn Val Asp Tyr Arg Asn Gly Gly Ala Thr Trp Asn Phe Pro Asn Gly
        435                 440                 445
Thr Thr Gly Leu Val Lys Phe Arg Phe Arg Val Val Asp Gly Glu Gln
    450                 455                 460
Ala Asp Asp Ser Gly Leu Gln Val Ser Leu Thr Asp Arg Leu Phe Asn
465                 470                 475                 480
Ala Cys Asp Ser Thr Thr Lys Asp Tyr Ala Leu Phe Thr Phe Pro Ile
                485                 490                 495
Arg Leu Lys Pro Ala Pro His Leu Leu Gly Met Lys Lys Val Pro
            500                 505                 510
Phe Thr Pro Gly Ala Trp His Glu Ile Ser Leu Leu Trp Gln Gly Gly
        515                 520                 525
Gln Ala Val Val Ser Leu Asp Gly Lys Lys Ala Gly Thr Leu Lys Met
    530                 535                 540
Ala Asn Lys Ser Pro Asn Gly Ala Ser Tyr Ile His Phe Ile Ser Thr
545                 550                 555                 560
Gly Ser Gln Pro Asp Ala Gly Ile Leu Leu Asp Thr Val Asn Ala Arg
                565                 570                 575
Val Lys Gly Ser Gly Leu Glu His His His His His His
            580                 585
```

<210> SEQ ID NO 7

<211> LENGTH: 2122
<212> TYPE: PRT
<213> ORGANISM: Streptococcus oralis

<400> SEQUENCE: 7

```
Met Asp Lys Arg Phe Phe Glu Lys Arg Cys Lys Phe Ser Ile Arg Lys
1               5                   10                  15

Phe Thr Leu Gly Val Ala Ser Val Met Ile Gly Ala Thr Phe Phe Ala
            20                  25                  30

Ala Ser Pro Val Leu Ala Asp Gln Ala Arg Val Gly Ser Thr Asp Asn
        35                  40                  45

Leu Pro Ser Glu Leu Ala Asp Leu Asp Lys Lys Ala Ser Asp Glu Gly
    50                  55                  60

His Asp Phe Asp Lys Glu Ala Ala Gln Asn Pro Gly Ser Ala Glu
65                  70                  75                  80

Thr Thr Glu Gly Pro Gln Thr Glu Glu Leu Leu Ala Gln Glu Lys
                85                  90                  95

Glu Lys Ser Glu Lys Pro Ser Asn Leu Pro Lys Glu Leu Glu Asp Lys
            100                 105                 110

Leu Glu Lys Ala Glu Asp Asn Gly Arg Glu Val Asp Lys Asp Gln Leu
        115                 120                 125

Ala Gln Asp Thr Gly Lys Leu Val Pro Glu Asp Val Ala Lys Thr Thr
    130                 135                 140

Asn Gly Glu Leu Asn Tyr Gly Ala Thr Val Lys Ile Lys Thr Pro Ser
145                 150                 155                 160

Gly Glu Gly Ser Gly Ile Val Val Ala Lys Asp Leu Val Leu Thr Val
                165                 170                 175

Ser His Asn Phe Ile Lys Asp Ser Gln Glu Gly Asn Ile Arg Lys Val
            180                 185                 190

Val Asp Asn Asp Gln Gly Asp Gly Asp Ile Tyr Ser Ile Ser Tyr Pro
        195                 200                 205

Gly Leu Pro Asp Val Lys Phe Ser Lys Lys Asp Ile Ile His Trp Asp
    210                 215                 220

Arg Glu Gly Tyr Leu Lys Gly Phe Lys Asn Asp Leu Ala Leu Val Arg
225                 230                 235                 240

Leu Arg Thr Val Leu Glu Asn Thr Pro Val Glu Val Thr Lys Lys Pro
                245                 250                 255

Val Val Lys Lys Ile Gly Asp Lys Leu His Val Phe Gly Tyr Pro Glu
            260                 265                 270

Gly Lys Leu Asn Pro Ile Val Asn Thr Thr Val Asp Phe Ala Glu Pro
        275                 280                 285

Tyr Gly Glu Gly Val Gln Gly Ile Gly Tyr Gln Gly Gly Lys Pro Gly
    290                 295                 300

Ala Ser Gly Gly Gly Ile Phe Asp Thr Glu Gly Lys Leu Val Gly Val
305                 310                 315                 320

His Gln Asn Gly Val Val Gly Lys Arg Ser Gly Gly Ile Leu Phe Ser
                325                 330                 335

Pro Ala Gln Leu Lys Trp Ile Gln Asp His Met Gln Gly Ile Ser Ser
            340                 345                 350

Val Lys Pro Ala Asp Leu Glu Glu Glu Lys Glu Lys Pro Ala Glu Lys
        355                 360                 365

Pro Lys Glu Asp Lys Pro Ala Ala Ala Lys Pro Glu Thr Pro Lys Ala
    370                 375                 380

Val Thr Pro Glu Trp Gln Thr Val Ala Asn Lys Glu Gln Gln Gly Thr
```

```
             385                 390                 395                 400
        Val Thr Ile Arg Glu Glu Lys Gly Val Arg Tyr Asn Gln Leu Ser Ser
                        405                 410                 415

Thr Ala Gln Asn Asp Asn Asp Gly Lys Pro Ala Leu Phe Glu Lys Gln
                    420                 425                 430

Gly Leu Thr Val Asp Ala Asn Gly Asn Ala Thr Val Asp Leu Thr Phe
                        435                 440                 445

Lys Asp Asp Ser Glu Lys Gly Lys Ser Arg Phe Gly Val Phe Leu Lys
        450                 455                 460

Phe Lys Asp Thr Lys Asn Asn Val Phe Val Gly Tyr Asp Gln Gly Gly
        465                 470                 475                 480

Trp Phe Trp Glu Tyr Lys Thr Pro Gly Asn Ser Thr Trp Tyr Lys Gly
                        485                 490                 495

Asn Arg Val Ala Ala Pro Glu Pro Gly Ser Val Asn Arg Leu Ser Ile
                    500                 505                 510

Thr Leu Lys Ser Asp Gly Gln Leu Asn Ala Ser Asn Asn Asp Val Asn
                    515                 520                 525

Leu Phe Asp Thr Val Thr Leu Pro Gly Ala Val Asn Glu Asn Leu Lys
        530                 535                 540

Asn Glu Lys Lys Ile Leu Leu Lys Ala Gly Thr Tyr Ser Asn Asp Arg
        545                 550                 555                 560

Thr Val Val Ser Val Lys Thr Asp Asn Gln Glu Gly Val Lys Ala Asp
                        565                 570                 575

Asp Thr Pro Ala Gln Lys Glu Thr Gly Pro Ala Val Asp Asp Ser Lys
                    580                 585                 590

Val Thr Tyr Asp Thr Ile Gln Ser Lys Val Leu Lys Ala Val Ile Asp
                    595                 600                 605

Gln Ala Phe Pro Arg Val Lys Glu Tyr Thr Leu Asn Gly His Thr Leu
                    610                 615                 620

Pro Gly Gln Val Gln Gln Phe Asn Gln Val Phe Ile Asn Asn His Arg
        625                 630                 635                 640

Ile Thr Pro Glu Val Thr Tyr Lys Lys Ile Asn Glu Thr Thr Ala Glu
                        645                 650                 655

Tyr Leu Met Lys Leu Arg Asp Asp Ala His Leu Ile Asn Ala Glu Met
                    660                 665                 670

Thr Val Arg Leu Gln Val Val Asp Asn Gln Leu His Phe Asp Val Thr
                    675                 680                 685

Lys Ile Val Asn His Asn Gln Val Thr Pro Gly Gln Lys Ile Asp Asp
                    690                 695                 700

Glu Arg Lys Leu Leu Ser Thr Ile Ser Phe Leu Gly Asn Ala Leu Val
        705                 710                 715                 720

Ser Val Ser Ser Asp Gln Ala Gly Ala Lys Phe Asp Gly Ala Thr Met
                        725                 730                 735

Ser Asn Asn Thr His Val Ser Gly Asp Asp His Ile Asp Val Thr Asn
                    740                 745                 750

Pro Met Lys Asp Leu Ala Lys Gly Tyr Met Tyr Gly Phe Val Ser Thr
                    755                 760                 765

Asp Lys Leu Ala Ala Gly Val Trp Ser Asn Ser Gln Asn Ser Tyr Gly
                    770                 775                 780

Gly Gly Ser Asn Asp Trp Thr Arg Leu Thr Ala Tyr Lys Glu Thr Val
        785                 790                 795                 800

Gly Asn Ala Asn Tyr Val Gly Ile His Ser Ser Glu Trp Gln Trp Glu
                        805                 810                 815
```

Lys Ala Tyr Lys Gly Ile Val Phe Pro Glu Tyr Thr Lys Glu Leu Pro
            820                 825                 830

Ser Ala Lys Val Val Ile Thr Glu Asp Ala Asn Ala Asp Asn Lys Val
            835                 840                 845

Asp Trp Gln Asp Gly Ala Ile Ala Tyr Arg Ser Ile Met Asn Asn Pro
            850                 855                 860

Gln Gly Trp Glu Lys Val Lys Asp Ile Thr Ala Tyr Arg Ile Ala Met
865                 870                 875                 880

Asn Phe Gly Ser Gln Ala Gln Asn Pro Phe Leu Met Thr Leu Asp Gly
                885                 890                 895

Ile Lys Lys Ile Asn Leu His Thr Asp Gly Leu Gly Gln Gly Val Leu
            900                 905                 910

Leu Lys Gly Tyr Gly Ser Glu Gly His Asp Ser Gly His Leu Asn Tyr
            915                 920                 925

Ala Asp Ile Gly Lys Arg Ile Gly Val Glu Asp Phe Lys Thr Leu
            930                 935                 940

Ile Glu Lys Ala Lys Lys Tyr Gly Ala His Leu Gly Ile His Val Asn
945                 950                 955                 960

Ala Ser Glu Thr Tyr Pro Glu Ser Lys Tyr Phe Asn Glu Asn Ile Leu
            965                 970                 975

Arg Lys Asn Pro Asp Gly Ser Tyr Ser Tyr Gly Trp Asn Trp Leu Asp
            980                 985                 990

Gln Gly Ile Asn Ile Asp Ala Ala Tyr Asp Leu Ala His Gly Arg Leu
            995                 1000                1005

Ala Arg Trp Glu Asp Leu Lys Lys Lys Leu Gly Glu Gly Leu Asp
            1010                1015                1020

Phe Ile Tyr Val Asp Val Trp Gly Asn Gly Gln Ser Gly Asp Asn
            1025                1030                1035

Gly Ala Trp Ala Thr His Val Leu Ala Lys Glu Ile Asn Lys Gln
            1040                1045                1050

Gly Trp Arg Phe Ala Ile Glu Trp Gly His Gly Gly Glu Tyr Asp
            1055                1060                1065

Ser Thr Phe Gln His Trp Ala Ala Asp Leu Thr Tyr Gly Gly Tyr
            1070                1075                1080

Thr Asn Lys Gly Ile Asn Ser Ala Ile Thr Arg Phe Ile Arg Asn
            1085                1090                1095

His Gln Lys Asp Ser Trp Val Gly Asp Tyr Arg Ser Tyr Gly Gly
            1100                1105                1110

Ala Ala Asn Tyr Pro Leu Leu Gly Gly Tyr Ser Met Lys Asp Phe
            1115                1120                1125

Glu Gly Trp Gln Gly Arg Ser Asp Tyr Asn Gly Tyr Val Thr Asn
            1130                1135                1140

Leu Phe Ala His Asp Val Met Thr Lys Tyr Phe Gln His Phe Thr
            1145                1150                1155

Val Ser Lys Trp Glu Asn Gly Thr Pro Val Thr Met Thr Asp Asn
            1160                1165                1170

Gly Ser Thr Tyr Lys Trp Pro Glu Met Lys Val Glu Leu Val
            1175                1180                1185

Asp Ala Ala Gly Asn Lys Val Val Thr Arg Lys Ser Asn Asp
            1190                1195                1200

Val Asn Ser Pro Gln Tyr Arg Glu Arg Thr Val Thr Leu Asn Gly
            1205                1210                1215

-continued

Arg Val Ile Gln Asp Gly Ser Ala Tyr Leu Thr Pro Trp Asn Trp
1220             1225                 1230

Asp Ala Asn Gly Lys Lys Leu Pro Thr Glu Lys Glu Lys Met Tyr
1235             1240                 1245

Tyr Phe Asn Thr Gln Ala Gly Ala Thr Thr Trp Thr Leu Pro Ser
1250             1255                 1260

Asp Trp Ala Asn Ser Lys Val Tyr Leu Tyr Lys Leu Thr Asp Gln
1265             1270                 1275

Gly Lys Thr Glu Glu Gln Glu Leu Thr Val Thr Asp Gly Lys Ile
1280             1285                 1290

Thr Leu Asp Leu Leu Ala Asn Gln Pro Tyr Val Leu Tyr Arg Ser
1295             1300                 1305

Lys Gln Thr Asn Pro Glu Met Ser Trp Ser Glu Gly Met His Ile
1310             1315                 1320

Tyr Asp Gln Gly Phe Asn Ser Gly Thr Leu Lys His Trp Thr Ile
1325             1330                 1335

Ser Gly Asp Ala Ser Lys Ala Glu Ile Val Lys Ser Gln Gly Ala
1340             1345                 1350

Asn Glu Met Leu Arg Ile Gln Gly Asn Lys Ser Lys Val Ser Leu
1355             1360                 1365

Thr Gln Lys Leu Thr Gly Leu Lys Pro Asn Thr Lys Tyr Ala Val
1370             1375                 1380

Tyr Val Gly Val Asp Asn Arg Ser Asn Ala Lys Ala Ser Ile Thr
1385             1390                 1395

Val Asn Thr Gly Glu Lys Glu Val Thr Thr Tyr Thr Asn Lys Ser
1400             1405                 1410

Leu Ala Leu Asn Tyr Ile Lys Ala Tyr Ala His Asn Asn Arg Arg
1415             1420                 1425

Glu Asn Ala Thr Val Asp Asp Thr Ser Tyr Phe Gln Asn Met Tyr
1430             1435                 1440

Ala Phe Phe Thr Thr Gly Ser Asp Val Ser Asn Val Thr Leu Thr
1445             1450                 1455

Leu Ser Arg Glu Ala Gly Asp Glu Ala Thr Tyr Phe Asp Glu Ile
1460             1465                 1470

Arg Thr Phe Glu Asn Asn Ser Ser Met Tyr Gly Asp Lys His Asp
1475             1480                 1485

Thr Gly Gln Gly Thr Phe Lys Gln Asp Phe Glu Asn Val Ala Gln
1490             1495                 1500

Gly Ile Phe Pro Phe Val Val Gly Gly Val Glu Gly Val Glu Asp
1505             1510                 1515

Asn Arg Thr His Leu Ser Glu Lys His Asp Pro Tyr Thr Gln Arg
1520             1525                 1530

Gly Trp Asn Gly Lys Lys Val Asp Asp Val Ile Glu Gly Asn Trp
1535             1540                 1545

Ser Leu Lys Thr Asn Gly Leu Val Ser Arg Arg Asn Leu Val Tyr
1550             1555                 1560

Gln Thr Ile Pro Gln Asn Phe Arg Phe Glu Ala Gly Lys Thr Tyr
1565             1570                 1575

Arg Val Thr Phe Glu Tyr Glu Ala Gly Ser Asp Asn Thr Tyr Ala
1580             1585                 1590

Phe Val Val Gly Lys Gly Glu Phe Gln Ser Gly Arg Arg Gly Thr
1595             1600                 1605

Gln Ala Ser Asn Leu Glu Met His Glu Leu Pro Asn Thr Trp Thr

```
              1610                1615                1620

Asp Ser Lys Lys Ala Lys Lys Val Thr Phe Leu Val Thr Gly Ala
        1625                1630                1635

Glu Thr Gly Asp Thr Trp Val Gly Ile Tyr Ser Thr Gly Asn Ala
        1640                1645                1650

Ser Asn Thr Arg Gly Asp Ala Gly Gly Asn Ala Asn Phe Arg Gly
        1655                1660                1665

Tyr Asn Asp Phe Met Met Asp Asn Leu Gln Ile Glu Glu Ile Thr
        1670                1675                1680

Leu Thr Gly Lys Met Leu Thr Glu Asn Ala Leu Lys Asn Tyr Leu
        1685                1690                1695

Pro Thr Val Ala Met Thr Asn Tyr Thr Lys Glu Ser Met Asp Ala
        1700                1705                1710

Leu Lys Glu Ala Val Phe Asn Leu Ser Gln Ala Asp Asp Asp Ile
        1715                1720                1725

Ser Val Glu Glu Ala Arg Ala Glu Ile Ala Lys Ile Glu Ala Leu
        1730                1735                1740

Lys Asn Ala Leu Val Gln Lys Lys Thr Ala Leu Val Ala Glu Asp
        1745                1750                1755

Phe Glu Ser Leu Asp Ala Pro Ala Gln Pro Gly Glu Gly Leu Glu
        1760                1765                1770

Asn Ala Phe Asp Gly Asn Val Ser Ser Leu Trp His Thr Ser Trp
        1775                1780                1785

Asn Gly Gly Asp Val Gly Lys Pro Ala Thr Met Val Leu Lys Glu
        1790                1795                1800

Pro Thr Glu Ile Thr Gly Leu Arg Tyr Val Pro Arg Ala Ser Asp
        1805                1810                1815

Ser Asn Gly Asn Leu Arg Asp Val Lys Leu Val Val Thr Asp Glu
        1820                1825                1830

Ser Gly Lys Glu His Thr Phe Asn Val Thr Asp Trp Pro Asn Asn
        1835                1840                1845

Asn Lys Pro Lys Asp Ile Asp Phe Gly Lys Thr Ile Lys Ala Lys
        1850                1855                1860

Lys Ile Val Leu Thr Gly Thr Lys Thr Tyr Gly Asp Gly Gly Asp
        1865                1870                1875

Lys Tyr Gln Ser Ala Ala Glu Leu Ile Phe Thr Arg Pro Gln Val
        1880                1885                1890

Ala Glu Thr Pro Leu Asp Leu Ser Gly Tyr Glu Ala Ala Leu Ala
        1895                1900                1905

Lys Ala Gln Lys Leu Thr Asp Lys Asp Asn Gln Glu Glu Val Ala
        1910                1915                1920

Ser Val Gln Ala Ser Met Lys Tyr Ala Thr Asp Asn His Leu Leu
        1925                1930                1935

Thr Glu Arg Met Val Ala Tyr Phe Ala Asp Tyr Leu Asn Gln Leu
        1940                1945                1950

Lys Asp Ser Ala Thr Lys Pro Asp Ala Pro Thr Ser Ser Lys Gly
        1955                1960                1965

Glu Glu Gln Pro Pro Val Leu Asp Val Pro Glu Phe Lys Gly Gly
        1970                1975                1980

Val Asn Ala Thr Glu Ala Ala Val His Glu Val Pro Glu Phe Lys
        1985                1990                1995

Gly Gly Val Asn Ala Val Gln Ala Leu Val His Glu Leu Pro Glu
        2000                2005                2010
```

Tyr Lys Gly Gly Ala Asn Ala Val Leu Ala Ala Asn Glu Val
2015                2020                2025

Pro Glu Tyr Lys Gly Gly Ala Asn Ala Val Glu Ala Leu Val Asn
    2030                2035                2040

Glu Lys Pro Ala Tyr Thr Gly Val Leu Ala Thr Ala Gly Asp Gln
    2045                2050                2055

Ala Ala Pro Thr Val Glu Lys Pro Glu Tyr Pro Leu Thr Pro Ser
    2060                2065                2070

Pro Val Ala Asp Thr Lys Thr Pro Gly Ala Lys Asp Glu Glu Lys
    2075                2080                2085

Leu Pro Ala Thr Gly Glu His Ser Ser Glu Val Ala Leu Phe Leu
    2090                2095                2100

Ala Ser Val Ser Ile Ala Leu Ser Ala Ala Val Leu Ala Thr Lys
    2105                2110                2115

Arg Lys Glu Glu
    2120

<210> SEQ ID NO 8
<211> LENGTH: 2084
<212> TYPE: PRT
<213> ORGANISM: Streptococcus oralis

<400> SEQUENCE: 8

Asp Gln Ala Arg Val Gly Ser Thr Asp Asn Leu Pro Ser Glu Leu Ala
1               5                   10                  15

Asp Leu Asp Lys Lys Ala Ser Asp Gly His Asp Phe Asp Lys Glu
            20                  25                  30

Ala Ala Ala Gln Asn Pro Gly Ser Ala Glu Thr Thr Glu Gly Pro Gln
        35                  40                  45

Thr Glu Glu Glu Leu Leu Ala Gln Glu Lys Glu Lys Ser Glu Lys Pro
    50                  55                  60

Ser Asn Leu Pro Lys Glu Leu Glu Asp Lys Leu Glu Lys Ala Glu Asp
65                  70                  75                  80

Asn Gly Arg Glu Val Asp Lys Asp Gln Leu Ala Gln Asp Thr Gly Lys
                85                  90                  95

Leu Val Pro Glu Asp Val Ala Lys Thr Thr Asn Gly Glu Leu Asn Tyr
            100                 105                 110

Gly Ala Thr Val Lys Ile Lys Thr Pro Ser Gly Glu Gly Ser Gly Ile
        115                 120                 125

Val Val Ala Lys Asp Leu Val Leu Thr Val Ser His Asn Phe Ile Lys
130                 135                 140

Asp Ser Gln Glu Gly Asn Ile Arg Lys Val Val Asp Asn Asp Gln Gly
145                 150                 155                 160

Asp Gly Asp Ile Tyr Ser Ile Ser Tyr Pro Gly Leu Pro Asp Val Lys
                165                 170                 175

Phe Ser Lys Lys Asp Ile Ile His Trp Asp Arg Glu Gly Tyr Leu Lys
            180                 185                 190

Gly Phe Lys Asn Asp Leu Ala Leu Val Arg Leu Arg Thr Val Leu Glu
        195                 200                 205

Asn Thr Pro Val Glu Val Thr Lys Lys Pro Val Val Lys Lys Ile Gly
    210                 215                 220

Asp Lys Leu His Val Phe Gly Tyr Pro Glu Gly Lys Leu Asn Pro Ile
225                 230                 235                 240

Val Asn Thr Thr Val Asp Phe Ala Glu Pro Tyr Gly Glu Gly Val Gln

```
                245                 250                 255
Gly Ile Gly Tyr Gln Gly Gly Lys Pro Gly Ala Ser Gly Gly Ile
            260                 265                 270
Phe Asp Thr Glu Gly Lys Leu Val Gly Val His Gln Asn Gly Val Val
            275                 280                 285
Gly Lys Arg Ser Gly Gly Ile Leu Phe Ser Pro Ala Gln Leu Lys Trp
            290                 295                 300
Ile Gln Asp His Met Gln Gly Ile Ser Ser Val Lys Pro Ala Asp Leu
305                 310                 315                 320
Glu Glu Lys Glu Lys Pro Ala Glu Glu Lys Pro Lys Glu Asp Lys Pro
                325                 330                 335
Ala Ala Ala Lys Pro Glu Thr Pro Lys Ala Val Thr Pro Glu Trp Gln
                340                 345                 350
Thr Val Ala Asn Lys Glu Gln Gln Gly Thr Val Thr Ile Arg Glu Glu
                355                 360                 365
Lys Gly Val Arg Tyr Asn Gln Leu Ser Ser Thr Ala Gln Asn Asp Asn
                370                 375                 380
Asp Gly Lys Pro Ala Leu Phe Glu Lys Gln Gly Leu Thr Val Asp Ala
385                 390                 395                 400
Asn Gly Asn Ala Thr Val Asp Leu Thr Phe Lys Asp Ser Glu Lys
                    405                 410                 415
Gly Lys Ser Arg Phe Gly Val Phe Leu Lys Phe Lys Asp Thr Lys Asn
                420                 425                 430
Asn Val Phe Val Gly Tyr Asp Gln Gly Gly Trp Phe Trp Glu Tyr Lys
            435                 440                 445
Thr Pro Gly Asn Ser Thr Trp Tyr Lys Gly Asn Arg Val Ala Ala Pro
        450                 455                 460
Glu Pro Gly Ser Val Asn Arg Leu Ser Ile Thr Leu Lys Ser Asp Gly
465                 470                 475                 480
Gln Leu Asn Ala Ser Asn Asn Asp Val Asn Leu Phe Asp Thr Val Thr
                485                 490                 495
Leu Pro Gly Ala Val Asn Glu Asn Leu Lys Asn Glu Lys Lys Ile Leu
                500                 505                 510
Leu Lys Ala Gly Thr Tyr Ser Asn Asp Arg Thr Val Ser Val Lys
                515                 520                 525
Thr Asp Asn Gln Glu Gly Val Lys Ala Asp Thr Pro Ala Gln Lys
            530                 535                 540
Glu Thr Gly Pro Ala Val Asp Asp Ser Lys Val Thr Tyr Asp Thr Ile
545                 550                 555                 560
Gln Ser Lys Val Leu Lys Ala Val Ile Asp Gln Ala Phe Pro Arg Val
                565                 570                 575
Lys Glu Tyr Thr Leu Asn Gly His Thr Leu Pro Gly Gln Val Gln Gln
            580                 585                 590
Phe Asn Gln Val Phe Ile Asn Asn His Arg Ile Thr Pro Glu Val Thr
            595                 600                 605
Tyr Lys Lys Ile Asn Glu Thr Thr Ala Glu Tyr Leu Met Lys Leu Arg
        610                 615                 620
Asp Asp Ala His Leu Ile Asn Ala Glu Met Thr Val Arg Leu Gln Val
625                 630                 635                 640
Val Asp Asn Gln Leu His Phe Asp Val Thr Lys Ile Val Asn His Asn
                645                 650                 655
Gln Val Thr Pro Gly Gln Lys Ile Asp Asp Glu Arg Lys Leu Leu Ser
            660                 665                 670
```

-continued

```
Thr Ile Ser Phe Leu Gly Asn Ala Leu Val Ser Val Ser Asp Gln
        675                 680                 685

Ala Gly Ala Lys Phe Asp Gly Ala Thr Met Ser Asn Asn Thr His Val
    690                 695                 700

Ser Gly Asp Asp His Ile Asp Val Thr Asn Pro Met Lys Asp Leu Ala
705                 710                 715                 720

Lys Gly Tyr Met Tyr Gly Phe Val Ser Thr Asp Lys Leu Ala Ala Gly
                725                 730                 735

Val Trp Ser Asn Ser Gln Asn Ser Tyr Gly Gly Ser Asn Asp Trp
                740                 745                 750

Thr Arg Leu Thr Ala Tyr Lys Glu Thr Val Gly Asn Ala Asn Tyr Val
        755                 760                 765

Gly Ile His Ser Ser Glu Trp Gln Trp Glu Lys Ala Tyr Lys Gly Ile
        770                 775                 780

Val Phe Pro Glu Tyr Thr Lys Glu Leu Pro Ser Ala Lys Val Val Ile
785                 790                 795                 800

Thr Glu Asp Ala Asn Ala Asp Asn Lys Val Asp Trp Gln Asp Gly Ala
                805                 810                 815

Ile Ala Tyr Arg Ser Ile Met Asn Asn Pro Gln Gly Trp Glu Lys Val
            820                 825                 830

Lys Asp Ile Thr Ala Tyr Arg Ile Ala Met Asn Phe Gly Ser Gln Ala
        835                 840                 845

Gln Asn Pro Phe Leu Met Thr Leu Asp Gly Ile Lys Lys Ile Asn Leu
    850                 855                 860

His Thr Asp Gly Leu Gly Gln Gly Val Leu Leu Lys Gly Tyr Gly Ser
865                 870                 875                 880

Glu Gly His Asp Ser Gly His Leu Asn Tyr Ala Asp Ile Gly Lys Arg
                885                 890                 895

Ile Gly Gly Val Glu Asp Phe Lys Thr Leu Ile Glu Lys Ala Lys Lys
            900                 905                 910

Tyr Gly Ala His Leu Gly Ile His Val Asn Ala Ser Glu Thr Tyr Pro
        915                 920                 925

Glu Ser Lys Tyr Phe Asn Glu Asn Ile Leu Arg Lys Asn Pro Asp Gly
    930                 935                 940

Ser Tyr Ser Tyr Gly Trp Asn Trp Leu Asp Gln Gly Ile Asn Ile Asp
945                 950                 955                 960

Ala Ala Tyr Asp Leu Ala His Gly Arg Leu Ala Arg Trp Glu Asp Leu
                965                 970                 975

Lys Lys Lys Leu Gly Glu Gly Leu Asp Phe Ile Tyr Val Asp Val Trp
            980                 985                 990

Gly Asn Gly Gln Ser Gly Asp Asn Gly Ala Trp Ala Thr His Val Leu
        995                 1000                1005

Ala Lys Glu Ile Asn Lys Gln Gly Trp Arg Phe Ala Ile Glu Trp
    1010                1015                1020

Gly His Gly Gly Glu Tyr Asp Ser Thr Phe Gln His Trp Ala Ala
    1025                1030                1035

Asp Leu Thr Tyr Gly Gly Tyr Thr Asn Lys Gly Ile Asn Ser Ala
    1040                1045                1050

Ile Thr Arg Phe Ile Arg Asn His Gln Lys Asp Ser Trp Val Gly
    1055                1060                1065

Asp Tyr Arg Ser Tyr Gly Gly Ala Ala Asn Tyr Pro Leu Leu Gly
    1070                1075                1080
```

```
Gly Tyr Ser Met Lys Asp Phe Glu Gly Trp Gln Gly Arg Ser Asp
    1085                1090                1095

Tyr Asn Gly Tyr Val Thr Asn Leu Phe Ala His Asp Val Met Thr
    1100                1105                1110

Lys Tyr Phe Gln His Phe Thr Val Ser Lys Trp Glu Asn Gly Thr
    1115                1120                1125

Pro Val Thr Met Thr Asp Asn Gly Ser Thr Tyr Lys Trp Thr Pro
    1130                1135                1140

Glu Met Lys Val Glu Leu Val Asp Ala Ala Gly Asn Lys Val Val
    1145                1150                1155

Val Thr Arg Lys Ser Asn Asp Val Asn Ser Pro Gln Tyr Arg Glu
    1160                1165                1170

Arg Thr Val Thr Leu Asn Gly Arg Val Ile Gln Asp Gly Ser Ala
    1175                1180                1185

Tyr Leu Thr Pro Trp Asn Trp Asp Ala Asn Gly Lys Lys Leu Pro
    1190                1195                1200

Thr Glu Lys Glu Lys Met Tyr Tyr Phe Asn Thr Gln Ala Gly Ala
    1205                1210                1215

Thr Thr Trp Thr Leu Pro Ser Asp Trp Ala Asn Ser Lys Val Tyr
    1220                1225                1230

Leu Tyr Lys Leu Thr Asp Gln Gly Lys Thr Glu Glu Gln Glu Leu
    1235                1240                1245

Thr Val Thr Asp Gly Lys Ile Thr Leu Asp Leu Leu Ala Asn Gln
    1250                1255                1260

Pro Tyr Val Leu Tyr Arg Ser Lys Gln Thr Asn Pro Glu Met Ser
    1265                1270                1275

Trp Ser Glu Gly Met His Ile Tyr Asp Gln Gly Phe Asn Ser Gly
    1280                1285                1290

Thr Leu Lys His Trp Thr Ile Ser Gly Asp Ala Ser Lys Ala Glu
    1295                1300                1305

Ile Val Lys Ser Gln Gly Ala Asn Glu Met Leu Arg Ile Gln Gly
    1310                1315                1320

Asn Lys Ser Lys Val Ser Leu Thr Gln Lys Leu Thr Gly Leu Lys
    1325                1330                1335

Pro Asn Thr Lys Tyr Ala Val Tyr Val Gly Val Asp Asn Arg Ser
    1340                1345                1350

Asn Ala Lys Ala Ser Ile Thr Val Asn Thr Gly Glu Lys Glu Val
    1355                1360                1365

Thr Thr Tyr Thr Asn Lys Ser Leu Ala Leu Asn Tyr Ile Lys Ala
    1370                1375                1380

Tyr Ala His Asn Asn Arg Arg Glu Asn Ala Thr Val Asp Asp Thr
    1385                1390                1395

Ser Tyr Phe Gln Asn Met Tyr Ala Phe Phe Thr Thr Gly Ser Asp
    1400                1405                1410

Val Ser Asn Val Thr Leu Thr Leu Ser Arg Glu Ala Gly Asp Glu
    1415                1420                1425

Ala Thr Tyr Phe Asp Glu Ile Arg Thr Phe Glu Asn Asn Ser Ser
    1430                1435                1440

Met Tyr Gly Asp Lys His Asp Thr Gly Gln Gly Thr Phe Lys Gln
    1445                1450                1455

Asp Phe Glu Asn Val Ala Gln Gly Ile Phe Pro Phe Val Val Gly
    1460                1465                1470

Gly Val Glu Gly Val Glu Asp Asn Arg Thr His Leu Ser Glu Lys
```

-continued

```
               1475                1480                1485
His  Asp  Pro  Tyr  Thr  Gln  Arg  Gly  Trp  Asn  Gly  Lys  Lys  Val  Asp
     1490                1495                1500

Asp  Val  Ile  Glu  Gly  Asn  Trp  Ser  Leu  Lys  Thr  Asn  Gly  Leu  Val
     1505                1510                1515

Ser  Arg  Arg  Asn  Leu  Val  Tyr  Gln  Thr  Ile  Pro  Gln  Asn  Phe  Arg
     1520                1525                1530

Phe  Glu  Ala  Gly  Lys  Thr  Tyr  Arg  Val  Thr  Phe  Glu  Tyr  Glu  Ala
     1535                1540                1545

Gly  Ser  Asp  Asn  Thr  Tyr  Ala  Phe  Val  Val  Gly  Lys  Gly  Glu  Phe
     1550                1555                1560

Gln  Ser  Gly  Arg  Arg  Gly  Thr  Gln  Ala  Ser  Asn  Leu  Glu  Met  His
     1565                1570                1575

Glu  Leu  Pro  Asn  Thr  Trp  Thr  Asp  Ser  Lys  Lys  Ala  Lys  Lys  Val
     1580                1585                1590

Thr  Phe  Leu  Val  Thr  Gly  Ala  Glu  Thr  Gly  Asp  Thr  Trp  Val  Gly
     1595                1600                1605

Ile  Tyr  Ser  Thr  Gly  Asn  Ala  Ser  Asn  Thr  Arg  Gly  Asp  Ala  Gly
     1610                1615                1620

Gly  Asn  Ala  Asn  Phe  Arg  Gly  Tyr  Asn  Asp  Phe  Met  Met  Asp  Asn
     1625                1630                1635

Leu  Gln  Ile  Glu  Glu  Ile  Thr  Leu  Thr  Gly  Lys  Met  Leu  Thr  Glu
     1640                1645                1650

Asn  Ala  Leu  Lys  Asn  Tyr  Leu  Pro  Thr  Val  Ala  Met  Thr  Asn  Tyr
     1655                1660                1665

Thr  Lys  Glu  Ser  Met  Asp  Ala  Leu  Lys  Glu  Ala  Val  Phe  Asn  Leu
     1670                1675                1680

Ser  Gln  Ala  Asp  Asp  Ile  Ser  Val  Glu  Glu  Ala  Arg  Ala  Glu
     1685                1690                1695

Ile  Ala  Lys  Ile  Glu  Ala  Leu  Lys  Asn  Ala  Leu  Val  Gln  Lys  Lys
     1700                1705                1710

Thr  Ala  Leu  Val  Ala  Glu  Asp  Phe  Glu  Ser  Leu  Asp  Ala  Pro  Ala
     1715                1720                1725

Gln  Pro  Gly  Glu  Gly  Leu  Glu  Asn  Ala  Phe  Asp  Gly  Asn  Val  Ser
     1730                1735                1740

Ser  Leu  Trp  His  Thr  Ser  Trp  Asn  Gly  Gly  Asp  Val  Gly  Lys  Pro
     1745                1750                1755

Ala  Thr  Met  Val  Leu  Lys  Glu  Pro  Thr  Glu  Ile  Thr  Gly  Leu  Arg
     1760                1765                1770

Tyr  Val  Pro  Arg  Ala  Ser  Asp  Ser  Asn  Gly  Asn  Leu  Arg  Asp  Val
     1775                1780                1785

Lys  Leu  Val  Val  Thr  Asp  Glu  Ser  Gly  Lys  Glu  His  Thr  Phe  Asn
     1790                1795                1800

Val  Thr  Asp  Trp  Pro  Asn  Asn  Asn  Lys  Pro  Lys  Asp  Ile  Asp  Phe
     1805                1810                1815

Gly  Lys  Thr  Ile  Lys  Ala  Lys  Lys  Ile  Val  Leu  Thr  Gly  Thr  Lys
     1820                1825                1830

Thr  Tyr  Gly  Asp  Gly  Asp  Lys  Tyr  Gln  Ser  Ala  Ala  Glu  Leu
     1835                1840                1845

Ile  Phe  Thr  Arg  Pro  Gln  Val  Ala  Glu  Thr  Pro  Leu  Asp  Leu  Ser
     1850                1855                1860

Gly  Tyr  Glu  Ala  Ala  Leu  Ala  Lys  Ala  Gln  Lys  Leu  Thr  Asp  Lys
     1865                1870                1875
```

Asp Asn Gln Glu Glu Val Ala Ser Val Gln Ala Ser Met Lys Tyr
        1880            1885                1890

Ala Thr Asp Asn His Leu Leu Thr Glu Arg Met Val Ala Tyr Phe
        1895            1900                1905

Ala Asp Tyr Leu Asn Gln Leu Lys Asp Ser Ala Thr Lys Pro Asp
        1910            1915                1920

Ala Pro Thr Ser Ser Lys Gly Glu Glu Gln Pro Pro Val Leu Asp
        1925            1930                1935

Val Pro Glu Phe Lys Gly Gly Val Asn Ala Thr Glu Ala Ala Val
        1940            1945                1950

His Glu Val Pro Glu Phe Lys Gly Gly Val Asn Ala Val Gln Ala
        1955            1960                1965

Leu Val His Glu Leu Pro Glu Tyr Lys Gly Gly Ala Asn Ala Val
        1970            1975                1980

Leu Ala Ala Ala Asn Glu Val Pro Glu Tyr Lys Gly Gly Ala Asn
        1985            1990                1995

Ala Val Glu Ala Leu Val Asn Glu Lys Pro Ala Tyr Thr Gly Val
        2000            2005                2010

Leu Ala Thr Ala Gly Asp Gln Ala Ala Pro Thr Val Glu Lys Pro
        2015            2020                2025

Glu Tyr Pro Leu Thr Pro Ser Pro Val Ala Asp Thr Lys Thr Pro
        2030            2035                2040

Gly Ala Lys Asp Glu Glu Lys Leu Pro Ala Thr Gly Glu His Ser
        2045            2050                2055

Ser Glu Val Ala Leu Phe Leu Ala Ser Val Ser Ile Ala Leu Ser
        2060            2065                2070

Ala Ala Val Leu Ala Thr Lys Arg Lys Glu Glu
        2075            2080

<210> SEQ ID NO 9
<211> LENGTH: 2053
<212> TYPE: PRT
<213> ORGANISM: Streptococcus oralis

<400> SEQUENCE: 9

Asp Gln Ala Arg Val Gly Ser Thr Asp Asn Leu Pro Ser Glu Leu Ala
1               5                   10                  15

Asp Leu Asp Lys Lys Ala Ser Asp Glu Gly His Asp Phe Asp Lys Glu
                20                  25                  30

Ala Ala Ala Gln Asn Pro Gly Ser Ala Glu Thr Thr Glu Gly Pro Gln
            35                  40                  45

Thr Glu Glu Glu Leu Leu Ala Gln Glu Lys Glu Lys Ser Glu Lys Pro
        50                  55                  60

Ser Asn Leu Pro Lys Glu Leu Glu Asp Lys Leu Glu Lys Ala Glu Asp
65                  70                  75                  80

Asn Gly Arg Glu Val Asp Lys Asp Gln Leu Ala Gln Asp Thr Gly Lys
                85                  90                  95

Leu Val Pro Glu Asp Val Ala Lys Thr Thr Asn Gly Glu Leu Asn Tyr
            100                 105                 110

Gly Ala Thr Val Lys Ile Lys Thr Pro Ser Gly Glu Gly Ser Gly Ile
        115                 120                 125

Val Val Ala Lys Asp Leu Val Leu Thr Val Ser His Asn Phe Ile Lys
    130                 135                 140

Asp Ser Gln Glu Gly Asn Ile Arg Lys Val Val Asp Asn Asp Gln Gly

```
            145                 150                 155                 160
        Asp Gly Asp Ile Tyr Ser Ile Ser Tyr Pro Gly Leu Pro Asp Val Lys
                        165                 170                 175
        Phe Ser Lys Lys Asp Ile Ile His Trp Asp Arg Glu Gly Tyr Leu Lys
                        180                 185                 190
        Gly Phe Lys Asn Asp Leu Ala Leu Val Arg Leu Arg Thr Val Leu Glu
                        195                 200                 205
        Asn Thr Pro Val Glu Val Thr Lys Lys Pro Val Val Lys Lys Ile Gly
        210                 215                 220
        Asp Lys Leu His Val Phe Gly Tyr Pro Glu Gly Lys Leu Asn Pro Ile
        225                 230                 235                 240
        Val Asn Thr Thr Val Asp Phe Ala Glu Pro Tyr Gly Glu Gly Val Gln
                            245                 250                 255
        Gly Ile Gly Tyr Gln Gly Gly Lys Pro Gly Ala Ser Gly Gly Gly Ile
                        260                 265                 270
        Phe Asp Thr Glu Gly Lys Leu Val Gly Val His Gln Asn Gly Val Val
                        275                 280                 285
        Gly Lys Arg Ser Gly Gly Ile Leu Phe Ser Pro Ala Gln Leu Lys Trp
                        290                 295                 300
        Ile Gln Asp His Met Gln Gly Ile Ser Ser Val Lys Pro Ala Asp Leu
        305                 310                 315                 320
        Glu Glu Lys Glu Lys Pro Ala Glu Lys Pro Lys Glu Asp Lys Pro
                        325                 330                 335
        Ala Ala Ala Lys Pro Glu Thr Pro Lys Ala Val Thr Pro Glu Trp Gln
                        340                 345                 350
        Thr Val Ala Asn Lys Glu Gln Gln Gly Thr Val Thr Ile Arg Glu Glu
                        355                 360                 365
        Lys Gly Val Arg Tyr Asn Gln Leu Ser Ser Thr Ala Gln Asn Asp Asn
                        370                 375                 380
        Asp Gly Lys Pro Ala Leu Phe Glu Lys Gln Gly Leu Thr Val Asp Ala
        385                 390                 395                 400
        Asn Gly Asn Ala Thr Val Asp Leu Thr Phe Lys Asp Asp Ser Glu Lys
                        405                 410                 415
        Gly Lys Ser Arg Phe Gly Val Phe Leu Lys Phe Lys Asp Thr Lys Asn
                        420                 425                 430
        Asn Val Phe Val Gly Tyr Asp Gln Gly Gly Trp Phe Trp Glu Tyr Lys
                        435                 440                 445
        Thr Pro Gly Asn Ser Thr Trp Tyr Lys Gly Asn Arg Val Ala Ala Pro
        450                 455                 460
        Glu Pro Gly Ser Val Asn Arg Leu Ser Ile Thr Leu Lys Ser Asp Gly
        465                 470                 475                 480
        Gln Leu Asn Ala Ser Asn Asn Asp Val Asn Leu Phe Asp Thr Val Thr
                        485                 490                 495
        Leu Pro Gly Ala Val Asn Glu Asn Leu Lys Asn Glu Lys Lys Ile Leu
                        500                 505                 510
        Leu Lys Ala Gly Thr Tyr Ser Asn Asp Arg Thr Val Val Ser Val Lys
                        515                 520                 525
        Thr Asp Asn Gln Glu Gly Val Lys Ala Asp Thr Pro Ala Gln Lys
                        530                 535                 540
        Glu Thr Gly Pro Ala Val Asp Asp Ser Lys Val Thr Tyr Asp Thr Ile
        545                 550                 555                 560
        Gln Ser Lys Val Leu Lys Ala Val Ile Asp Gln Ala Phe Pro Arg Val
                        565                 570                 575
```

```
Lys Glu Tyr Thr Leu Asn Gly His Thr Leu Pro Gly Gln Val Gln Gln
            580                 585                 590

Phe Asn Gln Val Phe Ile Asn His Arg Ile Thr Pro Glu Val Thr
        595                 600                 605

Tyr Lys Lys Ile Asn Glu Thr Thr Ala Glu Tyr Leu Met Lys Leu Arg
610                 615                 620

Asp Asp Ala His Leu Ile Asn Ala Glu Met Thr Val Arg Leu Gln Val
625                 630                 635                 640

Val Asp Asn Gln Leu His Phe Asp Val Thr Lys Ile Val Asn His Asn
                645                 650                 655

Gln Val Thr Pro Gly Lys Ile Asp Asp Glu Arg Lys Leu Leu Ser
            660                 665                 670

Thr Ile Ser Phe Leu Gly Asn Ala Leu Val Ser Val Ser Ser Asp Gln
        675                 680                 685

Ala Gly Ala Lys Phe Asp Gly Ala Thr Met Ser Asn Asn Thr His Val
        690                 695                 700

Ser Gly Asp Asp His Ile Asp Val Thr Asn Pro Met Lys Asp Leu Ala
705                 710                 715                 720

Lys Gly Tyr Met Tyr Gly Phe Val Ser Thr Asp Lys Leu Ala Ala Gly
                725                 730                 735

Val Trp Ser Asn Ser Gln Asn Ser Tyr Gly Gly Ser Asn Asp Trp
            740                 745                 750

Thr Arg Leu Thr Ala Tyr Lys Glu Thr Val Gly Asn Ala Asn Tyr Val
            755                 760                 765

Gly Ile His Ser Ser Glu Trp Gln Trp Glu Lys Ala Tyr Lys Gly Ile
770                 775                 780

Val Phe Pro Glu Tyr Thr Lys Glu Leu Pro Ser Ala Lys Val Val Ile
785                 790                 795                 800

Thr Glu Asp Ala Asn Ala Asp Asn Lys Val Asp Trp Gln Asp Gly Ala
                805                 810                 815

Ile Ala Tyr Arg Ser Ile Met Asn Asn Pro Gln Gly Trp Glu Lys Val
                820                 825                 830

Lys Asp Ile Thr Ala Tyr Arg Ile Ala Met Asn Phe Gly Ser Gln Ala
            835                 840                 845

Gln Asn Pro Phe Leu Met Thr Leu Asp Gly Ile Lys Lys Ile Asn Leu
        850                 855                 860

His Thr Asp Gly Leu Gly Gln Gly Val Leu Leu Lys Gly Tyr Gly Ser
865                 870                 875                 880

Glu Gly His Asp Ser Gly His Leu Asn Tyr Ala Asp Ile Gly Lys Arg
                885                 890                 895

Ile Gly Gly Val Glu Asp Phe Lys Thr Leu Ile Glu Lys Ala Lys Lys
            900                 905                 910

Tyr Gly Ala His Leu Gly Ile His Val Asn Ala Ser Glu Thr Tyr Pro
        915                 920                 925

Glu Ser Lys Tyr Phe Asn Glu Asn Ile Leu Arg Lys Asn Pro Asp Gly
        930                 935                 940

Ser Tyr Ser Tyr Gly Trp Asn Trp Leu Asp Gln Gly Ile Asn Ile Asp
945                 950                 955                 960

Ala Ala Tyr Asp Leu Ala His Gly Arg Leu Ala Arg Trp Glu Asp Leu
                965                 970                 975

Lys Lys Lys Leu Gly Glu Gly Leu Asp Phe Ile Tyr Val Asp Val Trp
            980                 985                 990
```

```
Gly Asn Gly Gln Ser Gly Asp Asn  Gly Ala Trp Ala Thr  His Val Leu
         995                 1000                  1005

Ala Lys Glu Ile Asn Lys Gln  Gly Trp Arg Phe Ala  Ile Glu Trp
    1010             1015                 1020

Gly His Gly Gly Glu Tyr Asp  Ser Thr Phe Gln His  Trp Ala Ala
    1025             1030                 1035

Asp Leu Thr Tyr Gly Gly Tyr  Thr Asn Lys Gly Ile  Asn Ser Ala
    1040             1045                 1050

Ile Thr Arg Phe Ile Arg Asn  His Gln Lys Asp Ser  Trp Val Gly
    1055             1060                 1065

Asp Tyr Arg Ser Tyr Gly Gly  Ala Ala Asn Tyr Pro  Leu Leu Gly
    1070             1075                 1080

Gly Tyr Ser Met Lys Asp Phe  Glu Gly Trp Gln Gly  Arg Ser Asp
    1085             1090                 1095

Tyr Asn Gly Tyr Val Thr Asn  Leu Phe Ala His Asp  Val Met Thr
    1100             1105                 1110

Lys Tyr Phe Gln His Phe Thr  Val Ser Lys Trp Glu  Asn Gly Thr
    1115             1120                 1125

Pro Val Thr Met Thr Asp Asn  Gly Ser Thr Tyr Lys  Trp Thr Pro
    1130             1135                 1140

Glu Met Lys Val Glu Leu Val  Asp Ala Ala Gly Asn  Lys Val Val
    1145             1150                 1155

Val Thr Arg Lys Ser Asn Asp  Val Asn Ser Pro Gln  Tyr Arg Glu
    1160             1165                 1170

Arg Thr Val Thr Leu Asn Gly  Arg Val Ile Gln Asp  Gly Ser Ala
    1175             1180                 1185

Tyr Leu Thr Pro Trp Asn Trp  Asp Ala Asn Gly Lys  Lys Leu Pro
    1190             1195                 1200

Thr Glu Lys Glu Lys Met Tyr  Tyr Phe Asn Thr Gln  Ala Gly Ala
    1205             1210                 1215

Thr Thr Trp Thr Leu Pro Ser  Asp Trp Ala Asn Ser  Lys Val Tyr
    1220             1225                 1230

Leu Tyr Lys Leu Thr Asp Gln  Gly Lys Thr Glu Glu  Gln Glu Leu
    1235             1240                 1245

Thr Val Thr Asp Gly Lys Ile  Thr Leu Asp Leu Leu  Ala Asn Gln
    1250             1255                 1260

Pro Tyr Val Leu Tyr Arg Ser  Lys Gln Thr Asn Pro  Glu Met Ser
    1265             1270                 1275

Trp Ser Glu Gly Met His Ile  Tyr Asp Gln Gly Phe  Asn Ser Gly
    1280             1285                 1290

Thr Leu Lys His Trp Thr Ile  Ser Gly Asp Ala Ser  Lys Ala Glu
    1295             1300                 1305

Ile Val Lys Ser Gln Gly Ala  Asn Glu Met Leu Arg  Ile Gln Gly
    1310             1315                 1320

Asn Lys Ser Lys Val Ser Leu  Thr Gln Lys Leu Thr  Gly Leu Lys
    1325             1330                 1335

Pro Asn Thr Lys Tyr Ala Val  Tyr Val Gly Val Asp  Asn Arg Ser
    1340             1345                 1350

Asn Ala Lys Ala Ser Ile Thr  Val Asn Thr Gly Glu  Lys Glu Val
    1355             1360                 1365

Thr Thr Tyr Thr Asn Lys Ser  Leu Ala Leu Asn Tyr  Ile Lys Ala
    1370             1375                 1380

Tyr Ala His Asn Asn Arg Arg  Glu Asn Ala Thr Val  Asp Asp Thr
```

-continued

|  |  |  | 1385 |  |  | 1390 |  |  | 1395 |  |  |
|---|---|---|---|---|---|---|---|---|---|---|---|

Ser Tyr Phe Gln Asn Met Tyr Ala Phe Phe Thr Thr Gly Ser Asp
　　　1400　　　　　　　　　1405　　　　　　　　　1410

Val Ser Asn Val Thr Leu Thr Leu Ser Arg Glu Ala Gly Asp Glu
　　　1415　　　　　　　　　1420　　　　　　　　　1425

Ala Thr Tyr Phe Asp Glu Ile Arg Thr Phe Glu Asn Asn Ser Ser
　　　1430　　　　　　　　　1435　　　　　　　　　1440

Met Tyr Gly Asp Lys His Asp Thr Gly Gln Gly Thr Phe Lys Gln
　　　1445　　　　　　　　　1450　　　　　　　　　1455

Asp Phe Glu Asn Val Ala Gln Gly Ile Phe Pro Phe Val Val Gly
　　　1460　　　　　　　　　1465　　　　　　　　　1470

Gly Val Glu Gly Val Glu Asp Asn Arg Thr His Leu Ser Glu Lys
　　　1475　　　　　　　　　1480　　　　　　　　　1485

His Asp Pro Tyr Thr Gln Arg Gly Trp Asn Gly Lys Lys Val Asp
　　　1490　　　　　　　　　1495　　　　　　　　　1500

Asp Val Ile Glu Gly Asn Trp Ser Leu Lys Thr Asn Gly Leu Val
　　　1505　　　　　　　　　1510　　　　　　　　　1515

Ser Arg Arg Asn Leu Val Tyr Gln Thr Ile Pro Gln Asn Phe Arg
　　　1520　　　　　　　　　1525　　　　　　　　　1530

Phe Glu Ala Gly Lys Thr Tyr Arg Val Thr Phe Glu Tyr Glu Ala
　　　1535　　　　　　　　　1540　　　　　　　　　1545

Gly Ser Asp Asn Thr Tyr Ala Phe Val Val Gly Lys Gly Glu Phe
　　　1550　　　　　　　　　1555　　　　　　　　　1560

Gln Ser Gly Arg Arg Gly Thr Gln Ala Ser Asn Leu Glu Met His
　　　1565　　　　　　　　　1570　　　　　　　　　1575

Glu Leu Pro Asn Thr Trp Thr Asp Ser Lys Lys Ala Lys Lys Val
　　　1580　　　　　　　　　1585　　　　　　　　　1590

Thr Phe Leu Val Thr Gly Ala Glu Thr Gly Asp Thr Trp Val Gly
　　　1595　　　　　　　　　1600　　　　　　　　　1605

Ile Tyr Ser Thr Gly Asn Ala Ser Asn Thr Arg Gly Asp Ala Gly
　　　1610　　　　　　　　　1615　　　　　　　　　1620

Gly Asn Ala Asn Phe Arg Gly Tyr Asn Asp Phe Met Met Asp Asn
　　　1625　　　　　　　　　1630　　　　　　　　　1635

Leu Gln Ile Glu Glu Ile Thr Leu Thr Gly Lys Met Leu Thr Glu
　　　1640　　　　　　　　　1645　　　　　　　　　1650

Asn Ala Leu Lys Asn Tyr Leu Pro Thr Val Ala Met Thr Asn Tyr
　　　1655　　　　　　　　　1660　　　　　　　　　1665

Thr Lys Glu Ser Met Asp Ala Leu Lys Glu Ala Val Phe Asn Leu
　　　1670　　　　　　　　　1675　　　　　　　　　1680

Ser Gln Ala Asp Asp Asp Ile Ser Val Glu Glu Ala Arg Ala Glu
　　　1685　　　　　　　　　1690　　　　　　　　　1695

Ile Ala Lys Ile Glu Ala Leu Lys Asn Ala Leu Val Gln Lys Lys
　　　1700　　　　　　　　　1705　　　　　　　　　1710

Thr Ala Leu Val Ala Glu Asp Phe Glu Ser Leu Asp Ala Pro Ala
　　　1715　　　　　　　　　1720　　　　　　　　　1725

Gln Pro Gly Glu Gly Leu Glu Asn Ala Phe Asp Gly Asn Val Ser
　　　1730　　　　　　　　　1735　　　　　　　　　1740

Ser Leu Trp His Thr Ser Trp Asn Gly Gly Asp Val Gly Lys Pro
　　　1745　　　　　　　　　1750　　　　　　　　　1755

Ala Thr Met Val Leu Lys Glu Pro Thr Glu Ile Thr Gly Leu Arg
　　　1760　　　　　　　　　1765　　　　　　　　　1770

Tyr Val Pro Arg Ala Ser Asp Ser Asn Gly Asn Leu Arg Asp Val
　　　1775　　　　　　　　　1780　　　　　　　　　1785

```
Lys Leu Val Val Thr Asp Glu Ser Gly Lys Glu His Thr Phe Asn
        1790                1795                1800

Val Thr Asp Trp Pro Asn Asn Lys Pro Lys Asp Ile Asp Phe
        1805                1810                1815

Gly Lys Thr Ile Lys Ala Lys Lys Ile Val Leu Thr Gly Thr Lys
        1820                1825                1830

Thr Tyr Gly Asp Gly Gly Asp Lys Tyr Gln Ser Ala Ala Glu Leu
        1835                1840                1845

Ile Phe Thr Arg Pro Gln Val Ala Glu Thr Pro Leu Asp Leu Ser
        1850                1855                1860

Gly Tyr Glu Ala Ala Leu Ala Lys Ala Gln Lys Leu Thr Asp Lys
        1865                1870                1875

Asp Asn Gln Glu Glu Val Ala Ser Val Gln Ala Ser Met Lys Tyr
        1880                1885                1890

Ala Thr Asp Asn His Leu Leu Thr Glu Arg Met Val Ala Tyr Phe
        1895                1900                1905

Ala Asp Tyr Leu Asn Gln Leu Lys Asp Ser Ala Thr Lys Pro Asp
        1910                1915                1920

Ala Pro Thr Ser Ser Lys Gly Glu Glu Gln Pro Pro Val Leu Asp
        1925                1930                1935

Val Pro Glu Phe Lys Gly Gly Val Asn Ala Thr Glu Ala Ala Val
        1940                1945                1950

His Glu Val Pro Glu Phe Lys Gly Gly Val Asn Ala Val Gln Ala
        1955                1960                1965

Leu Val His Glu Leu Pro Glu Tyr Lys Gly Gly Ala Asn Ala Val
        1970                1975                1980

Leu Ala Ala Ala Asn Glu Val Pro Glu Tyr Lys Gly Gly Ala Asn
        1985                1990                1995

Ala Val Glu Ala Leu Val Asn Glu Lys Pro Ala Tyr Thr Gly Val
        2000                2005                2010

Leu Ala Thr Ala Gly Asp Gln Ala Ala Pro Thr Val Glu Lys Pro
        2015                2020                2025

Glu Tyr Pro Leu Thr Pro Ser Pro Val Ala Asp Thr Lys Thr Pro
        2030                2035                2040

Gly Ala Lys Asp Glu Glu Lys Leu Pro Ala
        2045                2050

<210> SEQ ID NO 10
<211> LENGTH: 2065
<212> TYPE: PRT
<213> ORGANISM: Artificial Sequence
<220> FEATURE:
<223> OTHER INFORMATION: O-glycosidase from S. oralis with additional N
      terminal Met, C terminal GSGLE-His6tag, and signal sequence and C
      terminal element of LPXTG cell wall anchor motif removed

<400> SEQUENCE: 10

Met Asp Gln Ala Arg Val Gly Ser Thr Asp Asn Leu Pro Ser Glu Leu
1               5                   10                  15

Ala Asp Leu Asp Lys Lys Ala Ser Asp Glu Gly His Asp Phe Asp Lys
            20                  25                  30

Glu Ala Ala Ala Gln Asn Pro Gly Ser Ala Glu Thr Thr Glu Gly Pro
        35                  40                  45

Gln Thr Glu Glu Glu Leu Leu Ala Gln Glu Lys Glu Lys Ser Glu Lys
    50                  55                  60
```

-continued

```
Pro Ser Asn Leu Pro Lys Glu Leu Glu Asp Lys Leu Glu Lys Ala Glu
 65                  70                  75                  80

Asp Asn Gly Arg Glu Val Asp Lys Asp Gln Leu Ala Gln Asp Thr Gly
                 85                  90                  95

Lys Leu Val Pro Glu Asp Val Ala Lys Thr Thr Asn Gly Glu Leu Asn
            100                 105                 110

Tyr Gly Ala Thr Val Lys Ile Lys Thr Pro Ser Gly Glu Gly Ser Gly
        115                 120                 125

Ile Val Val Ala Lys Asp Leu Val Leu Thr Val Ser His Asn Phe Ile
130                 135                 140

Lys Asp Ser Gln Glu Gly Asn Ile Arg Lys Val Val Asp Asn Asp Gln
145                 150                 155                 160

Gly Asp Gly Asp Ile Tyr Ser Ile Ser Tyr Pro Gly Leu Pro Asp Val
                165                 170                 175

Lys Phe Ser Lys Lys Asp Ile Ile His Trp Asp Arg Glu Gly Tyr Leu
            180                 185                 190

Lys Gly Phe Lys Asn Asp Leu Ala Leu Val Arg Leu Arg Thr Val Leu
        195                 200                 205

Glu Asn Thr Pro Val Glu Val Thr Lys Lys Pro Val Val Lys Lys Ile
210                 215                 220

Gly Asp Lys Leu His Val Phe Gly Tyr Pro Glu Gly Lys Leu Asn Pro
225                 230                 235                 240

Ile Val Asn Thr Thr Val Asp Phe Ala Glu Pro Tyr Gly Glu Gly Val
                245                 250                 255

Gln Gly Ile Gly Tyr Gln Gly Gly Lys Pro Gly Ala Ser Gly Gly Gly
            260                 265                 270

Ile Phe Asp Thr Glu Gly Lys Leu Val Gly Val His Gln Asn Gly Val
        275                 280                 285

Val Gly Lys Arg Ser Gly Gly Ile Leu Phe Ser Pro Ala Gln Leu Lys
290                 295                 300

Trp Ile Gln Asp His Met Gln Gly Ile Ser Ser Val Lys Pro Ala Asp
305                 310                 315                 320

Leu Glu Glu Lys Glu Lys Pro Ala Glu Glu Lys Pro Lys Glu Asp Lys
                325                 330                 335

Pro Ala Ala Ala Lys Pro Glu Thr Pro Lys Ala Val Thr Pro Glu Trp
            340                 345                 350

Gln Thr Val Ala Asn Lys Glu Gln Gln Gly Thr Val Thr Ile Arg Glu
        355                 360                 365

Glu Lys Gly Val Arg Tyr Asn Gln Leu Ser Ser Thr Ala Gln Asn Asp
370                 375                 380

Asn Asp Gly Lys Pro Ala Leu Phe Glu Lys Gln Gly Leu Thr Val Asp
385                 390                 395                 400

Ala Asn Gly Asn Ala Thr Val Asp Leu Thr Phe Lys Asp Asp Ser Glu
                405                 410                 415

Lys Gly Lys Ser Arg Phe Gly Val Phe Leu Lys Phe Lys Asp Thr Lys
            420                 425                 430

Asn Asn Val Phe Val Gly Tyr Asp Gln Gly Gly Trp Phe Trp Glu Tyr
        435                 440                 445

Lys Thr Pro Gly Asn Ser Thr Trp Tyr Lys Gly Asn Arg Val Ala Ala
        450                 455                 460

Pro Glu Pro Gly Ser Val Asn Arg Leu Ser Ile Thr Leu Lys Ser Asp
465                 470                 475                 480

Gly Gln Leu Asn Ala Ser Asn Asn Asp Val Asn Leu Phe Asp Thr Val
```

-continued

```
                485                 490                 495
Thr Leu Pro Gly Ala Val Asn Glu Asn Leu Lys Asn Glu Lys Lys Ile
            500                 505                 510
Leu Leu Lys Ala Gly Thr Tyr Ser Asn Asp Arg Thr Val Val Ser Val
            515                 520                 525
Lys Thr Asp Asn Gln Glu Gly Val Lys Ala Asp Thr Pro Ala Gln
            530                 535                 540
Lys Glu Thr Gly Pro Ala Val Asp Asp Ser Lys Val Thr Tyr Asp Thr
545                 550                 555                 560
Ile Gln Ser Lys Val Leu Lys Ala Val Ile Asp Gln Ala Phe Pro Arg
                565                 570                 575
Val Lys Glu Tyr Thr Leu Asn Gly His Thr Leu Pro Gly Gln Val Gln
            580                 585                 590
Gln Phe Asn Gln Val Phe Ile Asn Asn His Arg Ile Thr Pro Glu Val
            595                 600                 605
Thr Tyr Lys Lys Ile Asn Glu Thr Thr Ala Glu Tyr Leu Met Lys Leu
            610                 615                 620
Arg Asp Asp Ala His Leu Ile Asn Ala Glu Met Thr Val Arg Leu Gln
625                 630                 635                 640
Val Val Asp Asn Gln Leu His Phe Asp Val Thr Lys Ile Val Asn His
                645                 650                 655
Asn Gln Val Thr Pro Gly Gln Lys Ile Asp Asp Glu Arg Lys Leu Leu
            660                 665                 670
Ser Thr Ile Ser Phe Leu Gly Asn Ala Leu Val Ser Val Ser Ser Asp
            675                 680                 685
Gln Ala Gly Ala Lys Phe Asp Gly Ala Thr Met Ser Asn Asn Thr His
            690                 695                 700
Val Ser Gly Asp Asp His Ile Asp Val Thr Asn Pro Met Lys Asp Leu
705                 710                 715                 720
Ala Lys Gly Tyr Met Tyr Gly Phe Val Ser Thr Asp Lys Leu Ala Ala
                725                 730                 735
Gly Val Trp Ser Asn Ser Gln Asn Ser Tyr Gly Gly Gly Ser Asn Asp
            740                 745                 750
Trp Thr Arg Leu Thr Ala Tyr Lys Glu Thr Val Gly Asn Ala Asn Tyr
            755                 760                 765
Val Gly Ile His Ser Ser Glu Trp Gln Trp Lys Ala Tyr Lys Gly
            770                 775                 780
Ile Val Phe Pro Glu Tyr Thr Lys Glu Leu Pro Ser Ala Lys Val Val
785                 790                 795                 800
Ile Thr Glu Asp Ala Asn Ala Asp Asn Lys Val Asp Trp Gln Asp Gly
                805                 810                 815
Ala Ile Ala Tyr Arg Ser Ile Met Asn Asn Pro Gln Gly Trp Glu Lys
            820                 825                 830
Val Lys Asp Ile Thr Ala Tyr Arg Ile Ala Met Asn Phe Gly Ser Gln
            835                 840                 845
Ala Gln Asn Pro Phe Leu Met Thr Leu Asp Gly Ile Lys Lys Ile Asn
            850                 855                 860
Leu His Thr Asp Gly Leu Gly Gln Gly Val Leu Leu Lys Gly Tyr Gly
865                 870                 875                 880
Ser Glu Gly His Asp Ser Gly His Leu Asn Tyr Ala Asp Ile Gly Lys
                885                 890                 895
Arg Ile Gly Gly Val Glu Asp Phe Lys Thr Leu Ile Glu Lys Ala Lys
            900                 905                 910
```

-continued

Lys Tyr Gly Ala His Leu Gly Ile His Val Asn Ala Ser Glu Thr Tyr
          915                 920                 925

Pro Glu Ser Lys Tyr Phe Asn Glu Asn Ile Leu Arg Lys Asn Pro Asp
    930                 935                 940

Gly Ser Tyr Ser Tyr Gly Trp Asn Trp Leu Asp Gln Gly Ile Asn Ile
945                 950                 955                 960

Asp Ala Ala Tyr Asp Leu Ala His Gly Arg Leu Ala Arg Trp Glu Asp
              965                 970                 975

Leu Lys Lys Lys Leu Gly Glu Gly Leu Asp Phe Ile Tyr Val Asp Val
          980                 985                 990

Trp Gly Asn Gly Gln Ser Gly Asp Asn Gly Ala Trp Ala Thr His Val
          995                 1000                1005

Leu Ala Lys Glu Ile Asn Lys Gln Gly Trp Arg Phe Ala Ile Glu
    1010                1015                1020

Trp Gly His Gly Gly Glu Tyr Asp Ser Thr Phe Gln His Trp Ala
    1025                1030                1035

Ala Asp Leu Thr Tyr Gly Gly Tyr Thr Asn Lys Gly Ile Asn Ser
    1040                1045                1050

Ala Ile Thr Arg Phe Ile Arg Asn His Gln Lys Asp Ser Trp Val
    1055                1060                1065

Gly Asp Tyr Arg Ser Tyr Gly Ala Ala Asn Tyr Pro Leu Leu
    1070                1075                1080

Gly Gly Tyr Ser Met Lys Asp Phe Glu Gly Trp Gln Gly Arg Ser
    1085                1090                1095

Asp Tyr Asn Gly Tyr Val Thr Asn Leu Phe Ala His Asp Val Met
    1100                1105                1110

Thr Lys Tyr Phe Gln His Phe Thr Val Ser Lys Trp Glu Asn Gly
    1115                1120                1125

Thr Pro Val Thr Met Thr Asp Asn Gly Ser Thr Tyr Lys Trp Thr
    1130                1135                1140

Pro Glu Met Lys Val Glu Leu Val Asp Ala Ala Gly Asn Lys Val
    1145                1150                1155

Val Val Thr Arg Lys Ser Asn Asp Val Asn Ser Pro Gln Tyr Arg
    1160                1165                1170

Glu Arg Thr Val Thr Leu Asn Gly Arg Val Ile Gln Asp Gly Ser
    1175                1180                1185

Ala Tyr Leu Thr Pro Trp Asn Trp Asp Ala Asn Gly Lys Lys Leu
    1190                1195                1200

Pro Thr Glu Lys Glu Lys Met Tyr Tyr Phe Asn Thr Gln Ala Gly
    1205                1210                1215

Ala Thr Thr Trp Thr Leu Pro Ser Asp Trp Ala Asn Ser Lys Val
    1220                1225                1230

Tyr Leu Tyr Lys Leu Thr Asp Gln Gly Lys Thr Glu Glu Gln Glu
    1235                1240                1245

Leu Thr Val Thr Asp Gly Lys Ile Thr Leu Asp Leu Leu Ala Asn
    1250                1255                1260

Gln Pro Tyr Val Leu Tyr Arg Ser Lys Gln Thr Asn Pro Glu Met
    1265                1270                1275

Ser Trp Ser Glu Gly Met His Ile Tyr Asp Gln Gly Phe Asn Ser
    1280                1285                1290

Gly Thr Leu Lys His Trp Thr Ile Ser Gly Asp Ala Ser Lys Ala
    1295                1300                1305

-continued

```
Glu Ile Val Lys Ser Gln Gly Ala Asn Glu Met Leu Arg Ile Gln
1310                1315                1320

Gly Asn Lys Ser Lys Val Ser Leu Thr Gln Lys Leu Thr Gly Leu
1325                1330                1335

Lys Pro Asn Thr Lys Tyr Ala Val Tyr Val Gly Val Asp Asn Arg
1340                1345                1350

Ser Asn Ala Lys Ala Ser Ile Thr Val Asn Thr Gly Glu Lys Glu
1355                1360                1365

Val Thr Thr Tyr Thr Asn Lys Ser Leu Ala Leu Asn Tyr Ile Lys
1370                1375                1380

Ala Tyr Ala His Asn Asn Arg Arg Glu Asn Ala Thr Val Asp Asp
1385                1390                1395

Thr Ser Tyr Phe Gln Asn Met Tyr Ala Phe Phe Thr Thr Gly Ser
1400                1405                1410

Asp Val Ser Asn Val Thr Leu Thr Leu Ser Arg Glu Ala Gly Asp
1415                1420                1425

Glu Ala Thr Tyr Phe Asp Glu Ile Arg Thr Phe Glu Asn Asn Ser
1430                1435                1440

Ser Met Tyr Gly Asp Lys His Asp Thr Gly Gln Gly Thr Phe Lys
1445                1450                1455

Gln Asp Phe Glu Asn Val Ala Gln Gly Ile Phe Pro Phe Val Val
1460                1465                1470

Gly Gly Val Glu Gly Val Glu Asp Asn Arg Thr His Leu Ser Glu
1475                1480                1485

Lys His Asp Pro Tyr Thr Gln Arg Gly Trp Asn Gly Lys Lys Val
1490                1495                1500

Asp Asp Val Ile Glu Gly Asn Trp Ser Leu Lys Thr Asn Gly Leu
1505                1510                1515

Val Ser Arg Arg Asn Leu Val Tyr Gln Thr Ile Pro Gln Asn Phe
1520                1525                1530

Arg Phe Glu Ala Gly Lys Thr Tyr Arg Val Thr Phe Glu Tyr Glu
1535                1540                1545

Ala Gly Ser Asp Asn Thr Tyr Ala Phe Val Val Gly Lys Gly Glu
1550                1555                1560

Phe Gln Ser Gly Arg Arg Gly Thr Gln Ala Ser Asn Leu Glu Met
1565                1570                1575

His Glu Leu Pro Asn Thr Trp Thr Asp Ser Lys Lys Ala Lys Lys
1580                1585                1590

Val Thr Phe Leu Val Thr Gly Ala Glu Thr Gly Asp Thr Trp Val
1595                1600                1605

Gly Ile Tyr Ser Thr Gly Asn Ala Ser Asn Thr Arg Gly Asp Ala
1610                1615                1620

Gly Gly Asn Ala Asn Phe Arg Gly Tyr Asn Asp Phe Met Met Asp
1625                1630                1635

Asn Leu Gln Ile Glu Glu Ile Thr Leu Thr Gly Lys Met Leu Thr
1640                1645                1650

Glu Asn Ala Leu Lys Asn Tyr Leu Pro Thr Val Ala Met Thr Asn
1655                1660                1665

Tyr Thr Lys Glu Ser Met Asp Ala Leu Lys Glu Ala Val Phe Asn
1670                1675                1680

Leu Ser Gln Ala Asp Asp Asp Ile Ser Val Glu Glu Ala Arg Ala
1685                1690                1695

Glu Ile Ala Lys Ile Glu Ala Leu Lys Asn Ala Leu Val Gln Lys
```

```
                    1700                1705                1710
Lys Thr Ala Leu Val Ala Glu Asp Phe Glu Ser Leu Asp Ala Pro
    1715                1720                1725

Ala Gln Pro Gly Glu Gly Leu Glu Asn Ala Phe Asp Gly Asn Val
    1730                1735                1740

Ser Ser Leu Trp His Thr Ser Trp Asn Gly Gly Asp Val Gly Lys
    1745                1750                1755

Pro Ala Thr Met Val Leu Lys Glu Pro Thr Glu Ile Thr Gly Leu
    1760                1765                1770

Arg Tyr Val Pro Arg Ala Ser Asp Ser Asn Gly Asn Leu Arg Asp
    1775                1780                1785

Val Lys Leu Val Val Thr Asp Glu Ser Gly Lys Glu His Thr Phe
    1790                1795                1800

Asn Val Thr Asp Trp Pro Asn Asn Lys Pro Lys Asp Ile Asp
    1805                1810                1815

Phe Gly Lys Thr Ile Lys Ala Lys Lys Ile Val Leu Thr Gly Thr
    1820                1825                1830

Lys Thr Tyr Gly Asp Gly Gly Asp Lys Tyr Gln Ser Ala Ala Glu
    1835                1840                1845

Leu Ile Phe Thr Arg Pro Gln Val Ala Glu Thr Pro Leu Asp Leu
    1850                1855                1860

Ser Gly Tyr Glu Ala Ala Leu Ala Lys Ala Gln Lys Leu Thr Asp
    1865                1870                1875

Lys Asp Asn Gln Glu Glu Val Ala Ser Val Gln Ala Ser Met Lys
    1880                1885                1890

Tyr Ala Thr Asp Asn His Leu Leu Thr Glu Arg Met Val Ala Tyr
    1895                1900                1905

Phe Ala Asp Tyr Leu Asn Gln Leu Lys Asp Ser Ala Thr Lys Pro
    1910                1915                1920

Asp Ala Pro Thr Ser Ser Lys Gly Glu Glu Gln Pro Pro Val Leu
    1925                1930                1935

Asp Val Pro Glu Phe Lys Gly Gly Val Asn Ala Thr Glu Ala Ala
    1940                1945                1950

Val His Glu Val Pro Glu Phe Lys Gly Gly Val Asn Ala Val Gln
    1955                1960                1965

Ala Leu Val His Glu Leu Pro Glu Tyr Lys Gly Gly Ala Asn Ala
    1970                1975                1980

Val Leu Ala Ala Ala Asn Glu Val Pro Glu Tyr Lys Gly Gly Ala
    1985                1990                1995

Asn Ala Val Glu Ala Leu Val Asn Glu Lys Pro Ala Tyr Thr Gly
    2000                2005                2010

Val Leu Ala Thr Ala Gly Asp Gln Ala Ala Pro Thr Val Glu Lys
    2015                2020                2025

Pro Glu Tyr Pro Leu Thr Pro Ser Pro Val Ala Asp Thr Lys Thr
    2030                2035                2040

Pro Gly Ala Lys Asp Glu Glu Lys Leu Pro Ala Gly Ser Gly Leu
    2045                2050                2055

Glu His His His His His His
    2060                2065

<210> SEQ ID NO 11
<211> LENGTH: 361
<212> TYPE: PRT
<213> ORGANISM: Akkermansia muciniphila
```

-continued

<400> SEQUENCE: 11

Glu Val Thr Val Pro Asp Ala Leu Lys Asp Arg Ile Ala Leu Lys Lys
1               5                   10                  15

Thr Ala Arg Gln Leu Asn Ile Val Tyr Phe Leu Gly Ser Asp Thr Glu
            20                  25                  30

Pro Val Pro Asp Tyr Glu Arg Arg Leu Ser Glu Leu Leu Leu Tyr Leu
        35                  40                  45

Gln Gln Phe Tyr Gly Lys Glu Met Gln Arg His Gly Tyr Gly Ala Arg
    50                  55                  60

Ser Phe Gly Leu Asp Ile Lys Ser Pro Gly Arg Val Asn Ile Ile Glu
65                  70                  75                  80

Tyr Lys Ala Lys Asn Pro Ala Ala His Tyr Pro Tyr Glu Asn Gly Gly
                85                  90                  95

Gly Trp Lys Ala Ala Gln Glu Leu Asp Glu Phe Phe Lys Ala His Pro
            100                 105                 110

Asp Arg Lys Lys Ser Gln His Thr Leu Ile Ile Met Pro Thr Trp Asn
        115                 120                 125

Asp Glu Lys Asn Gly Pro Asp Asn Pro Gly Val Pro Phe Tyr Gly
    130                 135                 140

Met Gly Arg Asn Cys Phe Ala Leu Asp Tyr Pro Ala Phe Asp Ile Lys
145                 150                 155                 160

His Leu Gly Gln Lys Thr Arg Glu Gly Arg Leu Leu Thr Lys Trp Tyr
                165                 170                 175

Gly Gly Met Ala His Glu Leu Gly His Gly Leu Asn Leu Pro His Asn
            180                 185                 190

His Gln Thr Ala Ser Asp Gly Lys Lys Tyr Gly Thr Ala Leu Met Gly
        195                 200                 205

Ser Gly Asn Tyr Thr Phe Gly Thr Ser Pro Thr Phe Leu Thr Pro Ala
    210                 215                 220

Ser Cys Ala Leu Leu Asp Ala Cys Glu Val Phe Ser Val Thr Pro Ser
225                 230                 235                 240

Gln Gln Phe Tyr Glu Gly Lys Pro Glu Val Glu Val Gly Asp Val Ala
                245                 250                 255

Ile Ser Phe Lys Gly Asp Gln Ile Leu Val Ser Gly Asn Tyr Lys Ser
            260                 265                 270

Pro Gln Thr Val Lys Ala Leu Asn Val Tyr Ile Gln Asp Pro Pro Tyr
        275                 280                 285

Ala Val Asn Gln Asp Tyr Asp Ala Val Ser Phe Ser Arg Arg Leu Gly
    290                 295                 300

Lys Lys Ser Gly Lys Phe Ser Met Lys Ile Asp Lys Lys Glu Leu Glu
305                 310                 315                 320

Gly Leu Asn Asn Asn Glu Phe Arg Ile Ser Leu Met Phe Ile Leu Ala
                325                 330                 335

Asn Gly Leu His Met Gln Lys His Phe Thr Phe His Trp Asp Ala Leu
            340                 345                 350

Gln Asp Tyr Arg Asp Gly Ser Lys Ser
        355                 360

<210> SEQ ID NO 12
<211> LENGTH: 371
<212> TYPE: PRT
<213> ORGANISM: Artificial Sequence
<220> FEATURE:
<223> OTHER INFORMATION: O-glycoprotein-specific endoprotease (LS)

<400> SEQUENCE: 12

```
Met Glu Val Thr Val Pro Asp Ala Leu Lys Asp Arg Ile Ala Leu Lys
1               5                   10                  15

Lys Thr Ala Arg Gln Leu Asn Ile Val Tyr Phe Leu Gly Ser Asp Thr
            20                  25                  30

Glu Pro Val Pro Asp Tyr Glu Arg Arg Leu Ser Glu Leu Leu Leu Tyr
        35                  40                  45

Leu Gln Gln Phe Tyr Gly Lys Glu Met Gln Arg His Gly Tyr Gly Ala
    50                  55                  60

Arg Ser Phe Gly Leu Asp Ile Lys Ser Pro Gly Arg Val Asn Ile Ile
65                  70                  75                  80

Glu Tyr Lys Ala Lys Asn Pro Ala Ala His Tyr Pro Tyr Glu Asn Gly
                85                  90                  95

Gly Gly Trp Lys Ala Ala Gln Glu Leu Asp Glu Phe Phe Lys Ala His
            100                 105                 110

Pro Asp Arg Lys Lys Ser Gln His Thr Leu Ile Ile Met Pro Thr Trp
        115                 120                 125

Asn Asp Glu Lys Asn Gly Pro Asp Asn Pro Gly Gly Val Pro Phe Tyr
130                 135                 140

Gly Met Gly Arg Asn Cys Phe Ala Leu Asp Tyr Pro Ala Phe Asp Ile
145                 150                 155                 160

Lys His Leu Gly Gln Lys Thr Arg Glu Gly Arg Leu Leu Thr Lys Trp
                165                 170                 175

Tyr Gly Gly Met Ala His Glu Leu Gly His Gly Leu Asn Leu Pro His
            180                 185                 190

Asn His Gln Thr Ala Ser Asp Gly Lys Lys Tyr Gly Thr Ala Leu Met
        195                 200                 205

Gly Ser Gly Asn Tyr Thr Phe Gly Thr Ser Pro Thr Phe Leu Thr Pro
210                 215                 220

Ala Ser Cys Ala Leu Leu Asp Ala Cys Glu Val Phe Ser Val Thr Pro
225                 230                 235                 240

Ser Gln Gln Phe Tyr Glu Gly Lys Pro Glu Val Glu Val Gly Asp Val
                245                 250                 255

Ala Ile Ser Phe Lys Gly Asp Gln Ile Leu Val Ser Gly Asn Tyr Lys
            260                 265                 270

Ser Pro Gln Thr Val Lys Ala Leu Asn Val Tyr Ile Gln Asp Pro Pro
        275                 280                 285

Tyr Ala Val Asn Gln Asp Tyr Asp Ala Val Ser Phe Ser Arg Arg Leu
290                 295                 300

Gly Lys Lys Ser Gly Lys Phe Ser Met Lys Ile Asp Lys Lys Glu Leu
305                 310                 315                 320

Glu Gly Leu Asn Asn Asn Glu Phe Arg Ile Ser Leu Met Phe Ile Leu
                325                 330                 335

Ala Asn Gly Leu His Met Gln Lys His Phe Thr Phe Trp Asp Ala
            340                 345                 350

Leu Gln Asp Tyr Arg Asp Gly Ser Lys Ser Gly Ser Gly His His His
        355                 360                 365

His His His
    370
```

<210> SEQ ID NO 13
<211> LENGTH: 6198
<212> TYPE: DNA

<213> ORGANISM: Artificial Sequence
<220> FEATURE:
<223> OTHER INFORMATION: Nucleotide encoding O-glycosidase from S. oralis (additional N terminal Met, C terminal GSGLE-His6tag, and signal sequence and C terminal element of LPXTG cell wall anchor motif removed)

<400> SEQUENCE: 13

```
atggaccaag cgcgtgtggg tagcaccgat aacctgccga gcgagctggc ggatctggac      60
aagaaagcga gcgacgaagg ccacgatttt gacaaagagg cggcggcgca gaacccgggt     120
agcgcggaaa ccaccgaagg tccgcagacc gaggaagagc tgctggcgca gaaaaagag     180
aagagcgaga agccgagcaa cctgccgaaa gaactggagg ataaactgga aaaggcggag     240
gacaacggtc gtgaagtgga taagaccag ctggcgcaag acaccggcaa gctggtgccg      300
gaggatgttg cgaaaaccac caacggtgaa ctgaactacg cgcgaccgt taaaattaag      360
accccgagcg gcgagggtag cgtattgtg gttgcgaagg acctggtgct gaccgttagc      420
cacaacttca ttaaggatag ccaggaaggt aatatccgta aagtggttga taacgaccaa      480
ggcgatggtg acatctacag cattagctat ccgggcctgc cggacgttaa gttcagcaag      540
aaagatatca tccactggga ccgtgagggt tacctgaaag gcttcaagaa cgatctggcg      600
ctggtgcgtc tgcgtaccgt tctggaaaac accccggttg aggtgaccaa gaaaccggtg      660
gttaagaaaa ttggtgacaa gctgcacgtg tttggttatc cggagggcaa actgaacccg      720
atcgtgaaca ccaccgttga tttcgcggaa ccgtacggcg agggtgttca gggcattggt      780
tatcaaggtg gcaaaccggg cgcgagcggt ggcggtatct ttgacaccga aggcaagctg      840
gttggcgtgc accagaacgg tgtggttggc aaacgtagcg gcggtattct gttcagcccg      900
gcgcaactga gtggattca ggaccacatg caaggtatca gcagcgtgaa accggcggat      960
ctggaagaga agagaagcc ggcggaagag aaaccgaagg aagacaagcc ggcggcggcg     1020
aagccggaaa ccccgaaagc ggttaccccg gagtggcaaa ccgtggcgaa caaggaacag     1080
caaggtaccg ttaccatccg tgaagagaaa ggcgtgcgtt acaaccagct gagcagcacc     1140
gcgcaaaacg ataacgacgg caagccggcg ctgtttgaga acagggtct gaccgttgac     1200
gcgaacggca acgcgaccgt ggatctgacc ttcaaggacg atagcgaaaa aggcaagagc     1260
cgtttcggcg ttttttctgaa attcaaggac accaaaaaca cgttttttgt gggttacgat     1320
caaggcggtt ggttctggga gtataagacc ccgggtaaca gcacctggta caagggtaac     1380
cgtgtggcgg cgccggaacc gggtagcgtg aaccgtctga gcattaccct gaaaagcgac     1440
ggccagctga acgcgagcaa caacgatgtg aacctgttcg acaccgttac cctgccgggt     1500
gcggtgaacg aaaacctgaa gaacgagaag aaaatcctgc tgaaagcggg cacctacagc     1560
aacgaccgta ccgtggttag cgttaagacc gataaccagg aaggtgtgaa agcggacgat     1620
accccggcgc aaaaggaaac cggtccggcg gtggacgata gcaaggttac ctacgacacc     1680
attcagagca aagtgctgaa ggcggttatc gatcaagcgt ttccgcgtgt gaaagagtat     1740
accctgaacg gtcacaccct gccgggtcag gttcagcaat taaccaagt gttcattaac     1800
aaccaccgta tcaccccgga agtgacctat aagaaaatta cgaaaccacc gcgggagtac     1860
ctgatgaagc tgcgtgacga tgcgcacctg atcaacgcgg aaatgaccgt gcgtctgcag     1920
gtggttgata ccaactgca cttcgacgtg accaaaattg ttaaccacaa ccaggttacc     1980
ccgggtcaaa agattgacga tgagcgtaaa ctgctgagca ccatcagctt tctgggcaac     2040
gcgctggtta gcgtgagcag cgatcaagcg ggtgcgaagt ttgatggtgc gaccatgagc     2100
```

```
aacaacaccc acgttagcgg tgacgatcac atcgatgtga ccaacccgat gaaagacctg   2160
gcgaagggtt acatgtatgg ctttgttagc accgacaagc tggcggcggg tgtgtggagc   2220
aacagccaaa acagctacgg cggtggcagc aacgattgga cccgtctgac cgcgtataaa   2280
gaaaccgttg gtaacgcgaa ctacgtgggc attcacagca gcgaatggca gtgggagaaa   2340
gcgtacaagg gtatcgtgtt cccggaatat accaaggagc tgccgagcgc gaaagtggtt   2400
atcaccgagg atgcgaacgc ggacaacaaa gtggattggc aggacggtgc gattgcgtac   2460
cgtagcatca tgaacaaccc gcaaggctgg gaaaaagtta aggacattac cgcgtatcgt   2520
atcgcgatga actttggtag ccaggcgcaa aacccgttcc tgatgaccct ggacggcatc   2580
aagaaaatta acctgcacac cgatggcctg ggtcagggcg ttctgctgaa gggttatggt   2640
agcgagggtc atgacagcgg tcacctgaac tacgcggata tcggtaaacg tattggtggc   2700
gtggaagact ttaagaccct gattgagaaa gcgaagaaat acggtgcgca cctgggcatc   2760
cacgttaacg cgagcgaaac ctacccggag agcaagtatt tcaacgaaaa cattctgcgt   2820
aaaaacccgg acggtagcta cagctatggc tggaactggc tggatcaggg tatcaacatt   2880
gatgcggcgt acgacctggc gcatggccgt ctggcgcgtt gggaggacct gaagaaaaag   2940
ctgggtgaag gcctggattt tatctatgtt gacgtgtggg gtaacggtca gagcggtgat   3000
aacggtgcgt gggcgacccca tgtgctggcg aaagagatta caagcaagg ttggcgtttt   3060 gcgatcgaat ggggccacgg tggcgagtac gacagcacct ccagcactg gcggcggat   3120 ctgacctacg gtggctatac caacaagggt atcaacagcg cgattacccg tttcatccgt   3180
aaccaccaga aagatagctg ggttggcgac taccgtagct atggtggcgc ggcgaactac   3240
ccgctgctgg gtggctatag catgaaggac tttgagggtt ggcaaggccg tagcgattac   3300
aacggttatg ttaccaacct gttcgcgcac gacgtgatga ccaagtactt tcagcacttc   3360
accgttagca aatgggaaaa cggtaccccg gtgaccatga ccgataacgg cagcacctat   3420
aagtggaccc cggaaatgaa agtggagctg gttgacgcgg cgggtaacaa ggtggttgtg   3480
acccgtaaaa gcaacgatgt gaacagcccg cagtaccgtg agcgtaccgt taccctgaac   3540
ggtcgtgtga tccaagacgg cagcgcgtat ctgaccccgt ggaactggga tgcgaacggt   3600
aaaaagctgc cgaccgaaaa agagaagatg tactatttta cacccaagc gggtgcgacc   3660 acctggaccc tgccgagcga ctgggcgaac agcaaggttt acctgtataa actgaccgat   3720
cagggcaaga ccgaggagca agaactgacc gtgaccgatg gcaaaattac cctggacctg   3780
ctggcgaacc agccgtacgt tctgtatcgt agcaagcaaa ccaacccgga atgagctgg   3840 agcgagggta tgcacatcta cgaccaaggt ttcaacagcg gcaccctgaa acactggacc   3900
attagcggcg atgcgagcaa ggcggagatc gtgaaaagcc agggtgcgaa cgaaatgctg   3960
cgtatccaag gcaacaaaag caaggttagc ctgacccaga agctgaccgg tctgaaaccg   4020
aacaccaagt acgcggttta tgtgggcgtt gacaaccgta gcaacgcgaa agcgagcatt   4080
accgttaaca ccggtgaaaa agaggtgacc acctacacca caagagcct ggcgctgaac   4140 tacatcaaag cgtatgcgca caacaaccgt cgtgagaacg cgaccgtgga cgataccagc   4200
tacttccaga acatgtatgc gttctttacc accggtagcg acgtgagcaa cgttaccctg   4260
accctgagcc gtgaagcggg cgatgaggcg acctattttg acgaaattcg taccttcgag   4320
aacaacagca gcatgtacgg tgataagcac gacaccggtc agggcacctt taaacaagat   4380
ttcgaaaacg ttgcgcaagg tatcttcccg tttgttgtgg gtggcgtgga aggcgttgag   4440
gacaaccgta cccacctgag cgagaagcac gatccgtaca cccagcgtgg ttggaacggc   4500
```

-continued

```
aaaaaggtgg acgatgttat tgagggtaac tggagcctga aaaccaacgg cctggttagc    4560
cgtcgtaacc tggtgtacca gaccatcccg caaaacttcc gttttgaggc gggcaagacc    4620
taccgtgtga cctttgaata tgaggcgggc agcgacaaca cctatgcgtt tgttgtgggt    4680
aaaggcgaat tccagagcgg tcgtcgtggc acccaagcga gcaacctgga aatgcacgag    4740
ctgccgaaca cctggaccga tagcaaaaag gcgaaaaagg tgaccttcct ggttaccggt    4800
gcggaaaccg gtgacacctg ggtgggtatc tacagcaccg gcaacgcgag caacacccgt    4860
ggtgatgcgg gtggcaacgc gaactttcgt ggctataacg atttcatgat ggacaacctg    4920
caaatcgaag agattaccct gaccggcaag atgctgaccg aaaacgcgct gaaaaactat    4980
ctgccgaccg ttgcgatgac caactacacc aaggaaagca tggacgcgct gaaagaggcg    5040
gttttcaacc tgagccaggc ggacgatgac atcagcgtgg aagaggcgcg tgcggaaatc    5100
gcgaagattg aggcgctgaa aaacgcgctg gttcagaaaa agaccgcgct ggttgcggaa    5160
gattttgaga gcctggatgc gccggcgcaa ccgggtgaag gcctggagaa cgcgttcgac    5220
ggtaacgtta gcagcctgtg gcacaccagc tggaacggtg gcgatgttgg caagccggcg    5280
accatggtgc tgaaagaacc gaccgagatc accggtctgc gttatgtgcc gcgtgcgagc    5340
gatagcaacg gcaacctgcg tgacgttaag ctggttgtga ccgatgaaag cggtaaagag    5400
cacacccttta acgtgaccga ctggccgaac aacaacaaac cgaaggatat tgacttcggc    5460
aaaaccatta aggcgaaaaa gatcgttctg accggtacca agacctacgg cgatggtggc    5520
gacaaatatc agagcgcggc ggagctgatc tttacccgtc cgcaagtggc ggaaaccccg    5580
ctggatctga gcggttacga agcggcgctg gcgaaagcgc agaagctgac cgataaggac    5640
aaccaggaag aggtggcgag cgttcaagcg agcatgaaat atgcgaccga caaccacctg    5700
ctgaccgaac gtatggttgc gtacttcgcg gattatctga accaactgaa ggatagcgcg    5760
accaaaccgg atgcgccgac cagcagcaag ggtgaagaac agccgccggt gctggatgtt    5820
ccggagttta aggtggcgt gaacgcgacc gaggcggcgg tgcacgaagt tccggagttc    5880
aagggtggcg tgaacgcggt tcaggcgctg gttcacgaac tgccggagta taaaggtggc    5940
gcgaacgcgg ttctggcggc ggcgaacgaa gtgccggagt acaagggtgg cgcgaacgcg    6000
gtggaagcgc tggttaacga gaaaccggcg tataccggtg ttctggcgac cgcgggcgac    6060
caggcggcgc cgaccgtgga aaaaccggag tacccgctga ccccgagccc ggttgcggac    6120
accaaaaccc cgggtgcgaa agatgaagag aagctgccgg cgggtagcgg cctcgagcac    6180
caccaccacc accactga                                                  6198
```

ENZYMES FOR GLYCAN ANALYSIS

FIELD OF THE INVENTION

The present invention relates to enzymes and combinations thereof useful for studying glycoproteins, and corresponding methods of use.

BACKGROUND OF THE INVENTION

Glycosylation of proteins plays a pivotal role in many physiological functions in humans, including signalling, transportation, protection from proteolytic activity, adherence, inflammatory response, microbial colonization, etc. Most of the glycan chains attached to proteins, whether O- or N-linked, are decorated with terminal sialic acids. Being the outermost glycan on glycoproteins, their presence/absence is often critical for the downstream effect, including for example the inflammatory potential in immuno-globulins. Sialic acids on proteins are heterogenous, both in terms of presence/absence on a given protein, as well as individual structural modifications. They are also generally negatively charged which complicates mass spectrometry analysis. This makes the study of glycoproteins difficult, as well as reducing the ability of manufacturers to confirm that a glycoprotein batch will function in a homologous matter. To overcome these problems attempts have been made to genetically engineer CHO cells to reduce the complexity of glycans, although this may affect function. Chemical approaches have also been used, but these often damage the proteins. There is a need for an alternative approach to remove sialic acid from glycoproteins. Furthermore, once sialic acids are removed, there is a need for more tools to study the remaining glycan chains, particularly those which are O-linked.

SUMMARY OF THE INVENTION

The present invention provides:
A composition comprising a first sialidase which is independently selected from:
  (a) a polypeptide comprising or consisting of an amino acid sequence of SEQ ID NO: 2;
  (b) a polypeptide comprising or consisting of an amino acid sequence which is at least 85% identical to the amino acid sequence of SEQ ID NO: 2 or
  (c) a polypeptide comprising or consisting of an amino acid sequence which is a fragment of the sequence of SEQ ID NO: 2 or a fragment of an amino acid which is 85% identical to the amino acid sequence of SEQ ID NO: 2;
optionally wherein said first sialidase includes an additional methionine at the N terminus and/or a histidine tag at the C terminus, which tag may be joined to the C terminus by a linker.
The present invention also provides a composition as defined above which further comprises a second sialidase which is independently selected from:
  (d) a polypeptide comprising or consisting of an amino acid sequence of SEQ ID NO: 5;
  (e) a polypeptide comprising or consisting of an amino acid sequence which is at least 85% identical to the amino acid sequence of SEQ ID NO: 5 or
  (f) a polypeptide comprising or consisting of an amino acid sequence which is a fragment of the sequence of SEQ ID NO: 5 or a fragment of an amino acid which is 85% identical to the amino acid sequence of SEQ ID NO: 5.
optionally wherein said second sialidase includes an additional methionine at the N terminus and/or a histidine tag at the C terminus, which tag may be joined to the C terminus by a linker.

The composition may additionally comprises a glycosidase and/or a protease, which is optionally present in highly purified or isolated form.

The present invention also provides a method for modifying a glycoprotein comprising contacting a sample containing the glycoprotein with a as defined above optionally wherein the resulting products are analysed.

BRIEF DESCRIPTION OF THE FIGURES

FIG. 3: Optimal conditions for Am0707 and Am1757 were determined. Conditions affecting the enzymatic activity of the sialidases, including ions, NaCl, and pH were investigated using 2-3 sialyllactose substrate, with free sialic acids being quantitated after 15 minutes incubation.

FIG. 7: The GVS_Smix (the AM1757+Am0707 mixture; first set of bars) releases sialic acids from native proteins at a level similar to, or better, than all three tested commercial products (the last three sets of bars). The Am1757 enzyme alone is also shown (second set of bars). Proteins were mixed with sialidases in their respective buffer and incubated for 15 minutes before addition of sialic acid development buffer. All incubations took place at 37° C. in the respective buffers (for GVS-Smix this was 20 mM Tris-HCl pH 6.8).

FIG. 15: Finalized product is competitive. Using a enzyme:substrate 1:40 ratio of the O-glycosidase, as well as enzyme substrate ratio of 1:40+1:40 for the Am1757+ Am0707 in the sialidase mixture, all three enzymes in 20 mM Tris-HCl pH 6.8 (lanes labeled Smix/O-glyk), the activity of the *S. oralis* O-glycosidase was compared to that of the commercial O-glycosidase+sialidase combination (lanes labelled NEB (O-glyk kit). O-glycan removal from TNFαR by the *S. oralis* O-glycosidase+sialidase mix ("+GVS") was verified with lectin blotting, using ConA (N-linked glycans) and jacalin (0-linked glycans), untreated TNFαR as a control.

BRIEF DESCRIPTION OF THE SEQUENCES

Figure 1:
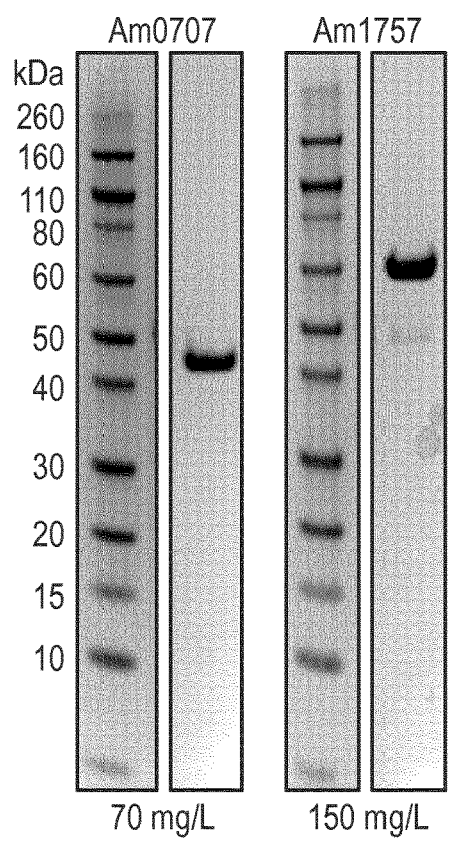
FIG. 1: Expression and purification of *Akkermansia* sialidases. All four sialidases, herein represented by Am0707 and Am1757, expressed well and were able to be purified to high homogeneity. Values (mg/mL) indicate the concentration obtained after His-purification.

SEQ ID NOs: 1, 2 and 3 are each an amino acid sequence of a sialidase isolated from *Akkermansia muciniphila*. SEQ ID NO: 1 is the wildtype sequence including a signal motif at the N terminus. SEQ ID NO: 2 is the wildtype sequence with signal motif removed. SEQ ID NO: 3 is identical to SEQ ID NO: 2, except it includes an additional N terminal Methionine and a C-terminal linker+$His_6$ tag. Any sequence comprising the sequence of SEQ ID NO: 2 (including each of SEQ ID NOs: 1 to 3) may be referred to herein as Am0707.

SEQ ID NOs: 4, 5 and 6 are each an amino acid sequence of another sialidase isolated from *Akkermansia muciniphila*. SEQ ID NO: 4 is the wildtype sequence including a signal motif at the N terminus. SEQ ID NO: 5 is the wildtype sequence with signal motif removed. SEQ ID NO: 6 is identical to SEQ ID NO: 5, except it includes an additional N terminal Methionine and a C-terminal linker+$His_6$ tag. Any sequence comprising the sequence of SEQ ID NO: 5 (including each of SEQ ID NOs: 4 to 6) may be referred to herein as Am1757.

SEQ ID NOs: 7, 8, 9 and 10 are each an amino sequence of an O-glycosidase isolated from *S. oralis*. SEQ ID NO: 7 is the wildtype sequence including a signal motif at the N terminus and an LPXTG wall anchor motif at the C terminus. SEQ ID NO: 8 is the wildtype sequence with signal motif removed. SEQ ID NO: 9 is the wildtype sequence with signal motif and the wall anchor motif removed. SEQ ID NO: 10 is identical to SEQ ID NO: 9, except it includes an additional N terminal Methionine and a C-terminal linker+$His_6$ tag. Any sequence comprising the sequence of SEQ ID NO: 9 (including each of SEQ ID NOs: 7 to 10) may be referred to herein as "O-glyk" or "So".

SEQ ID NO: 11 is an amino acid sequence of an O-glycoprotein-specific endoprotease.

SEQ ID NO: 12 is the amino acid sequence of an exemplary polypeptide having O-glycoprotein-specific endoprotease activity. Relative to SEQ ID NO: 11 it includes an additional N terminal Methionine and a C-terminal linker+His6 tag. The polypeptide consisting of this sequence may be referred to herein as LS.

SEQ ID NO: 13 is an exemplary nucleic acid sequence encoding the polypeptide consisting of the amino acid sequence of SEQ ID NO: 10.

DETAILED DESCRIPTION OF THE INVENTION

It is to be understood that different applications of the disclosed products and methods may be tailored to the specific needs in the art. It is also to be understood that the terminology used herein is for the purpose of describing particular embodiments of the invention only, and is not intended to be limiting. All publications, patents and patent applications cited herein, whether supra or infra, are hereby incorporated by reference in their entirety.

As used in this specification and the appended claims, the singular forms "a", "an", and "the" include plural referents unless the content clearly dictates otherwise. Thus, for example, reference to "a polypeptide" includes "polypeptides", and the like.

This specification is particularly concerned with polypeptides which are sialidases, O-glycosidases and O-glycoprotein-specific endoproteases. General uses of the term polypeptide may thus be applied to each of these types of enzyme.

General Polypeptide Features

A "polypeptide" is used herein in its broadest sense to refer to a compound of two or more subunit amino acids, amino acid analogs, or other peptidomimetics. The term "polypeptide" thus includes short peptide sequences and also longer polypeptides and proteins. The terms "protein", "peptide" and "polypeptide" may be used interchangeably. As used herein, the term "amino acid" refers to either natural and/or unnatural or synthetic amino acids, including both D or L optical isomers, and amino acid analogs and peptidomimetics.

A polypeptide may be produced by suitable method, including recombinant or synthetic methods. For example, the polypeptide may be synthesised directly using standard techniques known in the art, such as Fmoc solid phase chemistry, Boc solid phase chemistry or by solution phase peptide synthesis. Alternatively, a polypeptide may be produced by transforming a cell, typically a bacterial cell, with a nucleic acid molecule or vector which encodes said polypeptide. Production of polypeptides by expression in bacterial host cells is described below and is exemplified in the Examples. The invention provides nucleic acid molecules and vectors which encode a polypeptide of the invention. The invention also provides a host cell comprising such a nucleic acid or vector. An exemplary polynucleotide molecules encoding a polypeptide disclosed herein is provided as SEQ ID NO: 13. This sequence includes at the 3' end a codon for the N terminal methionine (ATG) and, prior to the stop codon (TAA) at the 5' end, codons for a GSGLE linker and a 6×His tag, which may optionally be excluded. The optional inclusion of an additional methionine and a tag are discussed in more detail below.

The terms "nucleic acid molecule" and "polynucleotide" are used interchangeably herein and refer to a polymeric form of nucleotides of any length, either deoxyribonucleotides or ribonucleotides, or analogs thereof. Non-limiting examples of polynucleotides include a gene, a gene fragment, messenger RNA (mRNA), cDNA, recombinant polynucleotides, plasmids, vectors, isolated DNA of any sequence, isolated RNA of any sequence, nucleic acid probes, and primers. A polynucleotide of the invention encodes a polypeptide of the invention and may be provided in isolated or substantially isolated form. By substantially isolated, it is meant that there may be substantial, but not total, isolation of the polypeptide from any surrounding medium. The polynucleotides may be mixed with carriers or diluents which will not interfere with their intended use and still be regarded as substantially isolated. A nucleic acid sequence which "encodes" a selected polypeptide is a nucleic acid molecule which is transcribed (in the case of DNA) and translated (in the case of mRNA) into a polypeptide in vivo when placed under the control of appropriate regulatory sequences, for example in an expression vector. The boundaries of the coding sequence are determined by a start codon at the 5' (amino) terminus and a translation stop codon at the 3' (carboxy) terminus. For the purposes of the invention, such nucleic acid sequences can include, but are not limited to, cDNA from viral, prokaryotic or eukaryotic mRNA, genomic sequences from viral or prokaryotic DNA or RNA, and even synthetic DNA sequences. A transcription termination sequence may be located 3' to the coding sequence.

Polynucleotides can be synthesised according to methods well known in the art, as described by way of example in Sambrook et al (1989, Molecular Cloning—a laboratory manual; Cold Spring Harbor Press). The nucleic acid molecules of the present invention may be provided in the form of an expression cassette which includes control sequences operably linked to the inserted sequence, thus allowing for expression of the polypeptide of the invention in vivo. These expression cassettes, in turn, are typically provided within vectors (e.g., plasmids or recombinant viral vectors). Such an expression cassette may be administered directly to a host subject. Alternatively, a vector comprising a polynucleotide of the invention may be administered to a host subject. Preferably the polynucleotide is prepared and/or administered using a genetic vector. A suitable vector may be any vector which is capable of carrying a sufficient amount of genetic information, and allowing expression of a polypeptide of the invention.

The present invention thus includes expression vectors that comprise such polynucleotide sequences. Such expression vectors are routinely constructed in the art of molecular biology and may for example involve the use of plasmid DNA and appropriate initiators, promoters, enhancers and other elements, such as for example polyadenylation signals which may be necessary, and which are positioned in the correct orientation, in order to allow for expression of a peptide of the invention. Other suitable vectors would be apparent to persons skilled in the art. By way of further example in this regard we refer to Sambrook et al.

The invention also includes cells that have been modified to express a polypeptide of the invention. Such cells typically include prokaryotic cells such as bacterial cells, for example E. coli. Such cells may be cultured using routine methods to produce a polypeptide of the invention.

A polypeptide may be derivatised or modified to assist with their production, isolation or purification. For example, where a polypeptide of the invention is produced by recombinant expression in a bacterial host cell, the sequence of the polypeptide may include an additional methionine (M) residue at the N terminus to improve expression. As another example, the polypeptide of the invention may be derivatised or modified by addition of a ligand which is capable of binding directly and specifically to a separation means. Alternatively, the polypeptide may be derivatised or modified by addition of one member of a binding pair and the separation means comprises a reagent that is derivatised or modified by addition of the other member of a binding pair. Any suitable binding pair can be used. In a preferred embodiment where the polypeptide for use in the invention is derivatised or modified by addition of one member of a binding pair, the polypeptide is preferably histidine-tagged or biotin-tagged. Typically the amino acid coding sequence of the histidine or biotin tag is included at the gene level and the polypeptide is expressed recombinantly in E. coli. The histidine or biotin tag is typically present at either end of the polypeptide, preferably at the C-terminus. It may be joined directly to the polypeptide or joined indirectly by any suitable linker sequence, such as 3, 4 or 5 amino acids. The linker may typically consist predominantly of glycine and serine residues. The histidine tag typically consists of six histidine residues, although it can be longer than this, typically up to 7, 8, 9, 10 or 20 amino acids or shorter, for example 5, 4, 3, 2 or 1 amino acids.

A polypeptide may be provided in a substantially isolated or purified form. That is, isolated from the majority of the other components present in a cellular extract from a cell in which the polypeptide was expressed. By substantially purified, it will be understood that the polypeptide is purified to at least 50%, 60%, 70%, 80% or preferably at least 90% homogeneity. Purity level may be assessed by any suitable means, but typically involves SDS-PAGE analysis of a sample, followed by Coomassie Blue detection. A polypeptide may be mixed with carriers, diluents or preservatives which will not interfere with the intended purpose of the polypeptide and still be regarded as substantially isolated or purified. Where a polypeptide is provided in a composition with an additional active component, such as another polypeptide, each said polypeptide will individually be purified to a high level of homogeneity prior to mixing in an appropriate ratio for the intended purpose of each. For example, two polypeptides may be each be purified to at least 90% homogeneity prior to combining in a 1:1 ratio.

A polypeptide (or mixture thereof) may be provided in lyophilised form, suitable for reconstitution in aqueous solution prior to use. The lyophilised composition has improved stability enabling longer storage of the polypeptide. A method of preparing a polypeptide (or mixture thereof) in lyophilised form, comprising freeze-drying said polypeptide (or mixture) in a suitable buffer, such as Tris-buffered saline (TBS), is provided herein. A polypeptide is typically substantially purified prior to freeze-drying. The resulting polypeptide (or mixture) in lyophilised form is also provided. A method of preparing a solution of a polypeptide (or mixture), comprising providing the polypeptide (or mixture) in lyophilised form and reconstituting with a suitable carrier or diluent, such as water, is also provided.

A polypeptide may be immobilised using methods known in the art, for example as described in Datta S et al., Enzyme immobilization: an overview on techniques and support materials, 3 *Biotech*, 3(1):1-9 (2013). For example, the polypeptide may be immobilised by adsorption, covalent binding, affinity immobilization or entrapment. Materials that can be used as supports include but are not limited to for example, natural supports such as agarose, collagen, gelatin, cellulose, pectin, sepharose, inorganic materials such as ceramics, silica, glass, activated carbon or charcoal, or synthetic polymers. For example, the polypeptide may be immobilised on sepharose.

Sialidases

Functional Features

Besides using chemical and genetic approaches to modify glycan chains, several enzymes (glycosidases) can act upon the bonds linking sialic acids to other glycans. These enzymes, termed sialidases or neuraminidases, show a high degree of specificity for particular types of sialic acid bond. Three distinct bond types are commonly found within human glycoproteins, with alpha(2-3) bonds being the dominant form, followed by alpha(2-6) and alpha(2-8). These bond types may be referred to herein as 2-3, 2-6 and 2-8 bonds for simplicity. A 2-3 bond means that the carbon atom at position number 2 of the sialic acid hexose is joined, via an oxygen atom, to the carbon at position 3 of the hexose of the linked glycan. Correspondingly, a 2-6 bond or a 2-8 bond means that the join is to position 6 or position 8 of the hexose of the linked glycan, respectively.

Most known sialidases are either specific for the 2-3 bond (cleaving it with very high activity), or are able to cleave a wider range of bonds, typically all of 2-3, 2-6 and 2-8 bonds. These different types of sialidase may be referred to as narrow spectrum or broad spectrum, respectively. Broad spectrum sialidases typically exhibit high activity against 2-3 bonds, with decreasing activity against 2-6, and very low activity against 2-8 bonds. Enzymes which cleave 2-8 bonds efficiently are comparatively rare (even unknown) in the field.

The enzymatic activity of a sialidase may be assessed by any suitable method, such as those described in the Examples. A suitable method may include incubating a known or suspected sialidase with a standard sialidase substrate, such as one or more small molecules which collectively comprise 2-3, 2-6 and 2-8 type bonds. Such small molecules include 2-3'-sialyllactose, 2-6'-sialyllactose, and colominic acid (2-8'). Sialidase activity on such molecules will result in free sialic acids, which may be quantified by routine methods. Alternatively sialidase activity may be assessed using a glycoprotein as substrate. Any resulting cleavage products may be detected and quantified using routine methods such as SDS-PAGE or lectin blots.

Structural Features

The present inventors have identified and characterized several sialidases from the commensal gut bacterium *Akkermansia muciniphila*. One of the sialidases, referred to herein as Am0707, has unexpectedly high activity against 2-8 bonds, but can also cleave 2-3 and 2-6 bonds. It may thus be considered a broad spectrum sialidase. Another sialidase, referred to herein as Am1757, has exclusively high activity against 2-3 bonds. It may thus be considered a narrow spectrum sialidase.

The full wildtype primary structure (amino acid sequence) of the first sialidase (Am0707) is shown in SEQ ID NO: 1. The sequence with signal motif removed is shown in SEQ ID NO: 2. The first sialidase may comprise, consist essentially, or consist of the sequence of SEQ ID NO: 2, and is typically no longer than 400 amino acids.

The full wildtype primary structure (amino acid sequence) of the second sialidase (Am1757) is shown in SEQ ID NO: 4. The sequence with signal motif removed is shown in SEQ ID NO: 5. The second sialidase may comprise, consist essentially, or consist of the sequence of SEQ ID NO: 5, and is typically no longer than 600 amino acids.

Alternatively, the said first and/or said second sialidase may each independently be replaced by a variant of each thereof, provided that enzymatic activity is retained. A variant of a said sialidase may comprise, consist essentially, or consist of a variant of the amino acid sequence of sequence of SEQ ID NO: 2 or 5, respectively, which is at least 50% identical to said amino acid sequence. The variant sequence may be at least 60%, at least 70%, at least 80%, at least, 85%, at least 90%, at least 95%, at least 98% or at least 99% identical to said amino acid sequence. The identity level is preferably at least 85% or higher. Identity relative to a sequence can be measured over a region of at least 100, at least 200, at least 300, at least 350, at least 400, or at least 500 or more contiguous amino acids of the sequence, or more preferably over the full length of the sequence. A variant is typically of a length which is no more than 50 amino acids longer or shorter than the reference sequence, and is preferably of approximately (or exactly) the same length as the reference sequence.

Amino acid identity may be calculated using any suitable algorithm. For example the PILEUP and BLAST algorithms can be used to calculate identity or line up sequences (such as identifying equivalent or corresponding sequences (typically on their default settings), for example as described in Altschul S. F. (1993) J Mol Evol 36:290-300; Altschul, S, F et al (1990) J Mol Biol 215:403-10. Software for performing BLAST analyses is publicly available through the National Center for Biotechnology Information (www.ncbi.nlm.nih-.gov/). This algorithm involves first identifying high scoring sequence pair (HSPs) by identifying short words of length W in the query sequence that either match or satisfy some positive-valued threshold score T when aligned with a word of the same length in a database sequence. T is referred to as the neighbourhood word score threshold (Altschul et al, supra). These initial neighbourhood word hits act as seeds for initiating searches to find HSPs containing them. The word hits are extended in both directions along each sequence for as far as the cumulative alignment score can be increased. Extensions for the word hits in each direction are halted when: the cumulative alignment score falls off by the quantity X from its maximum achieved value; the cumulative score goes to zero or below, due to the accumulation of one or more negative-scoring residue alignments; or the end of either sequence is reached. The BLAST algorithm parameters W, T and X determine the sensitivity and speed of the alignment. The BLAST program uses as defaults a word length (W) of 11, the BLOSUM62 scoring matrix (see Henikoff and Henikoff (1992) Proc. Natl. Acad. Sci. USA 89:10915-10919) alignments (B) of 50, expectation (E) of 10, M=5, N=4, and a comparison of both strands.

The BLAST algorithm performs a statistical analysis of the similarity between two sequences; see e.g., Karlin and Altschul (1993) Proc. Natl. Acad. Sci. USA 90: 5873-5787. One measure of similarity provided by the BLAST algorithm is the smallest sum probability (P(N)), which provides an indication of the probability by which a match between two polynucleotide or amino acid sequences would occur by chance. For example, a sequence is considered similar to another sequence if the smallest sum probability in comparison of the first sequence to the second sequence is less than about 1, preferably less than about 0.1, more preferably less than about 0.01, and most preferably less than about 0.001. Alternatively, the UWGCG Package provides the BESTFIT program which can be used to calculate identity (for example used on its default settings) (Devereux et al (1984) Nucleic Acids Research 12, 387-395).

The sequence of a sialidase may comprise a variant of the respective SEQ ID NO in which modifications, such as amino acid additions, deletions or substitutions are made relative to the sequence said SEQ ID NO. Unless otherwise specified, the modifications are preferably conservative amino acid substitutions. Conservative substitutions replace amino acids with other amino acids of similar chemical structure, similar chemical properties or similar side-chain volume. The amino acids introduced may have similar polarity, hydrophilicity, hydrophobicity, basicity, acidity, neutrality or charge to the amino acids they replace. Alternatively, the conservative substitution may introduce another amino acid that is aromatic or aliphatic in the place of a pre-existing aromatic or aliphatic amino acid. Conservative amino acid changes are well-known in the art and may be selected in accordance with the properties of the 20 main amino acids as defined in Table A1 below. Where amino acids have similar polarity, this can be determined by reference to the hydropathy scale for amino acid side chains in Table A2. A sequence of a sialidase of the invention may comprise a variant of the respective SEQ ID NO in which upto 10, 20, 30, 40, 50 or 60 conservative substitutions are made.

TABLE A1

Chemical properties of amino acids

| | | | | |
|---|---|---|---|---|
| Ala (A) | aliphatic, hydrophobic, neutral | | Met (M) | hydrophobic, neutral |
| Cys (C) | polar, hydrophobic, neutral | | Asn (N) | polar, hydrophilic, neutral |
| Asp (D) | polar, hydrophilic, charged (−) | | Pro (P) | hydrophobic, neutral |
| Glu (E) | polar, hydrophilic, charged (−) | | Gln (Q) | polar, hydrophilic, neutral |
| Phe (F) | aromatic, hydrophobic, neutral | | Arg (R) | polar, hydrophilic, charged (+) |
| Gly (G) | aliphatic, neutral | | Ser (S) | polar, hydrophilic, neutral |
| His (H) | aromatic, polar, hydrophilic, charged (+) | | Thr (T) | polar, hydrophilic, neutral |
| Ile (I) | aliphatic, hydrophobic, neutral | | Val (V) | aliphatic, hydrophobic, neutral |
| Lys (K) | polar, hydrophilic, charged(+) | | Trp (W) | aromatic, hydrophobic, neutral |
| Leu (L) | aliphatic, hydrophobic, neutral | | Tyr (Y) | aromatic, polar, hydrophobic |

TABLE A2

Hydropathy scale

| Side Chain | Hydropathy |
|---|---|
| Ile | 4.5 |
| Val | 4.2 |
| Leu | 3.8 |
| Phe | 2.8 |
| Cys | 2.5 |
| Met | 1.9 |
| Ala | 1.8 |
| Gly | −0.4 |
| Thr | −0.7 |
| Ser | −0.8 |
| Trp | −0.9 |
| Tyr | −1.3 |
| Pro | −1.6 |
| His | −3.2 |

TABLE A2-continued

Hydropathy scale

| Side Chain | Hydropathy |
|---|---|
| Glu | −3.5 |
| Gln | −3.5 |
| Asp | −3.5 |
| Asn | −3.5 |
| Lys | −3.9 |
| Arg | −4.5 |

Alternatively, a sialidase may be replaced by a shorter fragment of the respective SEQ ID NO or of a variant thereof as described above. The fragments may be described as a truncated form of said SEQ ID NO which retains enzymatic activity. Such fragments are shorter than the corresponding SEQ ID NO and are typically at least 100, 150, 200, 250, 300, 350, 400, 450 or 500 amino acids in length.

Any sialidase described herein may optionally include an additional methionine at the N terminus and/or a histidine or other tag at the C terminus. Such additional sequences may aid with expression and/or purification. A histidine tag preferably consists of six histidine residues. The histidine tag is preferably linked to the C terminus by a linker, which is typically a short sequence of amino acids, such as 3-5 amino acids. The linker typically consists predominantly of glycine and serine residues, and may preferably include the sequence GSG. For example GSG and GSGLE are suitable linkers.

In summary therefore, a first sialidase is:
(a) a polypeptide comprising or consisting of an amino acid sequence of SEQ ID NO: 2;
(b) a polypeptide comprising or consisting of an amino acid sequence which is at least 85% identical to the amino acid sequence of SEQ ID NO: 2 or
(c) a polypeptide comprising or consisting of an amino acid sequence which is a fragment of the sequence of SEQ ID NO: 2 or a fragment of an amino acid which is 85% identical to the amino acid sequence of SEQ ID NO: 2;

and a second sialidase is:
(d) a polypeptide comprising or consisting of an amino acid sequence of SEQ ID NO: 5;
(e) a polypeptide comprising or consisting of an amino acid sequence which is at least 85% identical to the amino acid sequence of SEQ ID NO: 5 or
(f) a polypeptide comprising or consisting of an amino acid sequence which is a fragment of the sequence of SEQ ID NO: 5 or a fragment of an amino acid which is 85% identical to the amino acid sequence of SEQ ID NO: 5;

optionally wherein said first and/or said second sialidase includes an additional methionine at the N terminus and/or a histidine tag at the C terminus, which tag may be joined to the C terminus by a linker.

An exemplary first sialidase is the polypeptide consisting of the amino acid sequence of SEQ ID NO: 3. An exemplary second sialidase is the polypeptide consisting of the amino acid sequence of SEQ ID NO: 6.

Sialidase Compositions

A sialidase composition comprises at least one sialidase, preferably in substantially isolated or purified form. As in the general disclosure relating to polypeptides set out above, this typically means isolated from the majority of the other components present in a cellular extract from a cell in which the sialidase was expressed. By substantially purified, it will be understood that the sialidase is purified to at least 50%, 60%, 70%, 80% or preferably at least 90% homogeneity. Purity level may be assessed by any suitable means, but typically involves SDS-PAGE analysis of a sample, followed by Coomassie Blue detection. A sialidase may be mixed with carriers, diluents or preservatives which will not interfere with the intended purpose of the sialidase and still be regarded as substantially isolated or purified. The sialidase composition may comprise an additional active component, such as another sialidase or another enzyme, in which case each said component will individually be purified to a high level of homogeneity prior to mixing in an appropriate ratio for the intended purpose of each. In a preferred sialidase composition of the invention, the composition comprises a first sialidase and a second sialidase which are each purified to at least 90% homogeneity and are present at a 1:1 ratio to each other. Such a composition may include an additional active component, such as another enzyme which is not a sialidase. The other enzyme may be a protease and/or a glycosidase. The protease is preferably an O-glycoprotein-specific endoprotease. The glycosidase is preferably an O-glycosidase. Both types of enzyme are discussed in more detail below.

Where a sialidase composition includes an active component which is not a sialidase, the preferred ratio of total sialidase content (e.g. first plus second sialidase) relative to the other enzyme will be 1:1. For example, if a composition includes 2000 units of another enzyme, it will also include 2000 units of sialidase, in which if there are two sialidases, then said 2000 units comprises 1000 units of the first sialidase and 1000 units of the second sialidase.

A sialidase composition (as with a polypeptide in general) may be provided in lyophilised form, suitable for reconstitution in aqueous solution prior to use. The lyophilised composition has improved stability enabling longer storage of the sialidase(s). A method of preparing a sialidase composition in lyophilised form, comprising freeze-drying one or more sialidases in a suitable buffer, such as Tris-buffered saline (TBS), is provided herein. The buffer preferably comprises a low concentration of NaCl, typically upto 300 mM, 250 mM, 200 mM, or 150 mM. The NaCl concentration is preferably around 150 mM, such as between 125 mM and 175 mM. A sialidase is typically substantially purified prior to freeze-drying. The resulting lyophilised form of the composition is also provided. A method of preparing a sialidase composition which is a solution, comprising providing the composition in lyophilised form and reconstituting with a suitable carrier or diluent, such as water, is also provided.

The present inventors determined that a first sialidase has unusually high activity against 2-8 bonds. Accordingly the present invention provides a composition which comprises a first sialidase which is independently selected from:
(a) a polypeptide comprising or consisting of an amino acid sequence of SEQ ID NO: 2;
(b) a polypeptide comprising or consisting of an amino acid sequence which is at least 85% identical to the amino acid sequence of SEQ ID NO: 2 or
(c) a polypeptide comprising or consisting of an amino acid sequence which is a fragment of the sequence of SEQ ID NO: 2 or a fragment of an amino acid which is 85% identical to the amino acid sequence of SEQ ID NO: 2;

optionally wherein said first sialidase includes an additional methionine at the N terminus and/or a histidine tag at the C terminus, which tag may be joined to the C terminus by a linker.

Said composition may be for use in a method of cleaving 2-8 sialic acid bonds, preferably with high efficiency. An example of such a composition comprises the sialidase consisting of the amino acid sequence of SEQ ID NO: 3.

The present inventors also determined that a combination of a first sialidase (Am0707) and a second sialidase (Am1757) hydrolyses 2-3, 2-6, and 2-8 bonds with unusually high efficiency, thereby permitting the efficient removal of substantially all (typically >90%) of the sialic acids of any glycoprotein. The combination was also surprisingly effective against glycoproteins in a native (that is non-denatured) state. Accordingly the present invention provides a composition as described above comprising a first sialidase, which composition further comprises a second sialidase which is independently selected from:

(d) a polypeptide comprising or consisting of an amino acid sequence of SEQ ID NO: 5;

(e) a polypeptide comprising or consisting of an amino acid sequence which is at least 85% identical to the amino acid sequence of SEQ ID NO: 5 or (f) a polypeptide comprising or consisting of an amino acid sequence which is a fragment of the sequence of SEQ ID NO: 5 or a fragment of an amino acid which is 85% identical to the amino acid sequence of SEQ ID NO: 5.

optionally wherein said second sialidase includes an additional methionine at the N terminus and/or a histidine tag at the C terminus, which tag may be joined to the C terminus by a linker. The first and second sialidase may preferably be present in a 1:1 ratio relative to each other.

Said composition may be for use in a method of completely asialyating a glycoprotein, or of cleaving >90% of the sialic bonds in a glycoprotein, preferably with high efficiency. The glycoprotein is preferably in a native state. That is, it has not been subjected to any form of denaturing conditions.

An example of a sialidase composition of the invention comprises the sialidase consisting of the amino acid sequence of SEQ ID NO: 3 and the sialidase consisting of the amino acid sequence of SEQ ID NO: 6, preferably in a 1:1 ratio.

The sialidase activity of a sialidase composition may be assessed using the same methods as described above for individual sialidases. However, it is preferably assessed using a non-denatured glycoprotein as substrate. The results may be compared to those obtained in the same assay when the substrate is contacted with an exemplary sialidase or mixture thereof, such as a 1:1 mixture of the polypeptide consisting of the amino acid sequence of SEQ ID NO: 3 and the polypeptide consisting of the amino acid sequence of SEQ ID NO: 6. A unit of such a sialidase mixture is typically the amount required to hydrolyse sialic acids from ≥90% of 1 µg glycoprotein (fetuin) when incubated in 20 mM Tris pH 6.8 at 37° C. for 2 h at 37° C. as monitored by SDS-PAGE. This is considered to represent high efficiency.

O-Glycosidase

The present inventors have also identified and characterised an O-glycosidase from the commensal bacterium *Streptococcus oralis*, residing in the oral tract of mammals, which efficiently hydrolyses O-linked glycans particularly when used in combination with a sialidase composition as described above. The O-glycosidase may be referred to herein as "O-glyk" or "So". The wild-type sequence of O-glyk is provided as SEQ ID NO: 7, which includes a signal sequence and an LPTXG cell wall anchor motif. The wild-type sequence of O-glyk lacking the signal sequence is provided as SEQ ID NO: 8. The wild-type sequence of O-glyk lacking the signal sequence and the C terminal part of the cell wall anchor motif is provided as SEQ ID NO: 9. These sequences can be optionally modified to include an additional methionine at the N terminus and/or a histidine or other tag at the C terminus. Such additional sequences may aid with expression (e.g. in *E. coli*) and/or purification. A histidine tag preferably consists of six histidine residues. The histidine tag is preferably linked to the C terminus by a linker, which is typically a short sequence of amino acids, such as 3-5 amino acids. The linker typically consists predominantly of glycine and serine residues, and may preferably include the sequence GSG. For example GSG and GSGLE are suitable linkers. An exemplary O-glyk sequence having an additional methionine at the N terminus and a GSGLE linker and His6 tag at the C terminus is provided as SEQ ID NO: 10. Any reference to "O-glyk" or "So" in the present disclosure may mean any of SEQ ID NOs: 7, 8, 9 or 10, but preferably refers to a polypeptide which comprises or consists of the amino acid sequence of SEQ ID NO: 9, and is typically no longer than 2070 amino acids. Most preferred is a polypeptide which consists of the amino acid sequence of SEQ ID NO: 10.

The present inventors also discovered that the action of a sialidase composition as described above also enhances the activity of other O-glycosidases. Thus, the present invention also provides a method of modifying a glycoprotein comprising contacting a sample of glycoprotein both with a sialidase composition as described above and with an O-glycosidase. The present invention also provides a sialidase composition as described above which optionally also comprises an O-glycosidase. In said method and said composition, said O-glycosidase may comprise or consist of the amino acid sequence of SEQ ID NO: 9 or may be any other O-glycosidase, such as an enzyme obtained from a gut bacterium e.g. *Enterococcus faecalis*. A preferred O-glycosidase from *E. faecalis* is a polypeptide having the amino acid sequence of Uniprot entry B5UB72 version 22. Other suitable O-glycosidases include those described in WO2009129086, particularly EngEF, EngPA and truncated EngAA as described on page 7 and shown in FIG. 5 of WO2009129086.

In any of the disclosures herein, the O-glycosidase comprising the sequence of SEQ ID NO: 9 may be replaced by a variant thereof, provided that enzymatic activity is retained. A variant of the O-glycosidase may comprise, consist essentially, or consist of a variant of the amino acid sequence of sequence of SEQ ID NO: 9. The variant of said SEQ ID NO may be defined as set out above with respect to the sialidases, except that the relevant enzymatic activity to be retained is hydrolytic activity against O-glycans.

Alternatively, the O-glycosidase may be replaced by a shorter fragment of SEQ ID NO: 9 or of a variant thereof as described above. The fragments may be described as a truncated form of said SEQ ID NO which retains enzymatic activity. Such fragments are shorter than SEQ ID NO: 3 and are typically at least 300, 400, 500, 600, 800, 1000, 1200, 1300, 1400 or 1500 amino acids in length.

Any O-glycosidase described herein may optionally include an additional methionine at the N terminus and/or a histidine or other tag at the C terminus. Such additional sequences may aid with expression and/or purification. A histidine tag preferably consists of six histidine residues.

The histidine tag is preferably linked to the C terminus by a linker, which is typically a short sequence of amino acids, such as 3-5 amino acids. The linker typically consists predominantly of glycine and serine residues, and may preferably include the sequence GSG. For example GSG and GSGLE are suitable linkers. An exemplary O-glycosidase of this type consists of the amino acid sequence of SEQ ID NO: 10.

The enzymatic activity of an O-glycosidase may be assessed by any suitable method, such as those described in the Examples. A suitable method may include incubating a known or suspected O-glycosidase with a standard substrate, such as one or more small molecules which collectively comprise O-glycan core regions. Such small molecules include 4-Methylumbelliferone (4MU) substrates and pNP-substrates, with the release of pNP indicating activity. Alternatively activity may be assessed using a glycoprotein as substrate. Any resulting cleavage products may be detected and quantified using routine methods such as SDS-PAGE or lectin blots. Where a glycoprotein is used as the substrate pre-treatment (or simultaneous treatment) with a sialidase composition as described above may be required. The results may be compared to those obtained in the same assay when the substrate is contacted with an exemplary O-glycosidase, such as a polypeptide consisting of the acid sequence of SEQ ID NO: 10. One unit of the polypeptide of SEQ ID NO: 10 is defined as the amount required to remove O-glycans from >90% of 1 μg of TNFαR in combination with one unit of a sialidase mixture in 20 mM Tris buffer pH 6.8, in 2 hours at 37° C. as monitored by SDS-PAGE (preferred sialidase mixtures are as described above). A test polypeptide preferably achieves a similar level of activity when present in the same amount. Exemplary assays are also described in the Examples.

A composition comprising an O-glycosidase as described above may be provided in solution or in lyophilised form for reconstitution in solution. The O-glycosidase may be lyophilized in Tris buffer saline pH 7.6.

O-Glycan Specific Endoprotease

The present inventors also discovered that the action of a sialidase composition as described above enhances the activity of O-glycan specific endoproteases, in particular an O-glycan specific endoprotease comprising the amino acid sequence of SEQ ID NO: 11 which is typically no longer than 375 amino acids, and which is preferably a polypeptide consisting of the amino acid sequence of SEQ ID NO: 12.

Thus, the present invention also provides a method of modifying a glycoprotein comprising contacting a sample of glycoprotein both with a sialidase composition as described above and with an O-glycan specific endoprotease. The present invention also provides a sialidase composition as described above which optionally also comprises an O-glycan specific endoprotease. In said method and said composition, said O-glycan specific endoprotease may be that of SEQ ID NO: 12.

In any of the disclosures herein, the O-glycan specific endoproteases of SEQ ID NO: 11 may be replaced by a variant thereof, provided that enzymatic activity is retained. A variant of the endoprotease may comprise, consist essentially, or consist of a variant of the amino acid sequence of sequence of SEQ ID NO: 11. The variant of said SEQ ID NO may be defined as set out above with respect to the sialidases, except that the relevant enzymatic activity to be retained is hydrolytic activity against O-glycoproteins.

Alternatively, the endoprotease may be replaced by a shorter fragment of SEQ ID NO: 3 or of a variant thereof as described above. The fragments may be described as a truncated form of said SEQ ID NO which retains enzymatic activity. Such fragments are shorter than SEQ ID NO: 11 and are typically at least 100, 150, 200, 250, 300, 350, 400, 450 or 500 amino acids in length.

Any endoprotease described herein may optionally include an additional methionine at the N terminus and/or a histidine or other tag at the C terminus. Such additional sequences may aid with expression and/or purification. A histidine tag preferably consists of six histidine residues. The histidine tag is preferably linked to the C terminus by a linker, which is typically a short sequence of amino acids, such as 3-5 amino acids. The linker typically consists predominantly of glycine and serine residues, and may preferably include the sequence GSG. For example GSG and GSGLE are suitable linkers. An exemplary endoprotease of this type consists of the amino acid sequence of SEQ ID NO: 12.

The enzymatic activity of an endoprotease may be assessed by any suitable suitable assay. For example, a standard O-glycoprotein substrate, such as an IgA molecule, may be incubated with a test polypeptide. The starting materials and the reaction products may then be analysed by SDS-PAGE and/or mass spectrometry to determine the presence of cleavage products (if any) and if required also to further characterise those products. A glycoprotein substrate which is not O-glycosylated, such as an IgG1 molecule, may be used as a negative control. The results may be compared to those obtained in the same assay when the substrate is contacted with an exemplary polypeptide, such as a polypeptide consisting of the amino acid sequence of SEQ ID NO: 12.

A composition comprising an O-glycan specific endoprotease as described above may be provided in solution or in lyophilised form for reconstitution in solution. The O O-glycan specific endoprotease may be lyophilized in Tris buffer saline pH 7.6.

Methods of Use

The present invention provides any methods in which a sample is incubated with a composition of the invention under conditions suitable for the enzymes in said composition to act upon any substrates that are present. Said methods may optionally include an analysis of the resulting products. Said analysis may include the separation and/or detection and/or isolation of the products by any suitable means, including SDS-PAGE, HPLC, lectin blotting, ELISA or mass spectrometry.

Suitable conditions include incubation with a composition of the invention for at least 20 minutes, 30 minutes, 40 minutes, 50 minutes, 60 minutes, 70 minutes, 80 minutes, 90 minutes or 120 minutes, 3 hours, 5 hours, 10 hours, 12 hours, or overnight. Incubation preferably takes place at room temperature, more preferably at approximately 20° C., 25° C., 30° C., 35° C., 40° C. or 45° C., and most preferably at approximately 37° C. The methods may be carried out under any suitable pH. Suitable pH values include, for example, a pH of around 3.0, 3.5, 4, 4.5, 5, 5.5, 6, 6.5, 7, 7.5, 8, 8.5, 9 or 9.5. Preferred pH is in the range 5.6 to 6.8. The methods may be conducted in any suitable buffer, such as tris buffered saline (TBS) or phosphate buffered saline (PBS). The buffer preferably comprises a low concentration of NaCl, typically no more than 300 mM, 250 mM, 200 mM, or 150 mM. The NaCl concentration is preferably around 150 mM, such as between 125 and 175 mM. The approximate ratio of the enzymes in the composition of the invention to the protein content of the sample may be 1:1, 21, 2:1, 4:1, 6:1, 10:1, 15:1, 20:1, 1:2, 1:4, or 1:6, 1:10, 1:15, 1:20, 1:40, 1:50 or 1:100.

The following are particularly preferred methods of the invention:

A method for the modification of a glycoprotein, the method comprising contacting a sample containing the glycoprotein with a composition of the invention and optionally analyzing the resulting products. Said analysis may comprise separating and/or detecting and/or isolating the products by any suitable method, including SDS-PAGE, HPLC, lectin blotting, ELISA or mass spectrometry.

In a particular embodiment, the method may comprise contacting a sample with a composition of the invention which comprises only sialidases, optionally separating the products, and then contacting the said products with another enzyme, such as a protease and/or a glycosidase. This method may be described as a "pre-treatment" of the sample to remove sialic acid before the other enzyme is added. In a variation of this embodiment, the other enzyme may be added to the sample separately but simultaneously with the sialidase composition, and may be described as a "co-treatment". In another variation, the other enzyme is present in the sialidase composition. The other enzyme is preferably an O-glycan specific endoprotease or an O-glycosidase, for example as described herein.

The following Examples illustrate the invention:

Example 1—Sialidases

Materials & Methods
Expression and Purification of Sialidases

Genes (Am0705, Am0707, Am1757, Am2058) identified in *Akkermansia muciniphila* were codon-optimized to express well in *E. coli* in the vector pET21a(+). The vector was transformed into BL21(DE3) Star cells. *E. coli* was routinely cultured in LB at 37° C., 200 rpm. In the presence of the plasmid, 100 µg/mL ampicillin was added. After o/n incubation, cultures were diluted 1:20 in fresh LB(amp), and grown until $OD_{620}$~0.7-0.8, after which recombinant protein expression was induced by addition of 1 mM IPTG, and the expression continued for 5 hours before the cells were collected and frozen. Frozen cells were thawed and resolved in His binding buffer (20 mM NaP pH 7.4, 500 mM NaCl, 20 mM imidazole), and sonicated for release of intracellular proteins. Cell debris was removed by centrifugation. Sterile filtered supernatant was affinity purified on a nickel column, and re-buffered to 20 mM Tris-HCl pH 8.0 on a PD-25 column. Concentration of the proteins was determined using the Nanodrop, and purity estimated through SDS-PAGE.

Activity Assessment Using Small Molecules 2-3'-sialyllactose, 2-6'-sialyllactose, and colominic acid (2-8'; Sigma-Aldrich) were used as substrates to determine the hydrolytic specificity of the enzymes. Enzymes (0.05 µg) were mixed with a substrate (25 µM) in 20 mM Tris-HCl pH 6.8, and incubated for 30 minutes at 37° C., after which free sialic acids in the mixture were quantified, according to manufacturer's instructions (Sialic Acid Quantification Kit, Abcam).

Activity Assessment Using Protein Substrate

TNFαR, EPO, Enbrel and fetuin (0.5 µg) were mixed together with varying concentrations of tested sialidases (1:40) or commercial sialidase (from NEB, according to manufacturer) and incubated for 30 minutes, after which the proteins were separated on 4-20% Novex gradient SDS-PAGE, and/or analyzed with SNA lectin blots.

Lectin Blots

Separated proteins were transferred to PVDF membranes using the Trans-Blot Turbo Transfer System (BioRad). Membranes were blocked with lectin buffer, and subsequently incubated with the primary binder (SNA-biotin) and the secondary binder (HRP-streptavidin; VectorLabs) with washing steps in between. Chemi-luminescense was developed by the West Pico SuperSignal (ThermoFisher) kit, and detected in a ChemiDoc (BioRad).

Optimal Enzymatic Conditions

The sialidases were incubated with 2-3' sialyllactose (25 µM) in 20 mM Tris-HCl pH 8.0 to investigate the impact of NaCl (0-1.5 M) and ions (2 mM $CaCl_2$, 2 mM $ZnCl_2$, 5 mM EDTA). For pH optimum, the sialidases were incubated in acetic acid buffers (4.6 and 5.6), and Tris-HCl buffers (6.8, 7.4, 8.0, and 8.8). All samples were incubated for 15 minutes at room temperature after which the mixture was added 1:1 to a sialic acid quantification kit (Abcam), according to manufacturer's instructions. All values were expressed as relative activity in relation to the highest activity within each group.

Comparison with Known Sialidases from Established Biotechnology Companies

*A. muciniphila* sialidases, sialidase mixtures, and bought sialidases from established brands (NEB P0743S, P0720S, and P0722S) were incubated with 2-3' and 2-6' sialyllactose, and colominic acid for 20 minutes in their respective optimal buffer together with the sialic acid quantification buffer (1:1 ratio), according to manufacturer's instructions.

Results
All A. *Muciniphila* Sialidases Express Well and can be Purified on his-Columns

*Akkermansia* annotated sialidases Am0705, Am0707, Am1758, and Am2058 were expressed recombinantly in *E. coli* and purified to high purity on His-columns (FIG. 1). The proteins expressed well, with levels varying between 70-150 mg purified enzyme per L *E. coli* culture. Furthermore, the sialidases were highly soluble in Tris buffers, and could be concentrated to >3 mg/mL without significant precipitation.

Only Three of the Sialidases Display Activity Towards a Variety of Protein Substrates During initial screening of the purified sialidases towards different O- and N-linked glycoproteins, all sialidases except Am0705 displayed potent activity (data not shown). Due to inconsistent activity of Am2058, we continued the characterization of Am0707 and a mixture of Am0707/1757 (Mix, 1:1).

The Sialidases have Different Specificities

Figure 2:
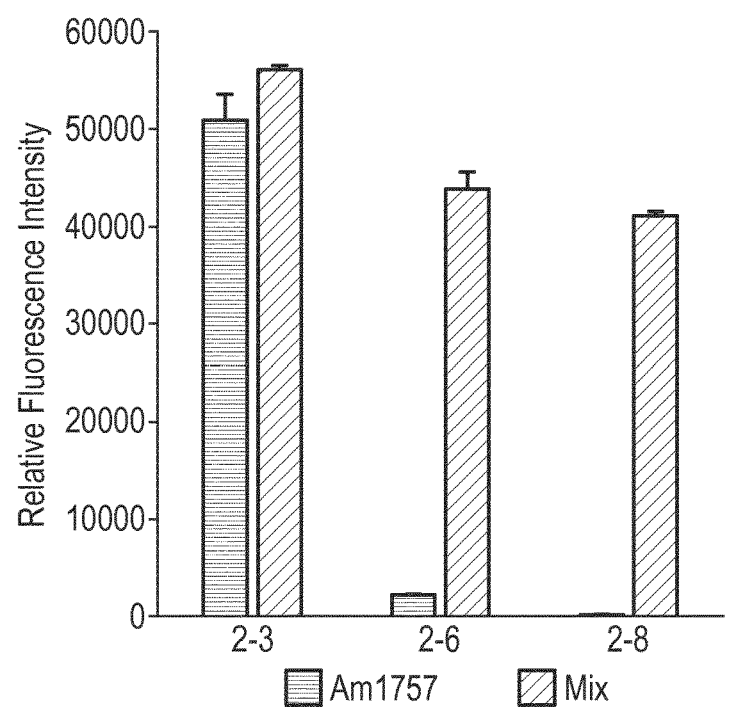
FIG. 2: Sialidase activity upon different sialic acid bonds. The two sialidase products (Am1757, and Mix (Am1757 & Am0707)) were incubated with three different substrates (representing the 3 indicated types of sialic acid bond) for 30 minutes, after which the amount of free sialic acid was measured.

Several sialidases display bond specificity, with limited ability to hydrolyze certain sialic acid bonds (e.g. 2-3, 2-6, and/or 2-8). To investigate the ability of the four A. *muciniphila* sialidases to act upon different bonds, we incubated the sialidases with specific substrates only having one type of the bonds present (2-3'-sialyllactose, 2-6'-sialyllactose, and colominic acid), and quantitated the free sialic acids (FIG. 2). Am1757 had a high specific activity against 2-3 bonds, while Am0707 had a broader, though lower, activity against all tested bonds. The combination of Am0707 and Am1757 (mix), resulted in a superior broad-spectrum product (FIG. 2).

The Sialidases are NaCl Sensitive and Rely on Divalent Cations

To further investigate the conditions necessary for optimizing the sialidase activity, we investigated the dependence on ions, pH, and NaCl for the sialidases. The two sialidases behaved similarly, with a high sensitivity to EDTA and $Zn^{2+}$, while relying on $Ca^{2+}$. The enzymes had a higher activity in neutral to basic pH, and lost much of their activity in the presence of NaCl (FIG. 3).

A Mixture of Sialidases Increases the Overall Efficiency of Hydrolysis

Figure 4:
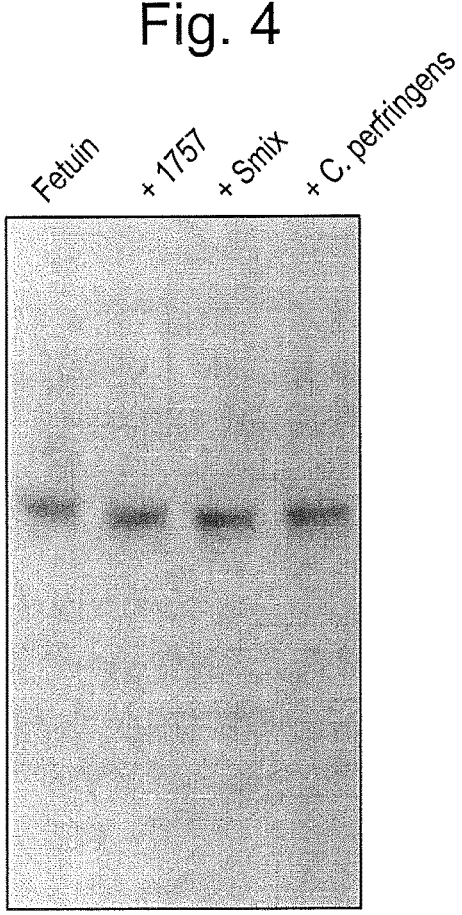
FIG. 4: Combined sialidase treatment of glycoproteins is more efficient than using single sialidases. Sialidases were incubated with 0.5 µg fetuin for 60 minutes after which they were separated using SDS-PAGE. Smix contains both Am0707 and Am1757, while a *C. perfringens* sialidase was used as a benchmark comparison. All reactions took place at 37° C., in 20 mM Tris-HCl pH 6.8, except for the benchmark product which was incubated according to manufacturer's instructions.

Since the characterized sialidases had complementary activities, with Am1757 having a high 2-3 bond hydrolytic activity, and Am0707 also acting upon 2-6,8 bonds, we investigated if a mixture of the two enzymes could demonstrate high efficiency towards all the sialic acids bonds on native glycoproteins by varying the ratio of the two enzymes. A mixture containing 1:40 Am1757 together with 1:40 Am0707 rapidly (<15 min) hydrolyzed all sialic acid bonds on fetuin (FIG. 4).

Benchmarking of the Sialidase Against Small Molecular Substrates

Figure 5:
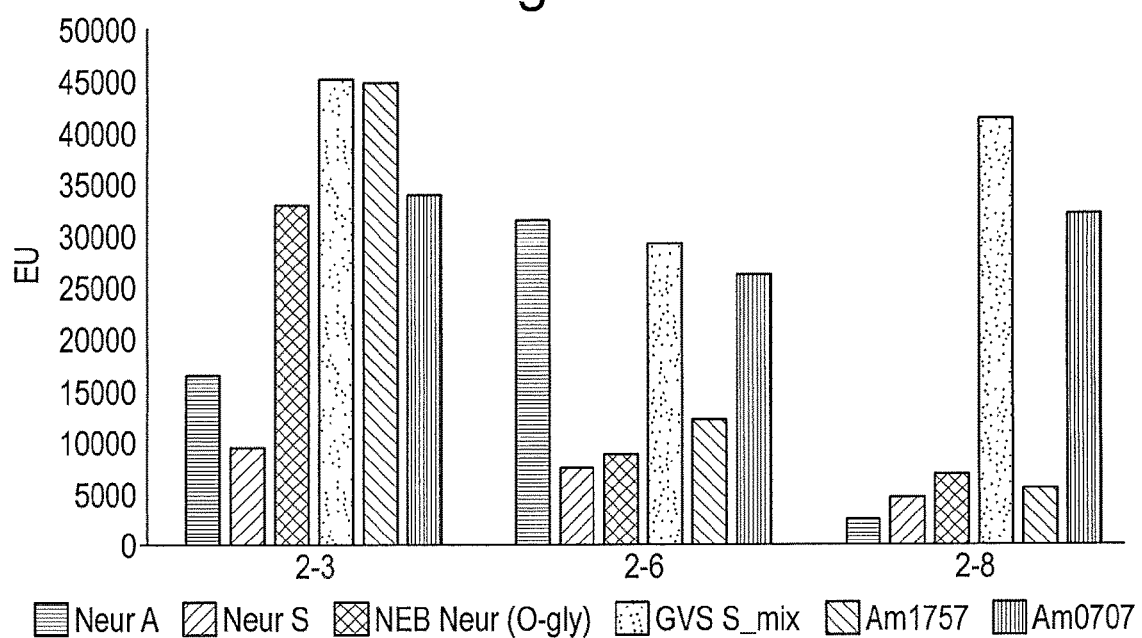
FIG. 5: GVS_Smix is superior to current commercially available sialidases. Several existing commercial sialidases from New England Biolabs (first 3 columns in each set) were tested alongside the AM1757+Am0707 mixture (GVS_Smix) and each of the Am1757 and Am0707 enzymes individually. Each was incubated with specific sialidase substrates (representing the 3 indicated types of sialic acid bond) for 30 min at 37° C. before being analyzed. FU (Fluorescence units) represent the amount of sialic acids liberated.

In order to compare the efficiency of the sialidase mixture (GVS_Smix) to the single enzymes, as well as with brand competitors, we compared our enzymes with three commercially available sialidases from New England Biolabs (NEB). These were a broad spectrum sialidase from *Arthrobacter ureafaciens* (NEB A, the enzyme u2-3,6,8,9 Neuraminidase A from *Arthrobacter ureafaciens*, catalog #P0722S; cleaves 2-3, 2-6, 2-8, and 2-9 bonds), a narrow spectrum sialidase from *Streptococcus pneumoniae* (NEB S, the enzyme u2-3 Neuraminidase S from *Streptococcus pneumoniae*, catalog #P0743S; cleaves 2-3 bonds only), and a general sialidase from *Clostridium perfringens* (NEB 0, the enzyme u2-3,6,8 Neuraminidase O from *Clostridium perfringens*, catalog #P0720S, cleaves 2-3, 2-6, 2-8 bonds). Enzymes were added as suggested by the manufacturers and incubated with the substrate for 30 min at 37° C. (FIG. 5).

Figure 6:
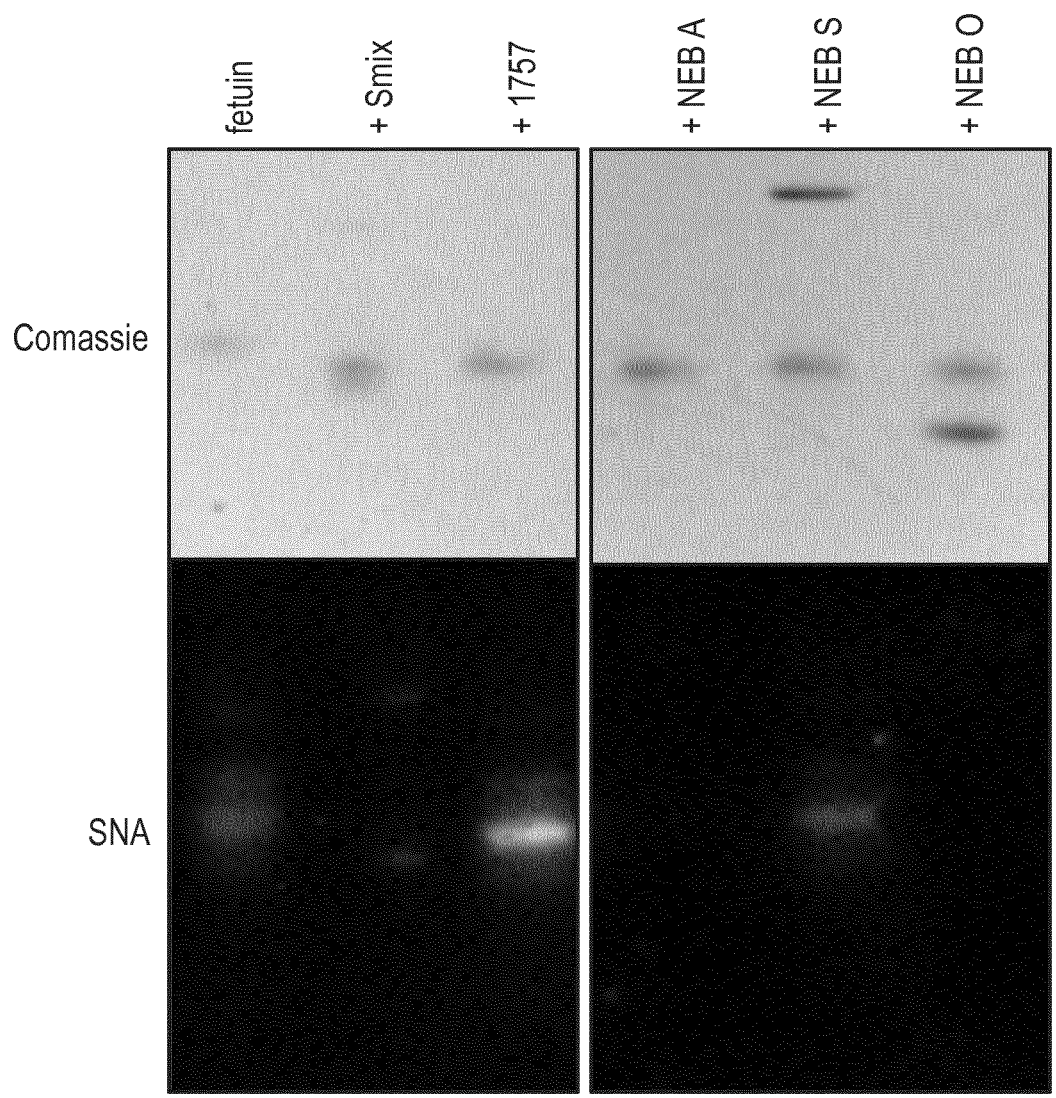
FIG. 6: GVS_Smix can fully asialylate fetuin. SDS-PAGE and SNA blotting show that Smix (the AM1757+Am0707 mixture) as well as two New England Biolabs products (NEB A and NEB 0) can fully asialylate the 2-3 and 2-6 sialic acid bonds in fetuin. The two 2-3 specific enzymes Am1757 and New England Biolabs NEB S were not able to fully asialylate fetuin.

As judged by an SDS-PAGE, the quantity of sialidase in the different samples is lower in the GVS_Smix than in the NEB, with Neuraminidase A possibly being the exception. Neuraminidase S displayed a limited ability to hydrolyze all the sialic acid bonds on the glycoprotein, while Neuraminidase A and the Neuraminidase O hydrolyzed all sialic acids present on fetuin (FIG. 6). Likewise, as observed for activity against synthetic small molecule substrates, Smix hydrolyzed all sialic acid bonds on the glycoprotein, generating a narrow protein band, indicative of a complete asialylation. Am1757 treated samples, not able to hydrolyze 2-6 or 2-8 bonds, migrated as a higher molecular weight than those samples treated with Smix. The hydrolysis was confirmed with SNA blotting, labeling sialic acids, suggesting that all broad-spectra sialidases efficiently removed all sialic acids present on fetuin, while 2-3 specific enzymes (e.g. neuraminidase S and Am1757) only removed a fraction of the sialic acids (FIG. 6).

Smix can Efficiently Release Sialic Acids from Native Proteins

Even though Smix could act on small semi-synthetic substrates with an efficiency similar to or better than the NEB products (FIG. 5), it was imperative to also investigate its activity against native proteins with different sialic acid bonds. As a model protein, fetuin was chosen, since it has both 2-3 and 2-6 bonded sialic acids. Using SNA blotting, it became clear that the Smix at the chosen concentration could completely remove all sialic acids from fetuin, similarly to NEB A and O (FIG. 6). The two 2-3 specific enzymes Am1757 and NEB S could not, as expected, asialylate fetuin fully.

To more quantitatively determine the ability of Smix and Am1757 to release sialic acids from native proteins in comparison to the three NEB sialidases, we incubated different glycoprotein substrates (TNFαR, IgA, Plasminogen and Abatacept [Orencia]) with each sialidase for 15+15 minutes and quantified the released sialic acids. While certain substrates proved more difficult to hydrolyze than others, the GVS_Smix was at least comparable to the NEB products in all cases (FIG. 7) and demonstrated the most consistency, in that it showed high activity against all substrates. Although the individual enzymes of Am1757 and each of the NEB products had higher activities against one or another individual substrate, only the GVS_Smix showed consistently high activity against all substrates, making it a highly attractive tool for glycan analysis.

Example 2—O-Glycosides

Materials and Methods

Expression and Purification of an Endo-O-Glycosidase

The *Streptococcus oralis* endo-N-acetyl-galactosaminidase was codon-optimized to express well in *E. coli* in the vector pET21a(+). The vector was transformed into BL21 (DE3) Star cells. *E. coli* was routinely cultured in LB at 37° C., 200 rpm. In the presence of the plasmid, 100 µg/mL ampicillin was added. After overnight incubation, cultures were diluted 1:20 in fresh LB(amp), and grown until $OD_{620}$~0.7-0.8, after which recombinant protein expression was induced by addition of 1 mM IPTG, and the expression continued for 5 hours before the cells were collected and frozen. Frozen cells were thawed and resolved in His binding buffer (20 mM NaP pH 7.4, 500 mM NaCl, 20 mM imidazole), and sonicated for release of intracellular proteins. Cell debris was removed by centrifugation. Sterile filtered supernatant was affinity purified on a nickel column, and re-buffered in PBS on a PD-25 column. The concentration of the protein was determined using the Nanodrop, and purity estimated through SDS-PAGE. The sequence of the protein is provided as SEQ ID NO: 3.

Activity Assessment Using Small Molecules

4-Methylumbelliferone (4MU) substrates and pNP-substrates of O-glycan core regions were used as substrates to determine the hydrolytic activity of the enzymes. Enzymes (1 µg) were mixed with a substrate (2 mM) and incubated for 15-120 minutes at 37° C., during which time fluorescence and absorbance (405 nm) was recorded, respectively.

Activity Assessment Using Protein Substrate

TNFαR, EPO, Enbrel, fetuin, IgA, Orencia and plasminogen (0.5 µg) were mixed with O-glycosidase (1:40) either with or without the presence of Smix (1:40+1:40) or Am1757 (1:40) for 0-24 hours. The proteins were separated on 4-20% Novex gradient SDS-PAGE.

Optimal Enzymatic Conditions

The enzymes were incubated with their respective substrate (4MU or pNP) for investigation of NaCl (0-1.5 M) and ion (2 mM $CaCl_2$, 2 mM $ZnCl_2$, 5 mM EDTA) dependency. For pH optimum, the enzymes were incubated in acetic acid buffers (50 mM pH 4.6 and 5.6), and Tris-HCl buffers (20 mM pH 6.8, 7.4, 8.0, and 8.8). All samples were incubated for 15 minutes at 37° C. All values were expressed as relative activity in relation to the highest activity within each group.

Comparison with Commercially Available Enzymes

The identified enzyme, as well as commercially available enzymes from established brands (NEB O-glycosidase from *Enterococcus faecalis*, catalog #P0733S, also as a bundle #E0540S) were incubated with their respective substrate(s) and optimized buffers, and incubated for 0-24 hours with different glycoproteins under native conditions before being separated on SDS-PAGE.

Results

Figure 8B:
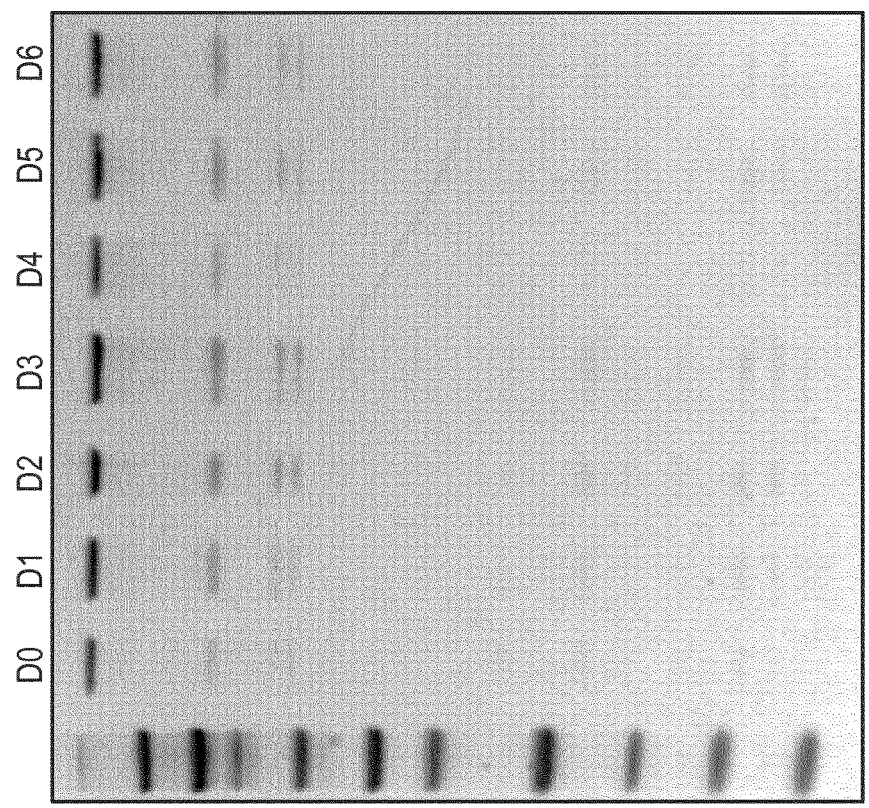
FIG. 8: Recombinant expression of O-glycosidases. (A)O-glycosidase from *S. oralis* and *B. bifidum* were expressed, affinity purified, and separated on SDS-PAGE. (B) Stability assay of *S. oralis* O-glycosidase stored at 4° C. for 0-6 days.
Figure 8A:
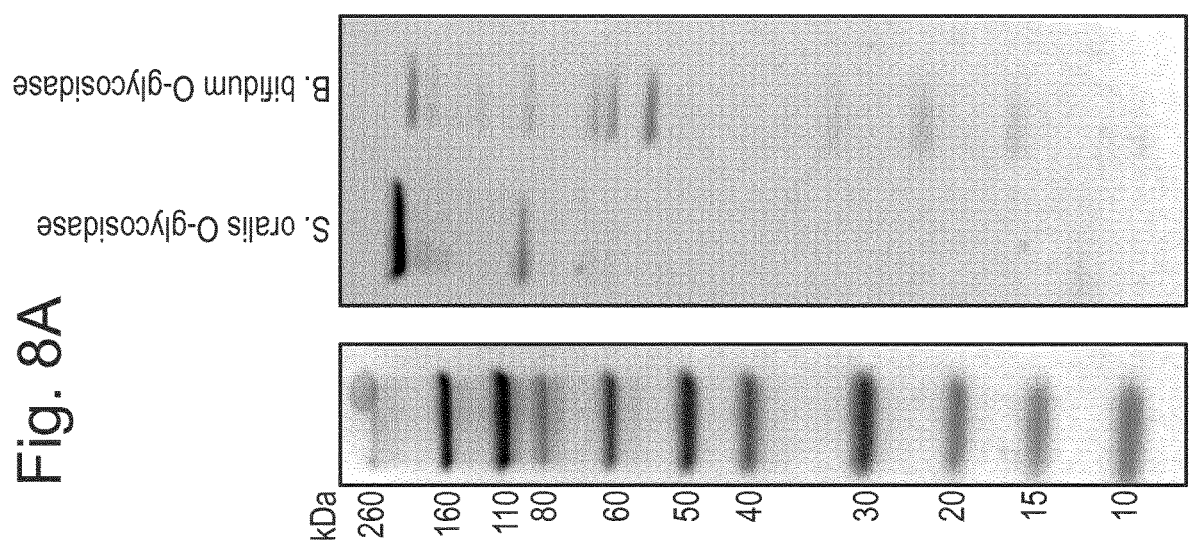

The *Streptococcus oralis* Endo-α-N-Acetyl-Galactosaminidase Expression/Purification During the discovery phase, two different endo-α-N-acetyl-galactosaminidases from *S. oralis* and *Bifidobacterium bifidum*, both being high molecular weight bacterial proteins (>200 kDa), were considered. The *B. bifidum* glycosidase was highly unstable, or at least resulted in a high degree of fragmented parts after expression and affinity purification. While certain fragmentation also could be visualized for *S. oralis*, it was much less pronounced (FIG. 8A). Further, this enzyme was stable at 4° C. for up to a week without any additional degradation (FIG. 8B). However, the expression level (ca 5-10 mg/L) is quite low. Further analysis suggested the fragmentation was due to the sonication.

The O-Glycosidases can Act Upon Synthetic pNP-Labeled Core 1-3 O-Glycans.

Figure 9A:
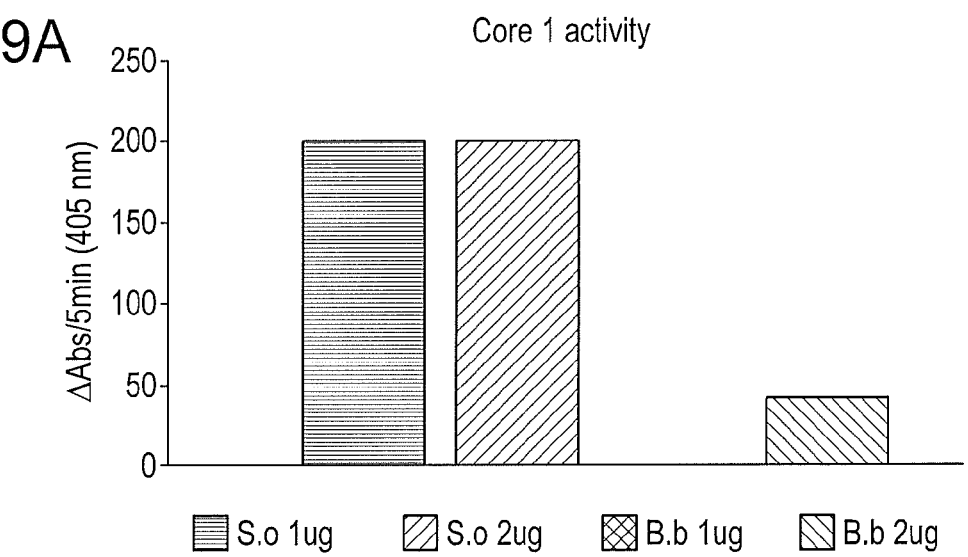
FIG. 9: O-glycosidases can hydrolyze pNP-labeled O-glycans of types Core 1, 2 and 3. Different concentrations of O-glycosidases from *S. oralis* (S.o) and *B. bifidum* (B.b) were incubated with (A) Core 1, (B) Core 2, and (C) Core 3 O-glycans, and release of pNP was measured as change in absorbance AT 405 nm.
Figure 9B:
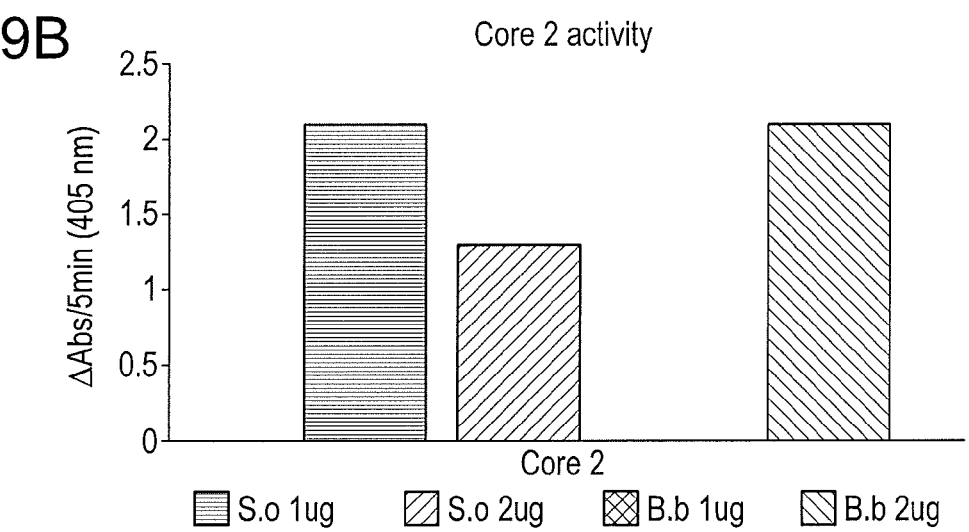
Figure 9C:
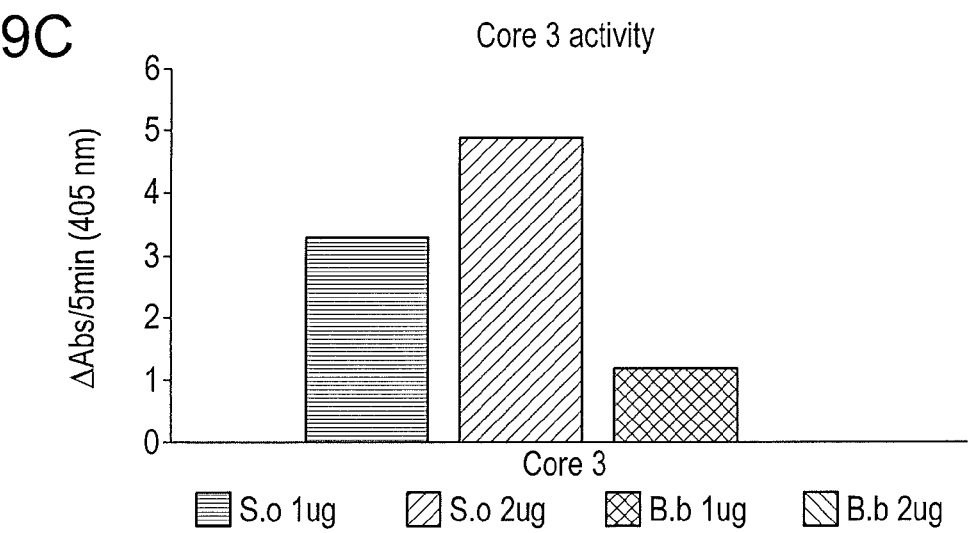

Continued analysis of the two O-glycosidases revealed a striking preference for Core 1 glycans, with a much lower activity towards core 2 and 3 (FIG. 9). Importantly, the glycosidase from *S. oralis* showed a significantly higher activity than the corresponding gene from *B. bifidum*, so we decided to mainly focus on the *S. oralis* O-glycosidase.

Figure 10A:
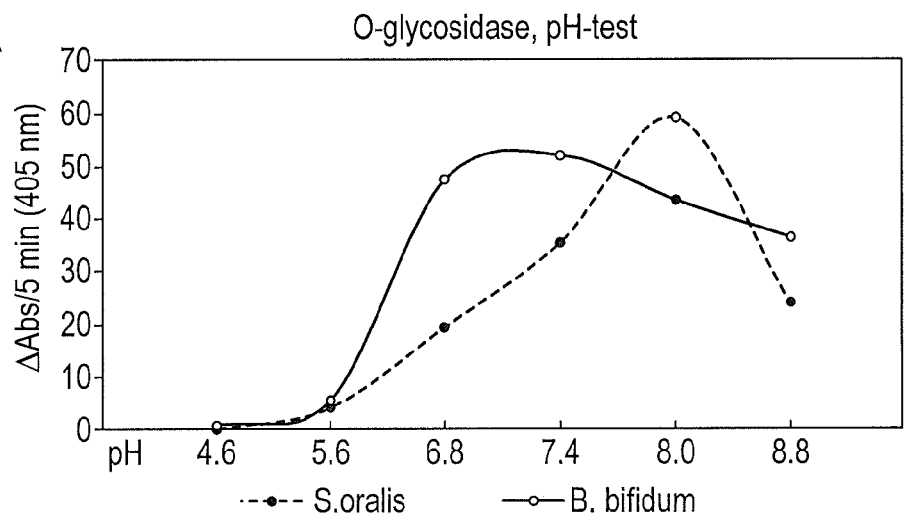
FIG. 10: The *S. oralis* glycosidase has higher activity in basic pH supplemented with $MgCl_2$. The O-glycosidases were incubated at different pH (A), with different ions (B), and different concentrations of $MgCl_2$ (C) to determine the optimal buffer.
Figure 10B:
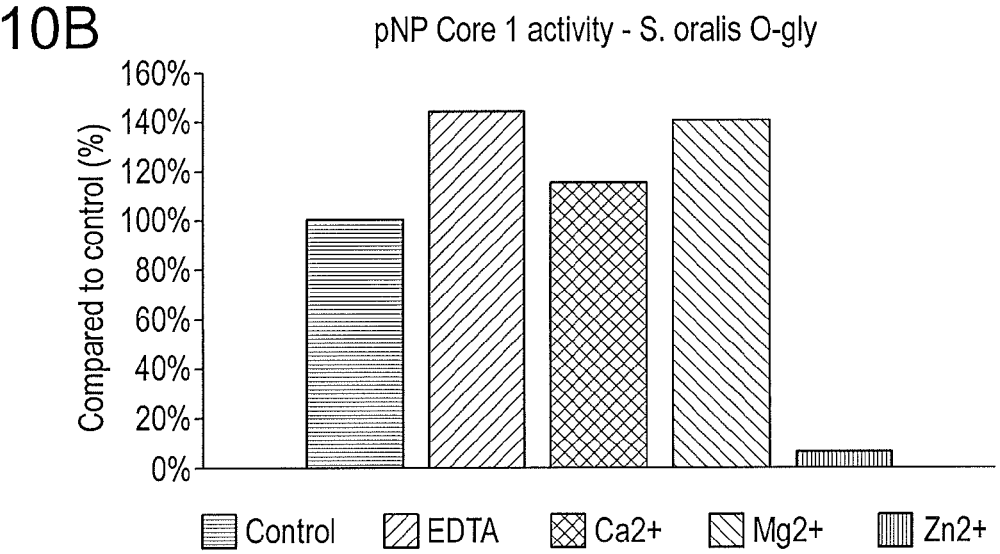
Figure 10C:
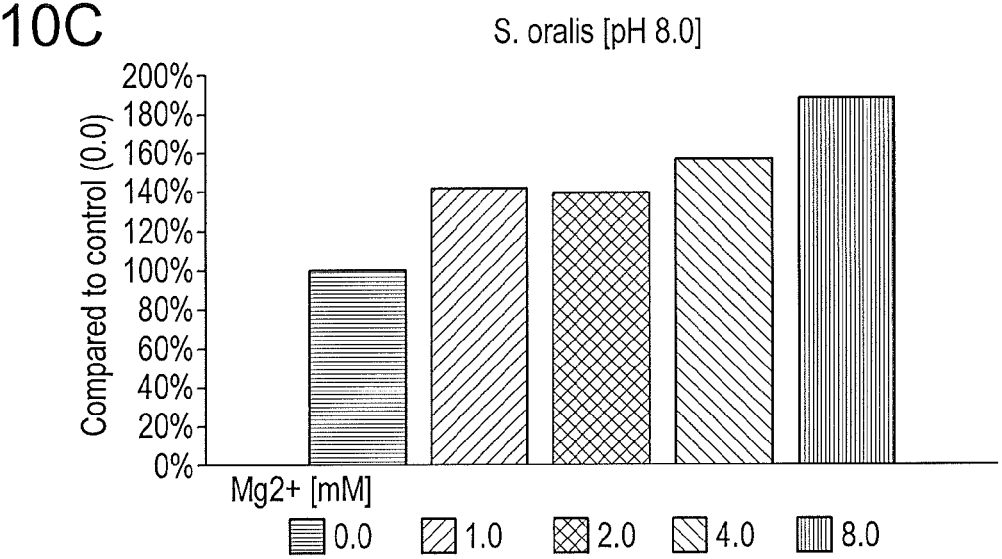

Addition of $MgCl_2$ Significantly Increases the Activity of the *S. oralis* O-Glycosidase In order to determine the optimal conditions for the O-glycosidase, the enzyme was incubated with the pNP Core 1 substrate at different conditions, under a range of pHs and ions (FIG. 10). The O-glycosidase showed high activity at neutral to slightly basic pH, was completely inhibited by the presence of $Zn^{2+}$, but had an increased activity in the presence of up to 8 mM $MgCl_2$ (FIG. 10C).

Figure 11:
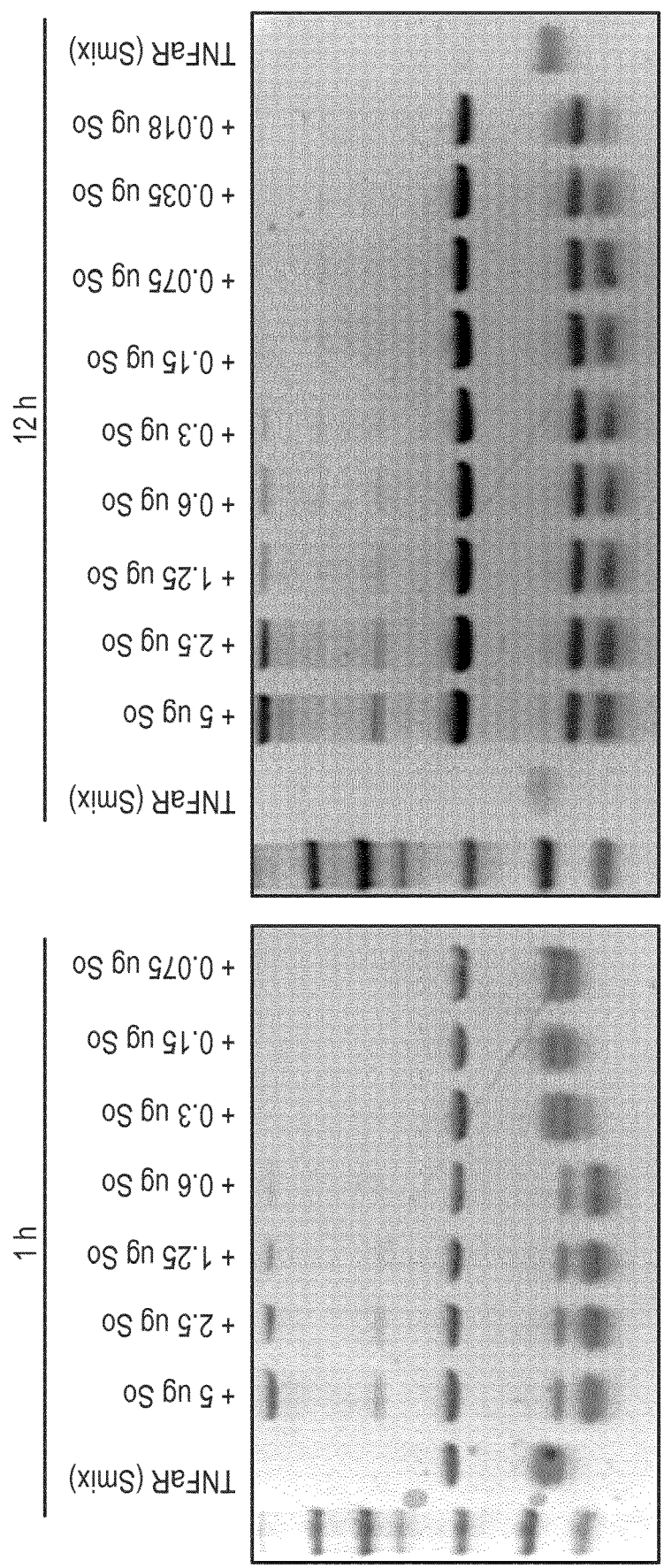
FIG. 11: O-glycosidase activity is time and dose-dependent. TNFαR (1 µg) was incubated with the GVS_Smix sialidase mixture only (lanes labelled TNFαR (Smix)) as a control, or with the GVS_Smix sialidase mixture in combination with the different amounts of O-glycosidase from *S. oralis* (So) that are shown ("+5 ug So etc"). The denoted amounts of added O-glycosidases rely on values from the nanodrop. However, due to fragmentation, the actual amount full-length protein added is closer to ca 10-20% of the written value. These samples were incubated in 20 mM Tris-HCl pH 8.0, supplemented with 2 mM $CaCl_2$, but no $MgCl_2$.

The *S. oralis* O-Glycosidase can Hydrolyze the Glycans from Native Glycoproteins To investigate the kinetics and doses necessary for mediating hydrolysis of all O-glycans, native TNFαR was incubated with varying amounts of O-glycosidase for 1-12 h in combination with the sialidase mixture characterized in Example 1 (1:1 mix of Am1757:Am0707), or with sialdase mixture only as. As shown in FIG. 11, even comparably low concentrations of the enzyme (e.g. ca 0.1 µg, 1:10) could hydrolyze the substrate within one hour. Increasing the incubation time to 12 hours resulted in an ability of the enzyme to fully hydrolyze the substrate at a ratio of 1:50 with a high concentration of sialidase. Of importance to note, the enzyme is, in some aspects, a "nothing or all" enzyme, barely resulting in semi-hydrolyzed glycoproteins, but rather non-hydrolyzed or completely hydrolyzed proteins.

*S. oralis* O-Glycosidases can Act Upon Different Native Glycoproteins

Figure 12B:
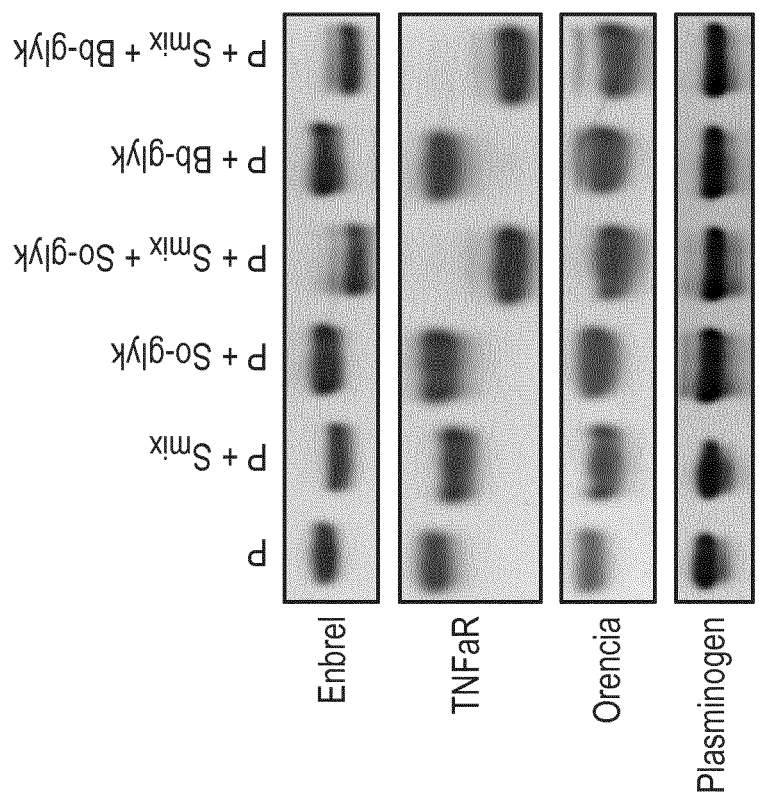
FIG. 12: O-glycosidases can act upon all investigated native glycoproteins. Different native proteins (P) were incubated with the GVS_Smix mixture of sialidases (Smix) and O-glycosidases from *S. oralis* (So-glyk) and *B. bifidum* (Bb-glyk). Incubations were o/n, after which products were analyzed on SDS-PAGE.
Figure 12A:
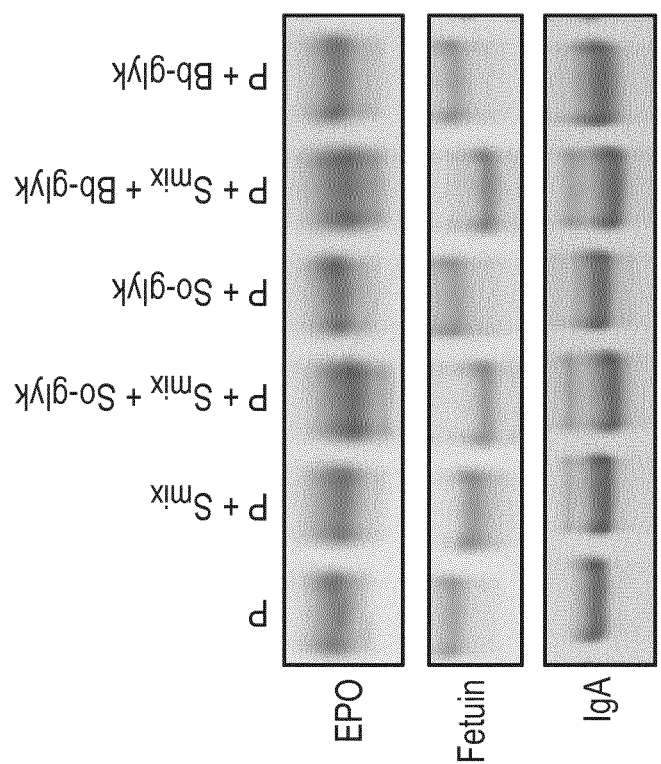

To further investigate whether the O-glycosidase only acts upon TNFαR or can act on several native glycoproteins, we incubated seven different glycoproteins with combinations of hydrolytic enzymes (FIG. 12). The *S. oralis* O-glycosidase, as well as the *B. bifidum* enzyme (in combination with sialidases) were able to hydrolyze all native proteins after an overnight incubation, even though the activity on plasminogen was difficult to assess due to the high molecular weight of the protein. Both enzymes did however strongly depend on the presence of sialidases since terminal sialic acids inhibited the activity.

The *S. oralis* O-Glycosidase is Superior in Hydrolyzing Native Glycoproteins as Compared to the NEB Product Portfolio.

Figure 13:
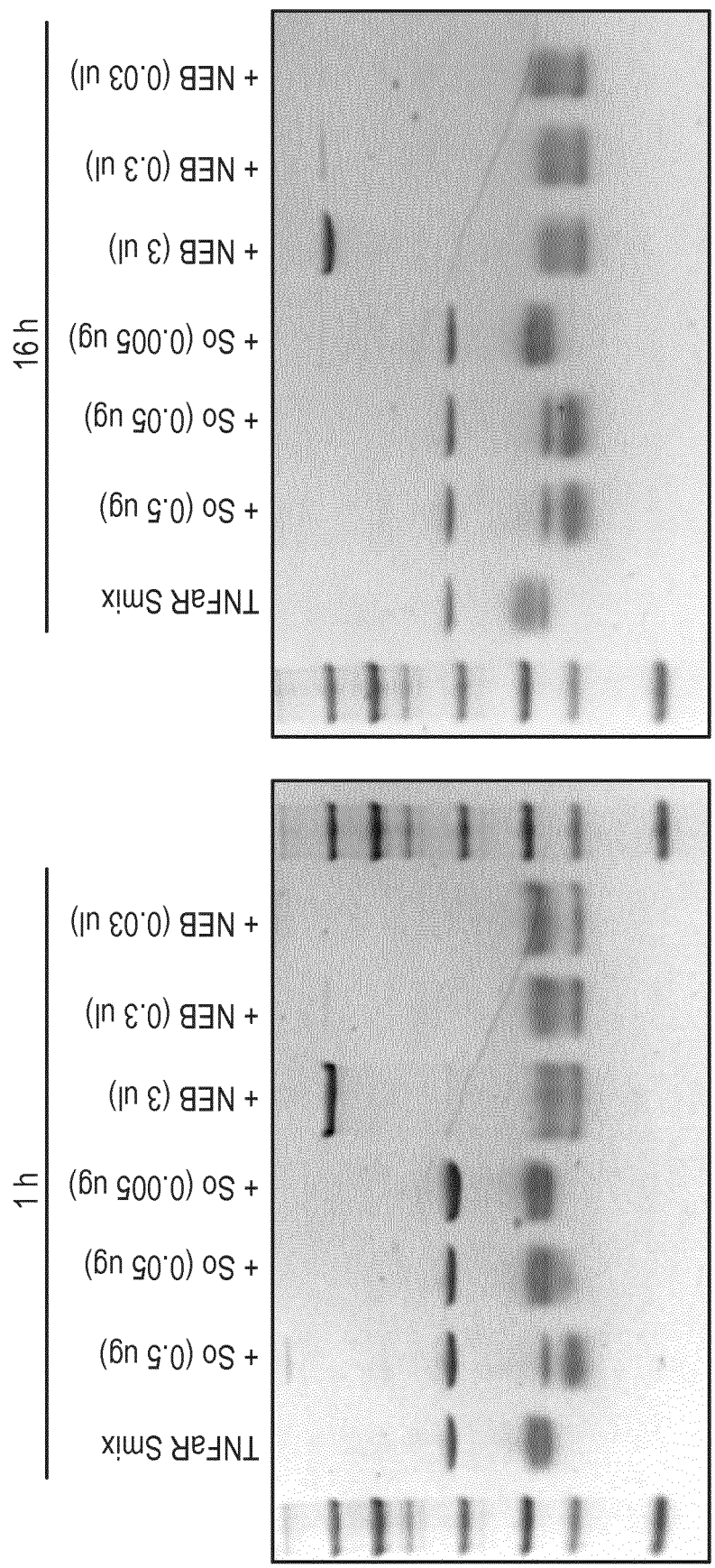
FIG. 13: The *S. oralis* O-glycosidase compares favorably with commerically available products for action against native glycoproteins. Native TNFαR was incubated with GVS_Smix sialidase mixture only (lanes labelled TNFαR (Smix)) as a control, or with the GVS_Smix sialidase mixture in combination with the different amounts of 0-glycosidase from *S. oralis* (So) that are shown ("+So (0.5 ug)" etc) or with a commercially available O-glycosidase (NEB) at the quantity shown ("+NEB (3 ul)" etc) in combination with a sialidase supplied with it by the manufacturer. All enzymes were incubated with TNFαR in their respective buffers for either 1 hour or 16 hours. The highest dose of the *S. oralis* glycosidase ("So (0.5 ug)") roughly equals 0.3 ul of the commercial O-glycosidase (NEB) in molarity. The distinct band of low molecular weight (top of gel) in the NEB treated samples is the accompanying sialidase.

To compare the activity of the *S. oralis* glycosidase against existing commercial products, we compared their ability to hydrolyze the TNFαR using varying amounts of glycosidases for either 1 h or 16 hours. Using a ca 1:5 enzyme:substrate ratio, the *S. oralis* glycosidase was able to fully hydrolyze its substrate in 1 h. Even at a 1:1 enzyme:substrate ratio, the NEB O-glycosidase did not hydrolyze all O-linked glycans, but only acted upon a few easily accessible glycans. A further incubation (e.g. 16 h) allowed for a 1:50 enzyme:substrate ratio while still maintaining full effect of the *S. oralis* glycosidase. However, the NEB O-glycosidase still failed to fully deglycosylate the product, indicating that denaturation is pivotal for its function, while the *S. oralis* O-glycosidase product has a high activity also against native proteins (FIG. 13). Not only can the *S. oralis* O-glycosidase act upon native proteins, but is also able to hydrolyze glycans from denatured proteins (data not shown).

Glycan Composition Influence the Activity of the O-Glycosidase

Figure 14:
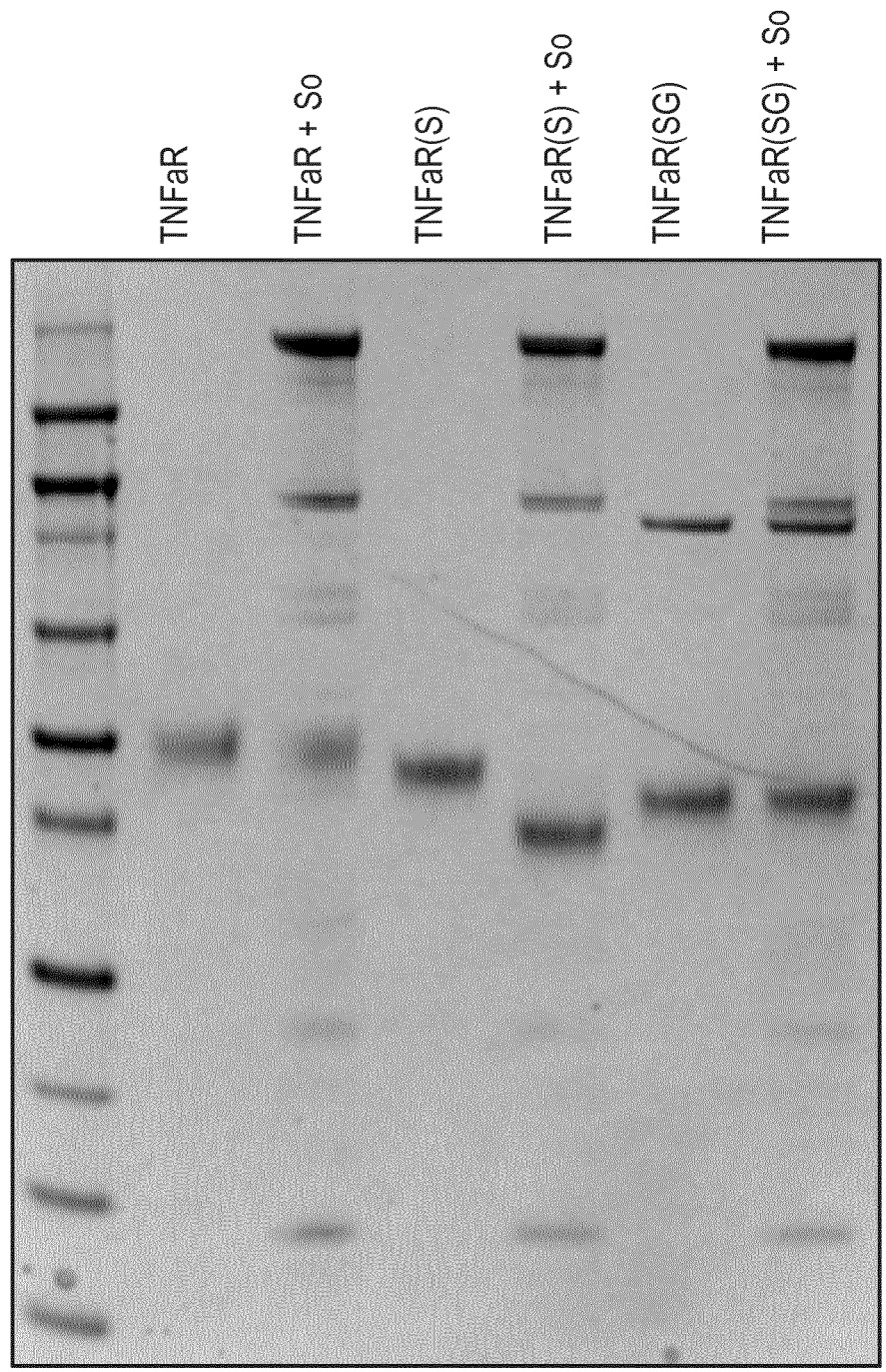
FIG. 14: Glycan composition influences activity. Incubation of the substrate with sialidase (S) and/or galactosidase (G) before addition of O-glycosidase (So); incubating o/n at 37° C. in optimal buffers (20 mM Tris-HCl pH 8.0).

To further study the necessity of specific glycans for O-glycosidase activity, TNFαR was pre-incubated with different enzymes to remove individual glycans before addition of the O-glycosidase. The removal of the terminal sialic acids was critical for activity, as was the presence of galactoses, indicating that the O-glycosidase can not remove single (terminal) GalNAcs (FIG. 14).

O-Glycosidase is Highly Efficient in Removing O-Glycans from Native Proteins

Once the final concentration of the combined O-glyk+Smix composition was determined (1:40), we repeated the comparison with the competitor brand product (NEB). While some hydrolysis can be detected on the TNFαR using the NEB products, it is evident that the hydrolysis is not complete, not even after 12 h. Opposite to this, the combined O-glyk+Smix composition resulted in a full hydrolysis of the glycoprotein within 4 hours, supported by the lectin blot (FIG. 15).

Figure 16:
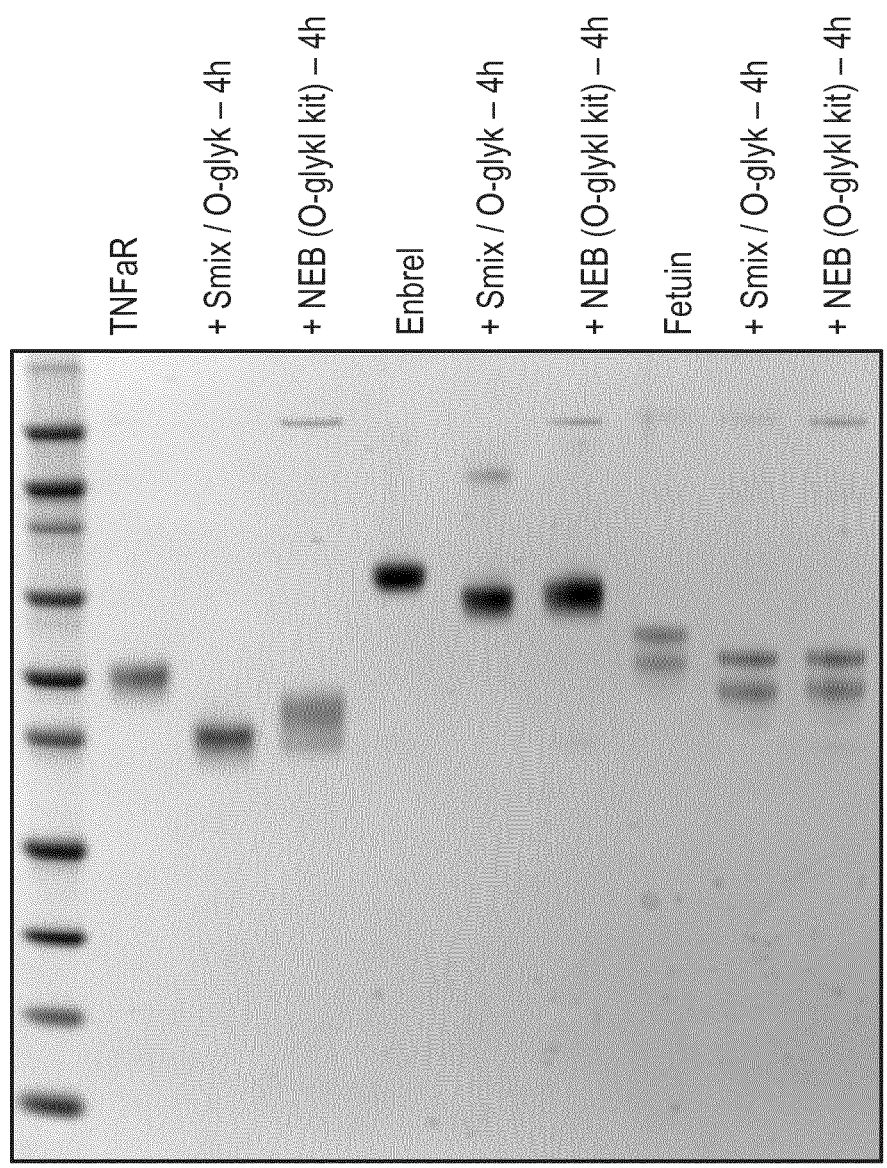
FIG. 16: The O-glycosidase+sialidase bundle (Smix/O-glyk) is active against a wide variety of glycoproteins. The enzymes added in their final concentration and formulation (1:40) in 20 mM Tris-HCl pH 6.8 were incubated with the glycoproteins for 4 h at 37° C. and then separated on SDS-PAGE.

Similarly, Enbrel showed an identical pattern, with the combined O-glyk+Smix composition able to fully hydrolyze it, while the NEB product did not. However, for feutin, both products were seemingly equally efficient (FIG. 16).

Both 2-3 and 2-6 Linked Sialic Acids Inhibits the Activity of the O-Glycosidase

Figure 17:
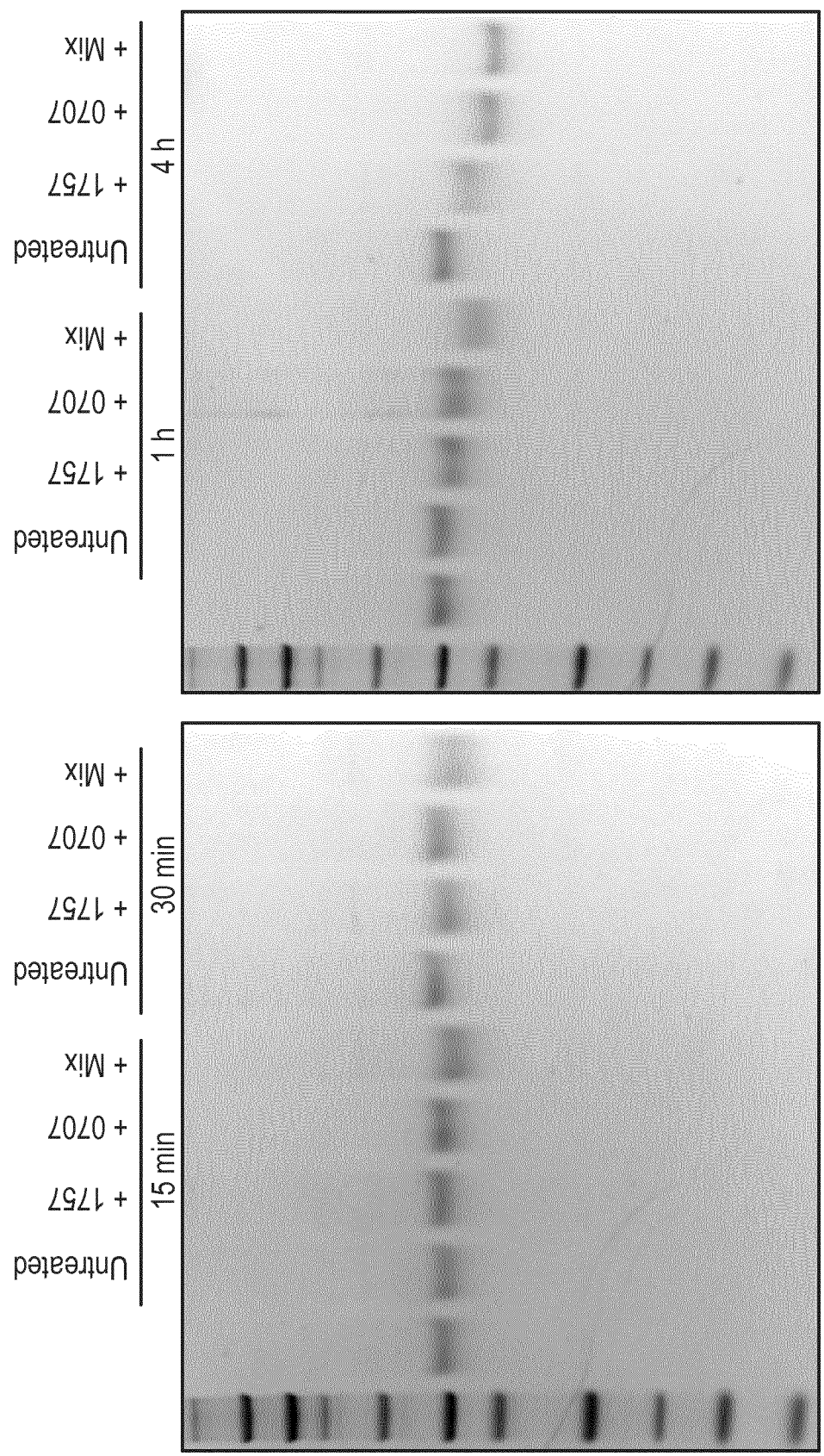
FIG. 17: Specific sialic acid bonds influence O-glycosidase activity. The enzymes (Am1757, Am0707 or Smix) added in their final concentration and formulation (1:40) in 20 mM Tris-HCl pH 6.8 were incubated with the TNFαR for 15 min-4 h at 37° C. and then separated on SDS-PAGE.

In order to evaluate the mutual effect of 2-3 or 2-6 linked sialic acids for O-glycosidase activity, we incubated the O-glycosidase with both 2-3 specific, or broad-spectrum sialidases (e.g. Am1757 and Smix, respectively). Though preliminary data suggest that Am1757 and Am0707 can release equal quantities of sialic acids from glycoproteins, treatment of the glycoprotein with Am1757 (or Smix) resulted in a faster hydrolysis of the substrate (TNFαR). However, for full hydrolysis it was critical to treat the glycoprotein with a broad-spectrum sialidase, to also remove 2-6 (or 2-8) sialic acids (FIG. 17).

Figure 18:
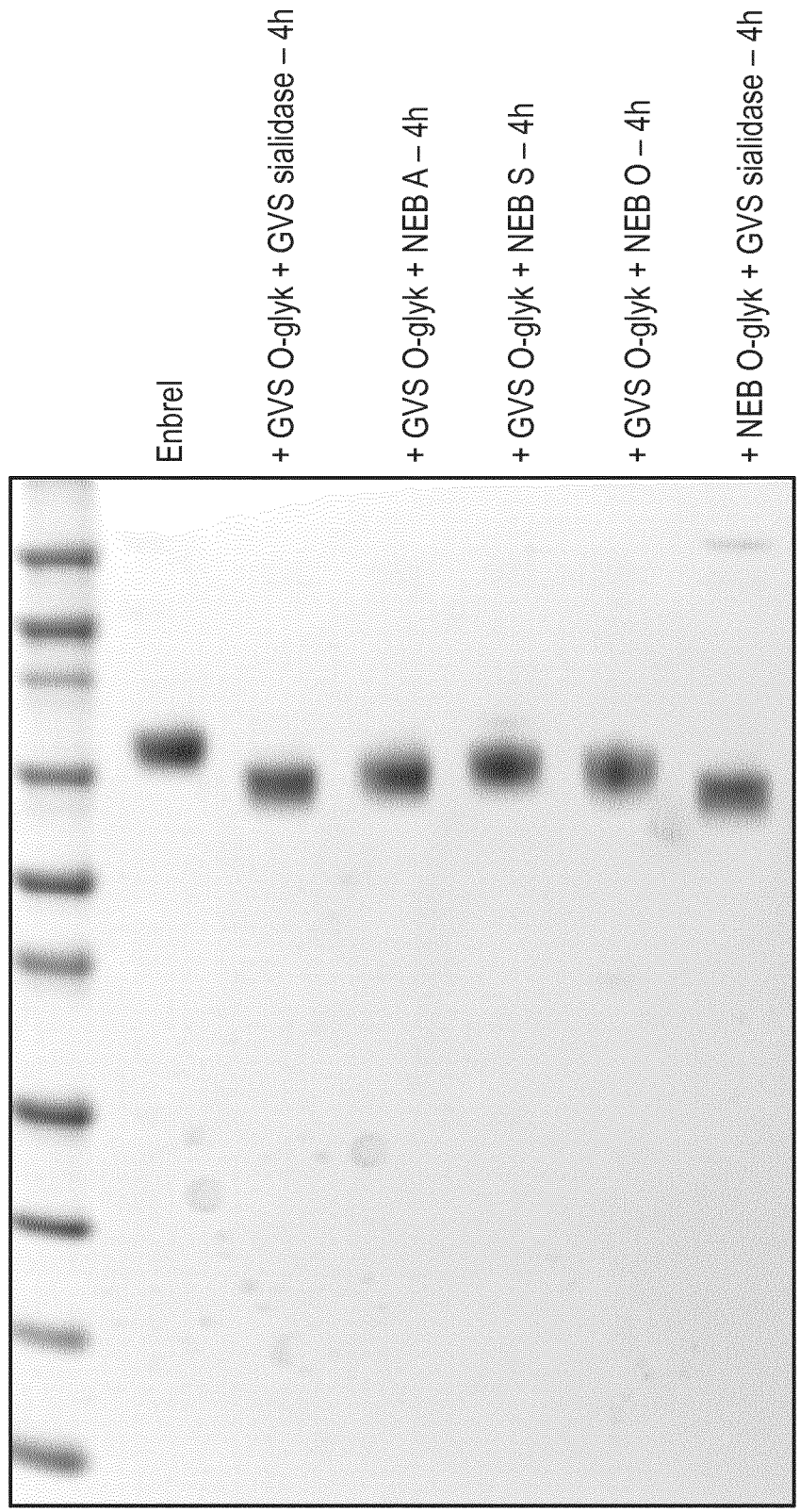
FIG. 18: The *S. oralis* O-glycosidase excels at least in part due to potent sialidases. *S. oralis* O-glycosidase (GVS O-glyk) or commercial O-glycosidase (NEB O-glyk) were incubated with the GVS_Smix sialidase mixture (GVS sialidase) or with commercial sialidases (NEB A, NEB S, NEB O). Appropriate buffers were used (e.g. 20 mM Tris-HCl pH 6.8 for GVS), and each set of enzymes was incubated with Enbrel (Etanercept) for 4 h at 37° C., before separation of products on SDS-PAGE.

The Native Activity of the GVS O-Glycosidase Bundle is Due to Highly Efficient Sialidase Activity To determine the impact of the individual components in the combined O-glyk+Smix composition, O-glyk and NEB were incubated with four different sialidase products (GVS_Smix, NEB A, NEB S, and NEB O). The combined O-glyk+Smix composition efficiently hydrolyzed all O-glycans from Enbrel (FIG. 18), while changing the sialidase to any of the NEB products resulted in a significantly lowered activity of O-glyk, with the NEB sialidase A being the most potent. However, while the NEB O-glycosidase bundle (NEB O-glycosidase with NEB sialidase 0) could not hydrolyze the Enbrel or TNFαR (FIG. 15, 16), by using GVS_Smix in place of the NEB sialidase O, full hydrolysis of the glycoprotein was observed, suggesting that the efficiency of the combined O-glyk+Smix composition relies at least in part on the ability of the sialidases to hydrolyze all 2-3 and 2-6 bonds on the glycoprotein.

Example 3—O-Glycoprotein Specific Endoprotease

Figure 19:
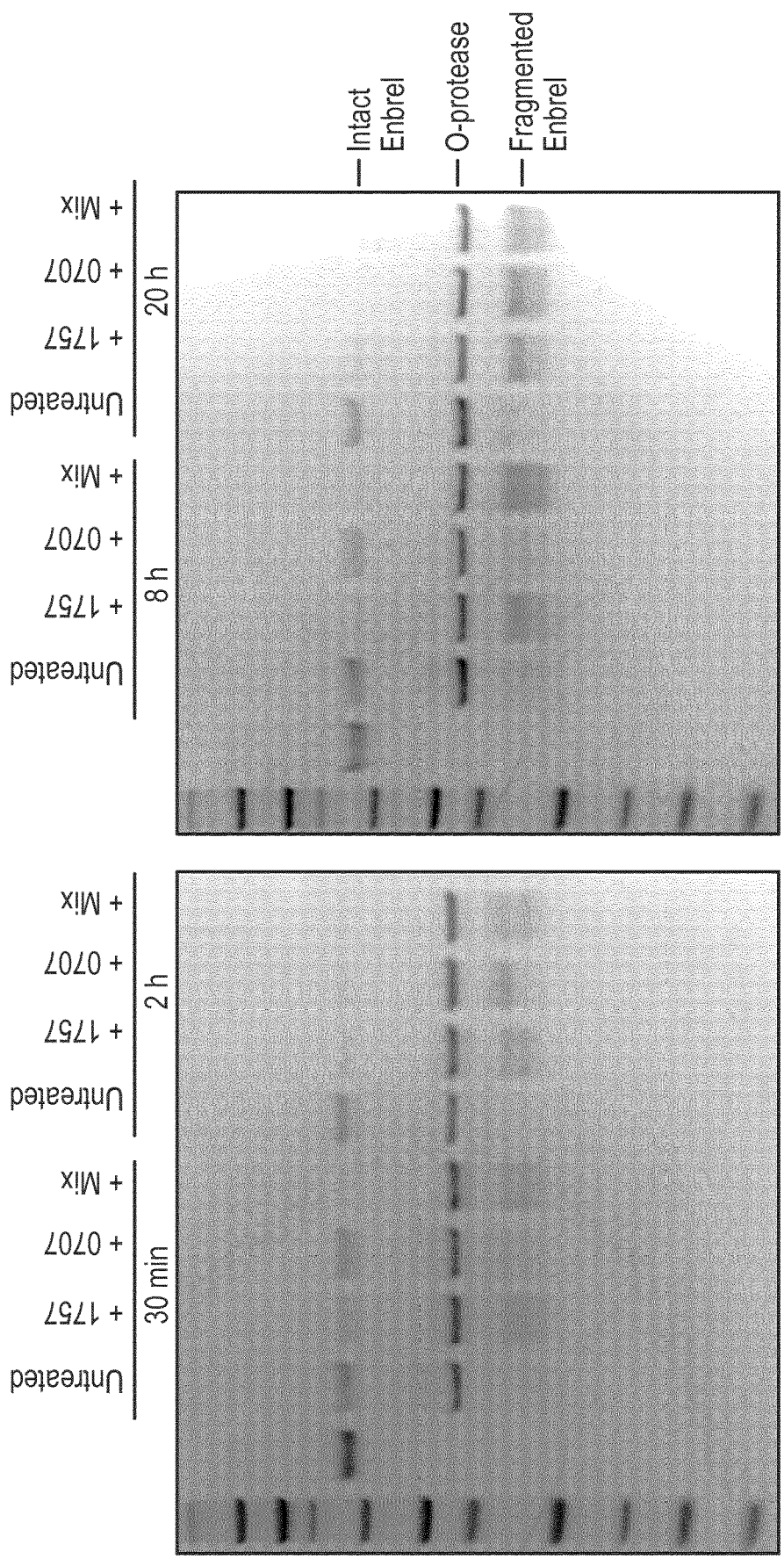
FIG. 19: 2-3 bonded sialic acids limit the efficiency of an O-glycoprotein specific endoprotease (LS). Concurrent incubation of LS with a set of diverse sialidases for 30 min-20 h, using Enbrel as a glycoprotein substrate, revealed the higher efficiency in the presence of the 2-3 specific sialdiase 1757, or with the Mix (0707+1757), while the broad spectrum sialidase 0707 was not necessary for seemingly full activity of LS, thus suggesting that 2-6 (and 2-8) bonds are not a concern for LS activity.

We recently determined that endoprotease activity of the polypeptide consisting of SEQ ID NO: 12 at least in part relied on specific sialic acid bonds, necessitating the removal of both 2-3 and 2-6 linked sialic acids for full effect. To determine the individual role of specific sialic acid bonds for the endoprotease activity, we incubated Etanercept with different sialidases in combination with the endoprotease for 30 min-20 h. Removal of 2-3 bonds seemed sufficient to enhance endoprotease activity (FIG. 19). Sialidsases used were (1) Am0707=polypeptide of SEQ ID NO: 3; (2) Am1757=polypeptide of SEQ ID NO: 6; Mix=1:1 combination of (1) and (2).

```
                              Sequences

SEQ ID NO: 1 - sialidase, Am0707 - wildtype (signal sequence underlined)
MTWLLCGRGKWNKVKRMMNSVFKCLMSAVCAVALPAFGQEEKTGFPTDRAVTVFSAGEGNPYASIRIPALLSI
GKGQLLAFAEGRYKNTDQGENDIIMSVSKNGGKTWSRPRAIAKAHGATFNNPCPVYDAKTRTVTVVFQRYPAG
VKERQPNIPDGWDDEKCIRNFMIQSRNGGSSWTKPQEITKTTKRPSGVDIMASGPNAGTQLKSGAHKGRLVIP
MNEGPFGKWVISCIYSDDGGKSWKLGQPTANMKGMVNETSIAETDNGGVVMVARHWGAGNCRRIAWSQDGGET
WGQVEDAPELFCDSTQNSLMTYSLSDQPAYGGKSRILFSGPSAGRRIKGQVAMSYDNGKTWPVKKLLGEGGFA
YSSLAMVEPGIVGVLYEENQEHIKKLKFVPITMEWLTDGEDTGLAPGKKAPVLK SEQ ID NO: 2 - sialidase, Am0707 - wildtype without signal
QEEKTGFPTDRAVTVFSAGEGNPYASIRIPALLSIGKGQLLAFAEGRYKNTDQGENDIIMSVSKNGGKTWSRP
RAIAKAHGATFNNPCPVYDAKTRTVTVVFQRYPAGVKERQPNIPDGWDDEKCIRNFMIQSRNGGSSWTKPQEI
TKTTKRPSGVDIMASGPNAGTQLKSGAHKGRLVIPMNEGPFGKWVISCIYSDDGGKSWKLGQPTANMKGMVNE
TSIAETDNGGVVMVARHWGAGNCRRIAWSQDGGETWGQVEDAPELFCDSTQNSLMTYSLSDQPAYGGKSRILF
SGPSAGRRIKGQVAMSYDNGKTWPVKKLLGEGGFAYSSLAMVEPGIVGVLYEENQEHIKKLKFVPITMEWLTD
GEDTGLAPGKKAPVLK SEQ ID NO: 3 - sialidase, Am0707 - with additional N terminal methionine
and C terminal linker+30His6 tag (bold & underlined)
MQEEKTGFPTDRAVTVFSAGEGNPYASIRIPALLSIGKGQLLAFAEGRYKNTDQGENDIIMSVSKNGGKTWSR
PRAIAKAHGATFNNPCPVYDAKTRTVTVVFQRYPAGVKERQPNIPDGWDDEKCIRNFMIQSRNGGSSWTKPQE
ITKTTKRPSGVDIMASGPNAGTQLKSGAHKGRLVIPMNEGPFGKWVISCIYSDDGGKSWKLGQPTANMKGMVN
ETSIAETDNGGVVMVARHWGAGNCRRIAWSQDGGETWGQVEDAPELFCDSTQNSLMTYSLSDQPAYGGKSRIL
FSGPSAGRRIKGQVAMSYDNGKTWPVKKLLGEGGFAYSSLAMVEPGIVGVLYEENQEHIKKLKFVPITMEWLT
DGEDTGLAPGKKAPVLKGSGLEHHHHHH SEQ ID NO: 4 - sialidase, Am1757 - wildtype (signal sequence underlined)
MKNLLFALLTGSFCCCYAQQKAAPVPEPEVVATPPADAGRGLIRVDSREIRHYSGTRKEPDYLVSRDNGKTWE
MKAAPAGYPPNYGGIPKESPAIVRNPLTREFIRVQPIGGFVFLSRGGLDGKWLAVTNDGKLEEDWKDPEKRKN
LKKLGGIMRTPVFVNKGRRVIVPFHNMGGGTKFHISDDGGLTWHVSRNGVTSPRHEARPPHQGVRWFNNAVEA
TVLEMKDGTLWALARTSQDQAWQAFSKDYGETWSKPEPSRFFGTLTMNTLGRLDDGTIVSLWTNTMALPENAT
AGNGTWEDVFTNRDSHHIAMSGDEGKTWYGFREIILDEHRNHPGYATLDGPEDRGKHQSEMVQLDKNRILISL
GQHKNHRRLVIVDRRWVGAKTRATQTGKDLDSQWTIHTYIPQKKGHCSYNRKPSAELVQDPSGGTKKVLQIKR
LDDPELVNEKSNVDYRNGGATWNFPNGTTGLVKFRFRVVDGEQADDSGLQVSLTDRLFNACDSTTKDYALFTF
PIRLKPAPHLLLGMKKVPFTPGAWHEISLLWQGGQAVVSLDGKKAGTLKMANKSPNGASYIHFISTGSQPDAG
ILLDTVNARVK SEQ ID NO: 5 - sialidase, Am1757 - wildtype without signal
QQKAAPVPEPEVVATPPADAGRGLIRVDSREIRHYSGTRKEPDYLVSRDNGKTWEMKAAPAGYPPNYGGIPKE
SPAIVRNPLTREFIRVQPIGGFVFLSRGGLDGKWLAVTNDGKLEEDWKDPEKRKNLKKLGGIMRTPVFVNKGR
RVIVPFHNMGGGTKFHISDDGGLTWHVSRNGVTSPRHEARPPHQGVRWFNNAVEATVLEMKDGTLWALARTSQ
DQAWQAFSKDYGETWSKPEPSRFFGTLTMNTLGRLDDGTIVSLWTNTMALPENATAGNGTWEDVFTNRDSHHI
AMSGDEGKTWYGFREIILDEHRNHPGYATLDGPEDRGKHQSEMVQLDKNRILISLGQHKNHRRLVIVDRRWVG
AKTRATQTGKDLDSQWTIHTYIPQKKGHCSYNRKPSAELVQDPSGGTKKVLQIKRLDDPELVNEKSNVDYRNG
GATWNFPNGTTGLVKFRFRVVDGEQADDSGLQVSLTDRLFNACDSTTKDYALFTFPIRLKPAPHLLLGMKKVP
FTPGAWHEISLLWQGGQAVVSLDGKKAGTLKMANKSPNGASYIHFISTGSQPDAGILLDTVNARVK SEQ ID NO: 6 - sialidase, Am1757 - with additional N terminal methionine
and C terminal linker + His6 tag (bold & underlined)
MQQKAAPVPEPEVVATPPADAGRGLIRVDSREIRHYSGTRKEPDYLVSRDNGKTWEMKAAPAGYPPNYGGIPK
ESPAIVRNPLTREFIRVQPIGGFVFLSRGGLDGKWLAVTNDGKLEEDWKDPEKRKNLKKLGGIMRTPVFVNKG
RRVIVPFHNMGGGTKFHISDDGGLTWHVSRNGVTSPRHEARPPHQGVRWFNNAVEATVLEMKDGTLWALARTS
QDQAWQAFSKDYGETWSKPEPSRFFGTLTMNTLGRLDDGTIVSLWTNTMALPENATAGNGTWEDVFTNRDSHH
IAMSGDEGKTWYGFREIILDEHRNHPGYATLDGPEDRGKHQSEMVQLDKNRILISLGQHKNHRRLVIVDRRWV
GAKTRATQTGKDLDSQWTIHTYIPQKKGHCSYNRKPSAELVQDPSGGTKKVLQIKRLDDPELVNEKSNVDYRN
GGATWNFPNGTTGLVKFRFRVVDGEQADDSGLQVSLTDRLFNACDSTTKDYALFTFPIRLKPAPHLLLGMKKV
PFTPGAWHEISLLWQGGQAVVSLDGKKAGTLKMANKSPNGASYIHFISTGSQPDAGILLDTVNARVKGSGLEH
HHHHH
```

Sequences

SEQ ID NO: 7 - O-glycosidase from *S. oralis*
Wildtype (signal sequence underlined; C terminal element of LPXTG cell
wall anchor motif bold underlined)
MDKRFFEKRCKFSIRKFTLGVASVMIGATFFAASPVLADQARVGSTDNLPSELADLDKKASDEGHDFDKEAAA
QNPGSAETTEGPQTEEELLAQEKEKSEKPSNLPKELEDKLEKAEDNGREVDKDQLAQDTGKLVPEDVAKTTNG
ELNYGATVKIKTPSGEGSGIVVAKDLVLTVSHNFIKDSQEGNIRKVVDNDQGDGDIYSISYPGLPDVKFSKKD
IIHWDREGYLKGFKNDLALVRLRTVLENTPVEVTKKPVVKKIGDKLHVFGYPEGKLNPIVNTTVDFAEPYGEG
VQGIGYQGGKPGASGGGIFDTEGKLVGVHQNGVVGKRSGGILFSPAQLKWIQDHMQGISSVKPADLEEKEKPA
EEKPKEDKPAAAKPETPKAVTPEWQTVANKEQQGTVTIREEKGVRYNQLSSTAQNDNDGKPALFEKQGLTVDA
NGNATVDLTFKDDSEKGKSRFGVFLKFKDTKNNVFVGYDQGGWFWEYKTPGNSTWYKGNRVAAPEPGSVNRLS
ITLKSDGQLNASNNDVNLFDTVTLPGAVNENLKNEKKILLKAGTYSNDRTVVSVKTDNQEGVKADDTPAQKET
GPAVDDSKVTYDTIQSKVLKAVIDQAFPRVKEYTLNGHTLPGQVQQFNQVFINNHRITPEVTYKKINETTAEY
LMKLRDDAHLINAEMTVRLQVVDNQLHFDVTKIVNHNQVTPGQKIDDERKLLSTISFLGNALVSVSSDQAGAK
FDGATMSNNTHVSGDDHIDVTNPMKDLAKGYMYGFVSTDKLAAGVWSNSQNSYGGGSNDWTRLTAYKETVGNA
NYVGIHSSEWQWEKAYKGIVFPEYTKELPSAKVVITEDANADNKVDWQDGAIAYRSIMNNPQGWEKVKDITAY
RIAMNFGSQAQNPFLMTLDGIKKINLHTDGLGQGVLLKGYGSEGHDSGHLNYADIGKRIGGVEDFKTLIEKAK
KYGAHLGIHVNASETYPESKYFNENILRKNPDGSYSYGWNWLDQGINIDAAYDLAHGRLARWEDLKKKLGEGL
DFIYVDVWGNGQSGDNGAWATHVLAKEINKQGWRFAIEWGHGGEYDSTFQHWAADLTYGGYTNKGINSAITRF
IRNHQKDSWVGDYRSYGGAANYPLLGGYSMKDFEGWQGRSDYNGYVTNLFAHDVMTKYFQHFTVSKWENGTPV
TMTDNGSTYKWTPEMKVELVDAAGNKVVVTRKSNDVNSPQYRERTVTLNGRVIQDGSAYLTPWNWDANGKKLP
TEKEKMYYFNTQAGATTWTLPSDWANSKVYLYKLTDQGKTEEQELTVTDGKITLDLLANQPYVLYRSKQTNPE
MSWSEGMHIYDQGFNSGTLKHWTISGDASKAEIVKSQGANEMLRIQGNKSKVSLTQKLTGLKPNTKYAVYVGV
DNRSNAKASITVNTGEKEVTTYTNKSLALNYIKAYAHNNRRENATVDDTSYFQNMYAFFTTGSDVSNVTLTLS
REAGDEATYFDEIRTFENNSSMYGDKHDTGQGTFKQDFENVAQGIFPFVVGGVEGVEDNRTHLSEKHDPYTQR
GWNGKKVDDVIEGNWSLKTNGLVSRRNLVYQTIPQNFRFEAGKTYRVTFEYEAGSDNTYAFVVGKGEFQSGRR
GTQASNLEMHELPNTWTDSKKAKKVTFLVTGAETGDTWVGIYSTGNASNTRGDAGGNANFRGYNDFMMDNLQI
EEITLTGKMLTENALKNYLPTVAMTNYTKESMDALKEAVFNLSQADDDISVEEARAEIAKIEALKNALVQKKT
ALVAEDFESLDAPAQPGEGLENAFDGNVSSLWHTSWNGGDVGKPATMVLKEPTEITGLRYVPRASDSNGNLRD
VKLVVTDESGKEHTFNVTDWPNNNKPKDIDFGKTIKAKKIVLTGTKTYGDGGDKYQSAAELIFTRPQVAETPL
DLSGYEAALAKAQKLTDKDNQEEVASVQASMKYATDNHLLTERMVAYFADYLNQLKDSATKPDAPTSSKGEEQ
PPVLDVPEFKGGVNATEAAVHEVPEFKGGVNAVQALVHELPEYKGGANAVLAAANEVPEYKGGANAVEALVNE
KPAYTGVLATAGDQAAPTVEKPEYPLTPSPVADTKTPGAKDEEKLPATGEHSSEVALFLASVSIALSAAVLAT
KRKEE

SEQ ID NO: 8 - O-glycosidase from *S. oralis*
Wildtype with signal sequence removed (C terminal element of LPXTG cell
wall anchor motif bold underlined)
DQARVGSTDNLPSELADLDKKASDEGHDFDKEAAAQNPGSAETTEGPQTEEELLAQEKEKSEKPSNLPKELED
KLEKAEDNGREVDKDQLAQDTGKLVPEDVAKTTNGELNYGATVKIKTPSGEGSGIVVAKDLVLTVSHNFIKDS
QEGNIRKVVDNDQGDGDIYSISYPGLPDVKFSKKDIIHWDREGYLKGFKNDLALVRLRTVLENTPVEVTKKPV
VKKIGDKLHVFGYPEGKLNPIVNTTVDFAEPYGEGVQGIGYQGGKPGASGGGIFDTEGKLVGVHQNGVVGKRS
GGILFSPAQLKWIQDHMQGISSVKPADLEEKEKPAEEKPKEDKPAAAKPETPKAVTPEWQTVANKEQQGTVTI
REEKGVRYNQLSSTAQNDNDGKPALFEKQGLTVDANGNATVDLTFKDDSEKGKSRFGVFLKFKDTKNNVFVGY
DQGGWFWEYKTPGNSTWYKGNRVAAPEPGSVNRLSITLKSDGQLNASNNDVNLFDTVTLPGAVNENLKNEKKI
LLKAGTYSNDRTVVSVKTDNQEGVKADDTPAQKETGPAVDDSKVTYDTIQSKVLKAVIDQAFPRVKEYTLNGH
TLPGQVQQFNQVFINNHRITPEVTYKKINETTAEYLMKLRDDAHLINAEMTVRLQVVDNQLHFDVTKIVNHNQ
VTPGQKIDDERKLLSTISFLGNALVSVSSDQAGAKFDGATMSNNTHVSGDDHIDVTNPMKDLAKGYMYGFVST
DKLAAGVWSNSQNSYGGGSNDWTRLTAYKETVGNANYVGIHSSEWQWEKAYKGIVFPEYTKELPSAKVVITED
ANADNKVDWQDGAIAYRSIMNNPQGWEKVKDITAYRIAMNFGSQAQNPFLMTLDGIKKINLHTDGLGQGVLLK
GYGSEGHDSGHLNYADIGKRIGGVEDFKTLIEKAKKYGAHLGIHVNASETYPESKYFNENILRKNPDGSYSYG
WNWLDQGINIDAAYDLAHGRLARWEDLKKKLGEGLDFIYVDVWGNGQSGDNGAWATHVLAKEINKQGWRFAIE
WGHGGEYDSTFQHWAADLTYGGYTNKGINSAITRFIRNHQKDSWVGDYRSYGGAANYPLLGGYSMKDFEGWQG
RSDYNGYVTNLFAHDVMTKYFQHFTVSKWENGTPVTMTDNGSTYKWTPEMKVELVDAAGNKVVVTRKSNDVNS
PQYRERTVTLNGRVIQDGSAYLTPWNWDANGKKLPTEKEKMYYFNTQAGATTWTLPSDWANSKVYLYKLTDQG
KTEEQELTVTDGKITLDLLANQPYVLYRSKQTNPEMSWSEGMHIYDQGFNSGTLKHWTISGDASKAEIVKSQG
ANEMLRIQGNKSKVSLTQKLTGLKPNTKYAVYVGVDNRSNAKASITVNTGEKEVTTYTNKSLALNYIKAYAHN
NRRENATVDDTSYFQNMYAFFTTGSDVSNVTLTLSREAGDEATYFDEIRTFENNSSMYGDKHDTGQGTFKQDF
ENVAQGIFPFVVGGVEGVEDNRTHLSEKHDPYTQRGWNGKKVDDVIEGNWSLKTNGLVSRRNLVYQTIPQNFR
FEAGKTYRVTFEYEAGSDNTYAFVVGKGEFQSGRRGTQASNLEMHELPNTWTDSKKAKKVTFLVTGAETGDTW
VGIYSTGNASNTRGDAGGNANFRGYNDFMMDNLQIEEITLTGKMLTENALKNYLPTVAMTNYTKESMDALKEA
VFNLSQADDDISVEEARAEIAKIEALKNALVQKKTALVAEDFESLDAPAQPGEGLENAFDGNVSSLWHTSWNG
GDVGKPATMVLKEPTEITGLRYVPRASDSNGNLRDVKLVVTDESGKEHTFNVTDWPNNNKPKDIDFGKTIKAK
KIVLTGTKTYGDGGDKYQSAAELIFTRPQVAETPLDLSGYEAALAKAQKLTDKDNQEEVASVQASMKYATDNH
LLTERMVAYFADYLNQLKDSATKPDAPTSSKGEEQPPVLDVPEFKGGVNATEAAVHEVPEFKGGVNAVQALVH
ELPEYKGGANAVLAAANEVPEYKGGANAVEALVNEKPAYTGVLATAGDQAAPTVEKPEYPLTPSPVADTKTPG
AKDEEKLPATGEHSSEVALFLASVSIALSAAVLATKRKEE

SEQ ID NO: 9 - O-glycosidase from *S. oralis*
Wildtype with signal sequence and C terminal element of LPXTG cell wall
anchor motif both removed
DQARVGSTDNLPSELADLDKKASDEGHDFDKEAAAQNPGSAETTEGPQTEEELLAQEKEKSEKPSNLPKELED
KLEKAEDNGREVDKDQLAQDTGKLVPEDVAKTTNGELNYGATVKIKTPSGEGSGIVVAKDLVLTVSHNFIKDS
QEGNIRKVVDNDQGDGDIYSISYPGLPDVKFSKKDIIHWDREGYLKGFKNDLALVRLRTVLENTPVEVTKKPV
VKKIGDKLHVFGYPEGKLNPIVNTTVDFAEPYGEGVQGIGYQGGKPGASGGGIFDTEGKLVGVHQNGVVGKRS
GGILFSPAQLKWIQDHMQGISSVKPADLEEKEKPAEEKPKEDKPAAAKPETPKAVTPEWQTVANKEQQGTVTI
REEKGVRYNQLSSTAQNDNDGKPALFEKQGLTVDANGNATVDLTFKDDSEKGKSRFGVFLKFKDTKNNVFVGY

| Sequences |
|---|
| DQGGWFWEYKTPGNSTWYKGNRVAAPEPGSVNRLSITLKSDGQLNASNNDVNLFDTVTLPGAVNENLKNEKKI<br>LLLKAGTYSNDRTVVSVKTDNQEGVKADDTPAQKETGPAVDDSKVTYDTIQSKVLKAVIDQAFPRVKEYTLNGH<br>TLPGQVQQFNQVFINNHRITPEVTYKKINETTAEYLMKLRDDAHLINAEMTVRLQVVDNQLHFDVTKIVNHNQ<br>VTPGQKIDDERKLLSTISFLGNALVSVSSDQAGAKFDGATMSNNTHVSGDDHIDVTNPMKDLAKGYMYGFVST<br>DKLAAGVWSNSQNSYGGGSNDWTRLTAYKETVGNANYVGIHSSEWQWEKAYKGIVFPEYTKELPSAKVVITED<br>ANADNKVDWQDGAIAYRSIMNNPQGWEKVKDITAYRIAMNFGSQAQNPFLMTLDGIKKINLHTDGLGQGVLLK<br>GYGSEGHDSGHLNYADIGKRIGGVEDFKTLIEKAKKYGAHLGIHVNASETYPESKYFNENILRKNPDGSYSYG<br>WNWLDQGINIDAAYDLAHGRLARWEDLKKKLGEGLDFIYVDVWGNGQSGDNGAWATHVLAKEINKQGWRFAIE<br>WGHGGEYDSTFQHWAADLTYGGYTNKGINSAITRFIRNHQKDSWVGDYRSYGGAANYPLLGGYSMKDFEGWQG<br>RSDYNGYVTNLFAHDVMTKYFQHFTVSKWENGTPVTMTDNGSTYKWTPEMKVELVDAAGNKVVVTRKSNDVNS<br>PQYRERTVTLNGRVIQDGSAYLTPWNWDANGKKLPTEKEKMYYFNTQAGATTWTLPSDWANSKVYLYKLTDQG<br>KTEEQELTVTDGKITLDLLANQPYVLYRSKQTNPEMSWSEGMHIYDQGFNSGTLKHWTISGDASKAEIVKSQG<br>ANEMLRIQGNKSKVSLTQKLTGLKPNTKYAVYVGVDNRSNAKASITVNTGEKEVTTYTNKSLALNYIKAYAHN<br>NRRENATVDDTSYFQNMYAFFTTGSDVSNVTLTLSREAGDEATYFDEIRTFENNSSMYGDKHDTGQGTFKQDF<br>ENVAQGIFPFVVGGVEGVEDNRTHLSEKHDPYTQRGWNGKKVDDVIEGNWSLKTNGLVSRRNLVYQTIPQNFR<br>FEAGKTYRVTFEYEAGSDNTYAFVVGKGEFQSGRRGTQASNLEMHELPNTWTDSKKAKKVTFLVTGAETGDTW<br>VGIYSTGNASNTRGDAGGNANFRGYNDFMMDNLQIEEITLTGKMLTENALKNYLPTVAMTNYTKESMDALKEA<br>VFNLSQADDDISVEEARAEIAKIEALKNALVQKKTALVAEDFESLDAPAQPGEGLENAFDGNVSSLWHTSWNG<br>GDVGKPATMVLKEPTEITGLRYVPRASDSNGNLRDVKLVVTDESGKEHTFNVTDWPNNNKPKDIDFGKTIKAK<br>KIVLTGTKTYGDGGDKYQSAAELIFTRPQVAETPLDLSGYEAALAKAQKLTKDKDNQEEVASVQASMKYATDNH<br>LLTERMVAYFADYLNQLKDSATKPDAPTSSKGEEQPPVLDVPEFKGGVNATEAAVHEVPEFKGGVNAVQALVH<br>ELPEYKGGANAVLAAANEVPEYKGGANAVEALVNEKPAYTGVLATAGDQAAPTVEKPEYPLTPSPVADTKTPG<br>AKDEEKLPA |

SEQ ID NO: 10 — O-glycosidase from *S. oralis* with additional N terminal
Met, C terminal GSGLE-His6tag (bold underlined), and signal sequence and
C terminal element of LPXTG cell wall anchor motif removed
MDQARVGSTDNLPSELADLDKKASDEGHDFDKEAAAQNPGSAETTEGPQTEEELLAQEKEKSEKPSNLPKELE
DKLEKAEDNGREVDKDQLAQDTGKLVPEDVAKTTNGELNYGATVKIKTPSGEGSGIVVAKDLVLTVSHNFIKD
SQEGNIRKVVDNDQGDGDIYSISYPGLPDVKFSKKDIIHWDREGYLKGFKNDLALVRLRTVLENTPVEVTKKP
VVKKIGDKLHVFGYPEGKLNPIVNTTVDFAEPYGEGVQGIGYQGGKPGASGGGIFDTEGKLVGVHQNGVVGKR
SGGILFSPAQLKWIQDHMQGISSVKPADLEEKEKPAEEKPKDKPAAAKPETPKAVTPEWQTVANKEQQGTVT
IREEKGVRYNQLSSTAQNDNDGKPALFEKQGLTVDANGNATVDLTFKDDSEKGKSRFGVFLKFKDTKNNVFVG
YDQGGWFWEYKTPGNSTWYKGNRVAAPEPGSVNRLSITLKSDGQLNASNNDVNLFDTVTLPGAVNENLKNEKK
ILLKAGTYSNDRTVVSVKTDNQEGVKADDTPAQKETGPAVDDSKVTYDTIQSKVLKAVIDQAFPRVKEYTLNG
HTLPGQVQQFNQVFINNHRITPEVTYKKINETTAEYLMKLRDDAHLINAEMTVRLQVVDNQLHFDVTKIVNHN
QVTPGQKIDDERKLLSTISFLGNALVSVSSDQAGAKFDGATMSNNTHVSGDDHIDVTNPMKDLAKGYMYGFVS
TDKLAAGVWSNSQNSYGGGSNDWTRLTAYKETVGNANYVGIHSSEWQWEKAYKGIVFPEYTKELPSAKVVITE
DANADNKVDWQDGAIAYRSIMNNPQGWEKVKDITAYRIAMNFGSQAQNPFLMTLDGIKKINLHTDGLGQGVLL
KGYGSEGHDSGHLNYADIGKRIGGVEDFKTLIEKAKKYGAHLGIHVNASETYPESKYFNENILRKNPDGSYSY
GWNWLDQGINIDAAYDLAHGRLARWEDLKKKLGEGLDFIYVDVWGNGQSGDNGAWATHVLAKEINKQGWRFAI
EWGHGGEYDSTFQHWAADLTYGGYTNKGINSAITRFIRNHQKDSWVGDYRSYGGAANYPLLGGYSMKDFEGWQ
GRSDYNGYVTNLFAHDVMTKYFQHFTVSKWENGTPVTMTDNGSTYKWTPEMKVELVDAAGNKVVVTRKSNDVN
SPQYRERTVTLNGRVIQDGSAYLTPWNWDANGKKLPTEKEKMYYFNTQAGATTWTLPSDWANSKVYLYKLTDQ
GKTEEQELTVTDGKITLDLLANQPYVLYRSKQTNPEMSWSEGMHIYDQGFNSGTLKHWTISGDASKAEIVKSQ
GANEMLRIQGNKSKVSLTQKLTGLKPNTKYAVYVGVDNRSNAKASITVNTGEKEVTTYTNKSLALNYIKAYAH
NNRRENATVDDTSYFQNMYAFFTTGSDVSNVTLTLSREAGDEATYFDEIRTFENNSSMYGDKHDTGQGTFKQD
FENVAQGIFPFVVGGVEGVEDNRTHLSEKHDPYTQRGWNGKKVDDVIEGNWSLKTNGLVSRRNLVYQTIPQNF
RFEAGKTYRVTFEYEAGSDNTYAFVVGKGEFQSGRRGTQASNLEMHELPNTWTDSKKAKKVTFLVTGAETGDT
WVGIYSTGNASNTRGDAGGNANFRGYNDFMMDNLQIEEITLTGKMLTENALKNYLPTVAMTNYTKESMDALKE
AVFNLSQADDDISVEEARAEIAKIEALKNALVQKKTALVAEDFESLDAPAQPGEGLENAFDGNVSSLWHTSWN
GGDVGKPATMVLKEPTEITGLRYVPRASDSNGNLRDVKLVVTDESGKEHTFNVTDWPNNNKPKDIDFGKTIKA
KKIVLTGTKTYGDGGDKYQSAAELIFTRPQVAETPLDLSGYEAALAKAQKLTKDKDNQEEVASVQASMKYATDN
HLLTERMVAYFADYLNQLKDSATKPDAPTSSKGEEQPPVLDVPEFKGGVNATEAAVHEVPEFKGGVNAVQALV
HELPEYKGGANAVLAAANEVPEYKGGANAVEALVNEKPAYTGVLATAGDQAAPTVEKPEYPLTPSPVADTKTP
GAKDEEKLPAGSGLEHHHHHH

SEQ ID NO: 11 — O-glycoprotein-specific endoprotease
EVTVPDALKDRIALKKTARQLNIVYFLGSDTEPVPDYERRLSELLLYLQQFYGKEMQRHGYGARSFGLDIKSP
GRVNIIEYKAKNPAAHYPYENGGGWKAAQELDEFFKAHPDRKKSQHTLIIMPTWNDEKNGPDNPGGVPFYGMG
RNCFALDYPAFDIKHLGQKTREGRLLTKWYGGMAHELGHGLNLPHNHQTASDGKKYGTALMGSGNYTFGTSPT
FLTPASCALLDACEVFSVTPSQQFYEGKPEVEVGDVAISFKGDQILVSGNYKSPQTVKALNVYIQDPPYAVNQ
DYDAVSFSRRLGKKSGKFSMKIDKKELEGLNNNEFRISLMFILANGLHMQKHFTFHWDALQDYRDGSKS SEQ ID NO: 12 — O-glycoprotein-specific endoprotease (LS)
MEVTVPDALKDRIALKKTARQLNIVYFLGSDTEPVPDYERRLSELLLYLQQFYGKEMQRHGYGARSFGLDIKS
PGRVNIIEYKAKNPAAHYPYENGGGWKAAQELDEFFKAHPDRKKSQHTLIIMPTWNDEKNGPDNPGGVPFYGM
GRNCFALDYPAFDIKHLGQKTREGRLLTKWYGGMAHELGHGLNLPHNHQTASDGKKYGTALMGSGNYTFGTSP
TFLTPASCALLDACEVFSVTPSQQFYEGKPEVEVGDVAISFKGDQILVSGNYKSPQTVKALNVYIQDPPYAVN
QDYDAVSFSRRLGKKSGKFSMKIDKKELEGLNNNEFRISLMFILANGLHMQKHFTFHWDALQDYRDGSKSGSG
HHHHHH SEQ ID NO: 13 — encodes SEQ ID NO: 10
ATGGACCAAGCGCGTGTGGGTAGCACCGATAACCTGCCGAGCGAGCTGGCGGATCTGGACAAGAAAGCGAGCG
ACGAAGGCCACGATTTTGACAAAGAGGCGGCGGCGCAGAACCCGGGTAGCGCGGAAACCACCGAAGGTCCGCA
GACCGAGGAAGAGCTGCTGGCGCAAGAAAAAGAGAAGAGCGAGAAGCCGAGCAACCTGCCGAAAGAACTGGAG
GATAAACTGGAAAAGGCGGAGGACAACGGTCGTGAAGTGGATAAAGACCAGCTGGCGCAAGACACCGGCAAGC

| Sequences |
| --- |
| TGGTGCCGGAGGATGTTGCGAAAACCACCAACGGTGAACTGAACTACGGCGCGACCGTTAAAATTAAGACCCC |
| GAGCGGCGAGGGTAGCGGTATTGTGGTTGCGAAGGACCTGGTGCTGACCGTTAGCCACAACTTCATTAAGGAT |
| AGCCAGGAAGGTAATATCCGTAAAGTGGTTGATAACGACCAAGGCGATGGTGACATCTACAGCATTAGCTATC |
| CGGGCCTGCCGGACGTTAAGTTCAGCAAGAAAGATATCATCCACTGGGACCGTGAGGGTTACCTGAAAGGCTT |
| CAAGAACGATCTGGCGCTGGTGCGTCTGCGTACCGTTCTGGAAAACACCCCGGTTGAGGTGACCAAGAAACCG |
| GTGGTTAAGAAAATTGGTGACAAGCTGCACGTGTTTGGTTATCCGGAGGGCAAACTGAACCCGATCGTGAACA |
| CCACCGTTGATTTCGCGGAACCGTACGGCGAGGGTGTTCAGGGCATTGGTTATCAAGGTGGCAAACCGGGCGC |
| GAGCGGTGGCGGTATCTTTGACACCGAAGGCAAGCTGGTTGGCGTGCACCAGAACGGTGTGGTTGGCAAACGT |
| AGCGGCGGTATTCTGTTCAGCCCGGCGCAACTGAAGTGGATTCAGGACCACATGCAAGGTATCAGCAGCGTGA |
| AACCGGCGGATCTGGAAGAGAAAGAGAAGCCGGCGGAAGAGAAACCGAAGGAAGACAAGCCGGCGGCGGCGAA |
| GCCGGAAACCCCGAAAGCGGTTACCCCGGAGTGGCAAACCGTGGCGAACAAGGAACAGCAAGGTACCGTTACC |
| ATCCGTGAAGAGAAAGGCGTGCGTTACAACCAGCTGAGCAGCACCGCGCAAAACGATAACGACGGCAAGCCGG |
| CGCTGTTTGAGAAACAGGGTCTGACCGTTGACGCGAACGGCAACGCGACCGTGGATCTGACCTTCAAGGACGA |
| TAGCGAAAAAGGCAAGAGCCGTTTCGGCGTTTTTCTGAAATTCAAGGACACCAAAAACAACGTTTTTGTGGGT |
| TACGATCAAGGCGGTTGGTTCTGGGAGTATAAGACCCCGGGTAACAGCACCTGGTACAAGGGTAACCGTGTGG |
| CGGCGCCGGAACCGGGTAGCGTCGAACCGTCTGAGCATTACCCTGAAAAGCGACGGCCAGCTGAACGCGAGCA |
| CAACGATGTGAACCTGTTCGACACCGTTACCCTGCCGGGTGCGGTGAACGAAAACCTGAAGAACGAGAAGAAA |
| ATCCTGCTGAAAGCGGGCACCTACAGCAACGACCGTACCGTGGTTAGCGTTAAGACCGATAACCAGGAAGGTG |
| TGAAAGCGGACGATACCCCGGCGCAAAAGGAAACCGGTCCGGCGGTGGACGATAGCAAGGTTACCTACGACAC |
| CATTCAGAGCAAAGTGCTGAAGGCGGTTATCGATCAAGCGTTTCCGCGTGTGAAAGAGTATACCCTGAACGGT |
| CACACCCTGCCGGGTCAGGTTCAGCAATTTAACCAAGTGTTCATTAACAACCACCGTATCACCCCGGAAGTGA |
| CCTATAAGAAAATTAACGAAACCACCGCGGAGTACCTGATGAAGCTGCGTGACGATGCGCACCTGATCAACGC |
| GGAAATGACCGTGCGTCTGCAGGTGGTTGATAACCAACTGCACTTCGACGTGACCAAAATTGTTAACCACAAC |
| CAGGTTACCCGGGTCAAAAGATTGACGATGAGCGTAAACTGCTGAGCACCATCAGCTTTCTGTGGGCAACGCG |
| TGGTTAGCGTGAGCAGCGATCAAGCGGGTGCGAAGTTTGATGGTGCGACCATGAGCAACAACACCCACGTTAG |
| CGGTGACGATCACATCGATGTGACCAACCCGATGAAAGACCTGGCGAAGGGTTACATGTATGGCTTTGTTAGC |
| ACCGACAAGCTGGCGGCGGGTGTGTGGAGCAACAGCCAAAACAGCTACGGCGGTGGCAGCAACGATTGGACCC |
| GTCTGACCGCGTATAAAGAAACCGTTGGTAACGCGAACTACGTGGGCATTCACAGCAGCGATGGCAGTGGGA |
| GAAAGCGTACAAGGGTATCGTGTTCCCGGAATATACCAAGGAGCTGCCGAGCGCGAAAGTGGTTATCACCGAG |
| GATGCGAACGCGGACAACAAAGTGGATTGGCAGGACGGTGCGATTGCGTACCGTAGCATCATGAACAACCCGC |
| AAGGCTGGGAAAAAGTTAAGGACATTACCGCGTATCGTATCGCGATGAACTTTGGTAGCCAGGCGCAAAACCC |
| GTTCCTGATGACCCTGGACGGCATCAAGAAAATTAACCTGCACACCGATGGCTGGGTCAGGGCGTTCTGCTG |
| AAGGGTTATGGTAGCGAGGGTCATGACAGCGGTCACCTGAACTACGCGGATATCGGTAAACGTATTGGTGGCG |
| TGGAAGACTTTAAGACCCTGATTGAGAAAGCGAAGAAATACGGTGCGCACCTGGGCATCCACGTTAACGCGAG |
| CGAAACCTACCCGGAGAGCAAGTATTTCAACGAAAACATTCTGCGTAAAAACCCGGACGGTAGCTACAGCTAT |
| GGCTGGAACTGGCTGGATCAGGGTATCAACATTGATGCGGCGTACACCTGGCGCATGGCCGTCTGGCGCGTT |
| GGGAGGACCTGAAGAAAAAGCTGGGTGAAGGCCTGGATTTTATCTATGTTGACGTGTGGGGTAACGGTCAGAG |
| CGGTGATAACGGTGCGTGGGCGACCCATGTGCTGGCGAAAGAGATTAACAAGCAAGGTTGGCGTTTTGCGATC |
| GAATGGGGCCACGGTGGCGAGTACGACAGCACCTTCCAGCACTGGGCGGCGGATCTGACCTACGGTGGCTATA |
| CCAACAAGGGTATCAACAGCGCGATTACCCGTTTCATCCGTAACCACCAGAAAGATAGCTGGGTTGGCGACTA |
| CCGTAGCTATGGTGGCGCGGCGAACTACCCGCTGCTGGGTGGCTATAGCATGAAGGACTTTGAGGGTTGGCAA |
| GGCCGTAGCGATTACAACGGTTATGTTACCAACCTGTTCGCGCACGACGTGATGACCAAGTACTTTCAGCACT |
| TCACCGTTAGCAAATGGGAAAACGGTACCCCGGTGACCATGACCGATAACGGCAGCACCTATAAGTGGACCCC |
| GGAAATGAAAGTGGAGCTGGTTGACGCGGCGGGTAACAAGGTGGTTGTGACCCGTAAAAGCAACGATGTGAAC |
| AGCCCGCAGTACCGTGAGCGTACCGTTACCCTGAACGGTCGTGATCCAACGGCAGCGCGTATCTGACCC |
| CGTGGAACTGGGATGCGAACGGTAAAAAGCTGCCGACCGAAAAGAGAAGATGTACTATTTTAACACCCAAGC |
| GGGTGCGACCACCTGGACCCTGCCGAGCGACTGGGCGAACAGCAAGGTTTACCTGTATAAACTGACCGATCAG |
| GGCAAGACCGAGGAGCAAGAACTGACCGTGACCGATGGCAAAATTACCCTGGACCTGCTGGCGAACCAGCCGT |
| ACGTTCTGTATCGTAGCAAGCAAACCAACCCGGAAATGAGCTGGAGCGAGGGTATGCACATCTACGACCAAGG |
| TTTCAACAGCGGCACCCTGAAACACTGGACCATTAGCGGCGATGCGAGCAAGGCGGAGATCGTGAAAAGCCAG |
| GGTGCGAACGAAATGCTGCGTATCCAAGGCAACAAAAGCAAGGTTAGCCTGACCCAGAAGCTGACCGGTCTGA |
| AACCGAACACCAAGTACGCGGTTTATGTGGGCGTTGACAACCGTAGCAACGCGAAAGCGAGCATTACCGTTAA |
| CACCGGTGAAAAAGAGGTGACCACCTACACCAACAAGAGCCTGGCGTGAACTACATCAAAGCGTATGCGCAC |
| AACAACCGTCGTGAGAACGCGACCGTGGACGATACCAGCTACTTCCAGAACATGTATGCGTTCTTTACCACCG |
| GTAGCGACGTGAGCAACGTTACCCTGACCCTGAGCCGTGAAGCGGGCGATGAGGCGACCTATTTTGACGAAAT |
| TCGTACCTTCGAGAACAACAGCAGCATGTACGGTGATAAGCACGACACCGGTCAGGGCACCTTTAAACAAGAT |
| TTCGAAAACGTTGCGCAAGGTATCTTCCCGTTTGTTGTGGGTGGCGTGGAAGGCGTTGAGGACAACCGTACCC |
| ACCTGAGCGAGAAGCACGATCCGTACACCCAGCGTGGTTGGACGGCAAAAAGGTGGACGATGTTATTGAGGG |
| TAACTGGAGCCTGAAAACCAACGGCCTGGTTAGCCGTCGTAACCTGGTGTACCAGACCATCCCGCAAAACTTC |
| CGTTTTGAGGCGGGCAAGACCTACCGTGTGACCTTTGAATATGAGGCGGGCAGCGACAACACCTATGCGTTTG |
| TTGTGGGTAAAGGCGAATTCCAGAGCGGTCGTCGTGGCACCCAAGCGACCTGGAAATGCACGAGCTGCC |
| GAACACCTGGACCGATAGCAAAAAGGCGAAAAGGTGACCTTCCTGGTTACCGGTGCGAAACCGGTGACACC |
| TGGGTGGGTATCTACAGCACCGGCAACGCGAGCAACACCCGTGGTGATGCGGGTGGCAACGCGAACTTTCGTG |
| GCTATAACGATTTCATGATGGACAACCTGCAAATCGAAGAGATTACCCTGACCGGCAAGATGCTGACCGAAAA |
| CGCGCTGAAAAACTATCTGCCGACCGTTGCGATGACCAACTACACCAAGGAAAGCATGGACGCGCTGAAAGAG |
| GCGGTTTTCAACCTGAGCCAGGCGGACGATGACATCAGCGTGGAAGGCGCGTGCGGAAATCGCGAAGATTG |
| AGGCGCTGAAAAACGCGCTGGTTCAGAAAAAGACCGCGCTGGTTGCGAAGATTTTGAGAGCCTGGATGCGCC |
| GGCGCAACCGGGTAAGGCCTGGAGAACGCGTTCACGGTAACGTTAGCAGCCTGTGGCACACCAGCTGGAAC |
| GGTGGCGATGTTGGCAAGCCGGCGACCATGGTGCTGAAAGAACCGACCGAGATCACCGGTCTGCGTTATGTGC |
| CGCGTGCGAGCGATAGCAACGGCAACCTGCGTGACGTTAAGCTGGTTGTGACCGATGAAAGCGGTAAAGAGCA |
| CACCTTTAACGTGACCGACTGGCCGAACAACAACAAAGAAGATATTGACTTCGGCAAAACCATTAAGGCG |
| AAAAAGATCGTTCTGACCGGTACCAAGACCTACGGCGATGGTGGCGACAAATATCGAGACGCGGCGGAGCTGA |
| TCTTTACCCGTCCGCAAGTGGCGGAAACCCCGCTGGATCTGAGCCGGTTACGAAGCGGCGCTGGCGAAAGCGCA |
| GAAGCTGACCGATAAGGACAACCAGGAAGAGGTGGCGAGCGTTCAAGCGAGCATGAAATATGCGACCGACAAC |
| CACCTGCTGACCGAACGTATGGTTGCGTACTTCGCGGATTATCTGAACCAACTGAAGGATAGCGCGACCAAAC |
| CGGATGCGCCGACCAGCAGCAAGGGTGAAGAACAGCCGCCGGTGCTGGATGTTCCGGAGTTTAAAGGTGGCGT |
| GAACGCGACCGAGGCGGCGGTGCACGAAGTTCCGGAGTTCAAGGGTGGCGTGAACGCGGTTCAGGCGCTGGTT |

-continued

| Sequences |
|---|
| CACGAACTGCCGGAGTATAAAGGTGGCGCGAACGCGGTTCTGGCGGCGGCGAACGAAGTGCCGGAGTACAAGG<br>GTGGCGCGAACGCGGTGGAAGCGCTGGTTAACGAGAAACCGGCGTATACCGGTGTTCTGGCGACCGCGGGCGA<br>CCAGGCGGCGCCGACCGTGGAAAAACCGGAGTACCCGCTGACCCCGAGCCCGGTTGCGGACACCAAAACCCCG<br>GGTGCGAAAGATGAAGAGAAGCTGCCGGCGGGTAGCGGCCTCGAGCACCACCACCACCACCACTGA |

The invention claimed is:

1. A composition or combination comprising a first sialidase, a second sialidase, and an O-glycosidase, wherein: the first sialidase is a polypeptide comprising or consisting of the amino acid sequence of SEQ ID NO: 2; the second sialidase is a polypeptide comprising or consisting of the amino acid sequence of SEQ ID NO: 5; and the O-glycosidase is a polypeptide comprising or consisting of the amino acid sequence of SEQ ID NO: 10.

2. The composition or combination according to claim 1, which is capable of hydrolysing >90% of sialic bonds in a glycoprotein.

3. The composition or combination according to claim 1, wherein the first sialidase consists of the amino acid sequence of SEQ ID NO: 3 and the second sialidase consists of the amino acid sequence of SEQ ID NO: 6.

4. The composition or combination according to claim 1, wherein the first sialidase and/or the second sialidase is/are purified to at least 90% homogeneity; and/or wherein no more than two polypeptides in the composition are sialidases obtained from *Akkermansia muciniphila*.

5. The composition or combination according to claim 1, wherein the O-glycosidase is purified to at least 90% homogeneity.

6. The composition or combination according to claim 1, wherein the first sialidase and/or second sialidase further includes a methionine at the N terminus and/or a histidine tag at the C terminus.

7. The composition or combination according to claim 6, wherein the first sialidase and/or second sialidase includes a histidine tag at the C terminus and the histidine tag is joined to the C terminus by a linker.

8. The composition or combination according to claim 2, wherein the glycoprotein is in its native, non-denatured state.

9. The composition or combination according to claim 3, wherein the first and second sialidases are present in a 1:1 ratio.

\* \* \* \* \*